United States Patent
Shrivastava et al.

(10) Patent No.: US 11,073,800 B2
(45) Date of Patent: *Jul. 27, 2021

(54) MONITORING SITES CONTAINING SWITCHABLE OPTICAL DEVICES AND CONTROLLERS

(71) Applicant: View, Inc., Milpitas, CA (US)

(72) Inventors: Dhairya Shrivastava, Los Altos, CA (US); Stephen Clark Brown, San Mateo, CA (US); Vijay Mani, San Jose, CA (US); Ronald F. Cadet, Redwood City, CA (US)

(73) Assignee: View, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/254,434

(22) Filed: Jan. 22, 2019

(65) Prior Publication Data
US 2019/0235451 A1 Aug. 1, 2019

Related U.S. Application Data

(63) Continuation of application No. 15/691,468, filed on Aug. 30, 2017, which is a continuation-in-part of
(Continued)

(51) Int. Cl.
*G02F 1/163* (2006.01)
*G05B 13/02* (2006.01)
(Continued)

(52) U.S. Cl.
CPC ............ *G05B 13/0265* (2013.01); *E06B 9/24* (2013.01); *G02F 1/163* (2013.01); *G05B 15/02* (2013.01);
(Continued)

(58) Field of Classification Search
None
See application file for complete search history.

(56) References Cited

U.S. PATENT DOCUMENTS

| 4,129,861 A | 12/1978 | Giglia |
| 4,553,085 A | 11/1985 | Canzano |

(Continued)

FOREIGN PATENT DOCUMENTS

| CN | 1311935 A | 9/2001 |
| CN | 2590732 Y | 12/2003 |

(Continued)

OTHER PUBLICATIONS

U.S. Appl. No. 62/102,516, filed Jan. 12, 2015, Nagel et al.
(Continued)

*Primary Examiner* — Isaac T Tecklu
(74) *Attorney, Agent, or Firm* — Weaver Austin Villeneuve & Sampson LLP; Brian D. Griedel

(57) ABSTRACT

Disclosed are platforms for communicating among one or more otherwise independent systems involved in controlling functions of buildings or other sites having switchable optical devices deployed therein. Such independent systems include a window control system and one or more other independent systems such as systems that control residential home products (e.g., thermostats, smoke alarms, etc.), HVAC systems, security systems, lighting control systems, and the like. Together the systems control and/or monitor multiple features and/or products, including switchable windows and other infrastructure of a site, which may be a commercial, residential, or public site.

29 Claims, 33 Drawing Sheets

Related U.S. Application Data application No. 15/534,175, filed as application No. PCT/US2015/064555 on Dec. 8, 2015, now Pat. No. 10,514,963, said application No. 15/691,468 is a continuation-in-part of application No. 15/123,069, filed as application No. PCT/US2015/019031 on Mar. 5, 2015, now Pat. No. 10,859,983, said application No. 15/691,468 is a continuation-in-part of application No. 14/391,122, filed as application No. PCT/US2013/036456 on Apr. 12, 2013, now Pat. No. 10,365,531, application No. 16/254,434, filed on Jan. 22, 2019, which is a continuation-in-part of application No. 15/891,866, filed on Feb. 8, 2018, now Pat. No. 10,908,470, which is a continuation of application No. 14/932,474, filed on Nov. 4, 2015, now Pat. No. 9,927,674, which is a continuation of application No. 13/968,258, filed on Aug. 15, 2013, now Pat. No. 9,482,922, which is a continuation of application No. 13/049,756, filed on Mar. 16, 2011, now Pat. No. 9,454,055.

(60) Provisional application No. 62/088,943, filed on Dec. 8, 2014, provisional application No. 61/974,677, filed on Apr. 3, 2014, provisional application No. 61/948,464, filed on Mar. 5, 2014, provisional application No. 61/624,175, filed on Apr. 13, 2012.

(51) Int. Cl.
*E06B 9/24* (2006.01)
*G05B 15/02* (2006.01)

(52) U.S. Cl.
CPC ............... *E06B 2009/2417* (2013.01); *E06B 2009/2464* (2013.01); *G05B 2219/2642* (2013.01)

(56) References Cited

U.S. PATENT DOCUMENTS

| | | | |
|---|---|---|---|
| 5,124,833 A | 6/1992 | Barton et al. | |
| 5,170,108 A | 12/1992 | Peterson et al. | |
| 5,204,778 A | 4/1993 | Bechtel | |
| 5,220,317 A | 6/1993 | Lynam et al. | |
| 5,290,986 A | 3/1994 | Colon et al. | |
| 5,353,148 A | 10/1994 | Eid et al. | |
| 5,365,365 A | 11/1994 | Ripoche et al. | |
| 5,379,146 A | 1/1995 | Defendini | |
| 5,384,578 A | 1/1995 | Lynam et al. | |
| 5,384,653 A | 1/1995 | Benson et al. | |
| 5,402,144 A | 3/1995 | Ripoche | |
| 5,416,617 A | 5/1995 | Loiseaux et al. | |
| 5,451,822 A | 9/1995 | Bechtel et al. | |
| 5,477,152 A | 12/1995 | Hayhurst | |
| 5,579,149 A * | 11/1996 | Moret | G09F 9/372 359/223.1 |
| 5,598,000 A | 1/1997 | Popat | |
| 5,621,526 A | 4/1997 | Kuze | |
| 5,673,028 A | 9/1997 | Levy | |
| 5,694,144 A | 12/1997 | Lefrou et al. | |
| 5,764,402 A | 6/1998 | Thomas et al. | |
| 5,822,107 A | 10/1998 | Lefrou et al. | |
| 5,900,720 A | 5/1999 | Kallman et al. | |
| 5,956,012 A | 9/1999 | Turnbull et al. | |
| 5,973,818 A | 10/1999 | Sjursen et al. | |
| 5,973,819 A | 10/1999 | Pletcher et al. | |
| 5,978,126 A | 11/1999 | Sjursen et al. | |
| 6,039,390 A | 3/2000 | Agrawal et al. | |
| 6,039,850 A | 3/2000 | Schulz et al. | |
| 6,055,089 A | 4/2000 | Schulz et al. | |
| 6,084,700 A | 7/2000 | Knapp et al. | |
| 6,130,448 A | 10/2000 | Bauer et al. | |
| 6,130,772 A | 10/2000 | Cava | |
| 6,222,177 B1 | 4/2001 | Bechtel et al. | |
| 6,262,831 B1 | 7/2001 | Bauer et al. | |
| 6,344,748 B1 | 2/2002 | Gannon | |
| 6,386,713 B1 | 5/2002 | Turnbull et al. | |
| 6,407,468 B1 | 6/2002 | LeVesque et al. | |
| 6,407,847 B1 | 6/2002 | Poll et al. | |
| 6,449,082 B1 | 9/2002 | Agrawal et al. | |
| 6,471,360 B2 | 10/2002 | Rukavina et al. | |
| 6,535,126 B2 | 3/2003 | Lin et al. | |
| 6,567,708 B1 | 5/2003 | Bechtel et al. | |
| 6,614,577 B1 | 9/2003 | Yu et al. | |
| 6,707,590 B1 | 3/2004 | Bartsch | |
| 6,795,226 B2 | 9/2004 | Agrawal et al. | |
| 6,829,511 B2 | 12/2004 | Bechtel et al. | |
| 6,856,444 B2 | 2/2005 | Ingalls et al. | |
| 6,897,936 B1 | 5/2005 | Li et al. | |
| 6,940,627 B2 | 9/2005 | Freeman et al. | |
| 6,965,813 B2 | 11/2005 | Granqvist et al. | |
| 6,988,070 B2 | 1/2006 | Kawasaki et al. | |
| 7,085,609 B2 | 8/2006 | Bechtel et al. | |
| 7,133,181 B2 | 11/2006 | Greer | |
| 7,215,318 B2 | 5/2007 | Turnbull et al. | |
| 7,277,215 B2 | 10/2007 | Greer | |
| 7,304,787 B2 | 12/2007 | Whitesides et al. | |
| 7,417,397 B2 | 8/2008 | Berman et al. | |
| 7,542,809 B2 | 6/2009 | Bechtel et al. | |
| 7,548,833 B2 | 6/2009 | Ahmed | |
| 7,567,183 B2 | 7/2009 | Schwenke | |
| 7,610,910 B2 | 11/2009 | Ahmed | |
| 7,684,105 B2 * | 3/2010 | Lamontagne | E06B 9/24 359/290 |
| 7,800,812 B2 * | 9/2010 | Moskowitz | G02F 1/172 359/296 |
| 7,817,326 B1 | 10/2010 | Rennig et al. | |
| 7,822,490 B2 | 10/2010 | Bechtel et al. | |
| 7,873,490 B2 | 1/2011 | MacDonald | |
| 7,941,245 B1 | 5/2011 | Popat | |
| 7,962,326 B2 | 6/2011 | Tsourikov et al. | |
| 7,966,078 B2 | 6/2011 | Hoffberg et al. | |
| 7,972,021 B2 | 7/2011 | Scherer | |
| 7,990,603 B2 | 8/2011 | Ash et al. | |
| 8,004,739 B2 | 8/2011 | Letocart | |
| 8,018,644 B2 | 9/2011 | Gustaysson et al. | |
| 8,024,073 B2 | 9/2011 | Imes et al. | |
| 8,102,586 B2 | 1/2012 | Albahri | |
| 8,149,756 B2 | 4/2012 | Hottinen | |
| 8,213,074 B1 | 7/2012 | Shrivastava et al. | |
| 8,214,494 B1 | 7/2012 | Slavin | |
| 8,254,013 B2 | 8/2012 | Mehtani et al. | |
| 8,292,228 B2 | 10/2012 | Mitchell et al. | |
| 8,340,975 B1 | 12/2012 | Rosenberger | |
| 8,456,729 B2 | 6/2013 | Brown et al. | |
| 8,509,400 B2 | 8/2013 | Liu et al. | |
| 8,547,624 B2 | 10/2013 | Ash et al. | |
| 8,705,162 B2 * | 4/2014 | Brown | G02F 1/163 359/275 |
| 8,723,467 B2 | 5/2014 | Berman et al. | |
| 8,764,950 B2 | 7/2014 | Wang et al. | |
| 8,836,263 B2 | 9/2014 | Berman et al. | |
| 8,843,238 B2 | 9/2014 | Wenzel et al. | |
| 8,864,321 B2 | 10/2014 | Mehtani et al. | |
| 8,902,486 B2 | 12/2014 | Chandrasekhar | |
| 8,976,440 B2 | 3/2015 | Berland et al. | |
| 9,016,630 B2 | 4/2015 | Mitchell et al. | |
| 9,030,725 B2 | 5/2015 | Pradhan et al. | |
| 9,081,246 B2 | 7/2015 | Rozbicki | |
| 9,081,247 B1 | 7/2015 | Pradhan et al. | |
| 9,128,346 B2 | 9/2015 | Shrivastava et al. | |
| 9,170,008 B2 | 10/2015 | Reul et al. | |
| 9,300,581 B1 | 3/2016 | Hui et al. | |
| 9,390,726 B1 | 7/2016 | Smus et al. | |
| 9,442,338 B2 | 9/2016 | Uhm et al. | |
| 9,442,341 B2 | 9/2016 | Shrivastava et al. | |
| 9,470,947 B2 | 10/2016 | Nagel et al. | |
| 9,536,527 B1 | 1/2017 | Carlson | |
| 9,551,913 B2 | 1/2017 | Kim et al. | |
| 9,677,327 B1 * | 6/2017 | Nagel | E06B 9/68 |
| 9,690,174 B2 | 6/2017 | Wang | |

(56) References Cited

U.S. PATENT DOCUMENTS

| | | |
|---|---|---|
| 9,709,869 B2 | 7/2017 | Baumann et al. |
| 9,740,074 B2 | 8/2017 | Agrawal et al. |
| 9,749,583 B1 | 8/2017 | Fineberg et al. |
| 9,778,533 B2 | 10/2017 | Bertolini |
| 9,898,912 B1 | 2/2018 | Jordan, II et al. |
| 9,946,138 B2 | 4/2018 | Shrivastava et al. |
| 9,984,686 B1 | 5/2018 | Mutagi et al. |
| 10,001,691 B2 | 6/2018 | Shrivastava et al. |
| 10,137,764 B2 | 11/2018 | Driscoll et al. |
| 10,268,098 B2 | 4/2019 | Shrivastava et al. |
| 10,286,839 B1* | 5/2019 | Mazuir ............... G02B 6/0073 |
| 10,288,971 B2* | 5/2019 | Phillips ................ G02F 1/163 |
| 10,303,035 B2 | 5/2019 | Brown et al. |
| 10,329,839 B2* | 6/2019 | Fasi ..................... G05B 15/02 |
| 10,365,531 B2 | 7/2019 | Shrivastava et al. |
| 10,387,221 B2 | 8/2019 | Shrivastava et al. |
| 10,409,652 B2 | 9/2019 | Shrivastava et al. |
| 10,481,459 B2 | 11/2019 | Shrivastava et al. |
| 10,488,837 B2 | 11/2019 | Cirino |
| 10,514,963 B2 | 12/2019 | Shrivastava et al. |
| 10,747,082 B2 | 8/2020 | Shrivastava et al. |
| 10,768,582 B2 | 9/2020 | Shrivastava et al. |
| 10,859,983 B2 | 12/2020 | Shrivastava et al. |
| 10,917,259 B1 | 2/2021 | Chein et al. |
| 10,921,675 B2 | 2/2021 | Barnum et al. |
| 10,949,267 B2 | 3/2021 | Shrivastava et al. |
| 2002/0027504 A1* | 3/2002 | Davis .................... H04W 24/08 340/540 |
| 2002/0075472 A1 | 6/2002 | Holton |
| 2002/0113168 A1 | 8/2002 | Rukavina et al. |
| 2002/0149829 A1 | 10/2002 | Mochizuka et al. |
| 2002/0152298 A1 | 10/2002 | Kikta et al. |
| 2003/0046072 A1 | 3/2003 | Ramaswamy et al. |
| 2003/0169574 A1 | 9/2003 | Maruyama et al. |
| 2003/0191546 A1 | 10/2003 | Bechtel et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0135989 A1 | 7/2004 | Klebe |
| 2004/0160322 A1 | 8/2004 | Stilp |
| 2004/0215520 A1* | 10/2004 | Butler .................. G06Q 20/203 705/22 |
| 2005/0063036 A1 | 3/2005 | Bechtel et al. |
| 2005/0200934 A1 | 9/2005 | Callahan et al. |
| 2005/0200937 A1 | 9/2005 | Weidner |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0270621 A1 | 12/2005 | Bauer et al. |
| 2005/0278047 A1 | 12/2005 | Ahmed |
| 2006/0001683 A1 | 1/2006 | May et al. |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0209007 A1 | 9/2006 | Pyo et al. |
| 2006/0245024 A1 | 11/2006 | Greer |
| 2006/0279527 A1 | 12/2006 | Zehner et al. |
| 2007/0002007 A1 | 1/2007 | Tam |
| 2007/0053053 A1* | 3/2007 | Moskowitz ............ G02F 1/172 359/296 |
| 2007/0067048 A1 | 3/2007 | Bechtel et al. |
| 2007/0097484 A1 | 5/2007 | Libretto et al. |
| 2007/0162233 A1 | 7/2007 | Schwenke |
| 2007/0285759 A1 | 12/2007 | Ash et al. |
| 2008/0018979 A1 | 1/2008 | Mahe et al. |
| 2008/0042012 A1 | 2/2008 | Callahan et al. |
| 2008/0043316 A2* | 2/2008 | Moskowitz ............ G02F 1/167 359/296 |
| 2008/0048101 A1* | 2/2008 | Romig ..................... B60J 3/04 250/221 |
| 2008/0147847 A1 | 6/2008 | Pitkow et al. |
| 2008/0186562 A2 | 8/2008 | Moskowitz |
| 2008/0211682 A1 | 9/2008 | Hyland et al. |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0187405 A1 | 7/2009 | Bhogal et al. |
| 2009/0243732 A1 | 10/2009 | Tarng et al. |
| 2009/0243802 A1 | 10/2009 | Wolf et al. |
| 2009/0257576 A1 | 10/2009 | Wellard et al. |
| 2009/0271042 A1 | 10/2009 | Voysey |
| 2009/0323160 A1 | 12/2009 | Egerton et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0228854 A1* | 9/2010 | Morrison ................ H04L 43/10 709/224 |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0274366 A1* | 10/2010 | Fata ..................... G06F 11/3048 700/7 |
| 2010/0315693 A1 | 12/2010 | Lam et al. |
| 2011/0046810 A1 | 2/2011 | Bechtel et al. |
| 2011/0050756 A1 | 3/2011 | Cassidy et al. |
| 2011/0063708 A1 | 3/2011 | Letocart |
| 2011/0071685 A1 | 3/2011 | Huneycutt et al. |
| 2011/0097081 A1* | 4/2011 | Gupta ................ H04Q 11/0062 398/38 |
| 2011/0148218 A1 | 6/2011 | Rozbicki |
| 2011/0164304 A1 | 7/2011 | Brown et al. |
| 2011/0164317 A1 | 7/2011 | Verghol et al. |
| 2011/0167617 A1 | 7/2011 | Letocart |
| 2011/0184561 A1 | 7/2011 | Klasson et al. |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2012/0190386 A1 | 1/2012 | Anderson |
| 2012/0026573 A1 | 2/2012 | Collins et al. |
| 2012/0033287 A1* | 2/2012 | Friedman ................ E06B 9/24 359/275 |
| 2012/0062975 A1* | 3/2012 | Mehtani ................ G02F 1/163 359/265 |
| 2012/0086363 A1 | 4/2012 | Golding et al. |
| 2012/0133315 A1 | 5/2012 | Berman et al. |
| 2012/0140492 A1 | 6/2012 | Alvarez |
| 2012/0188627 A1 | 7/2012 | Chen et al. |
| 2012/0194895 A1 | 8/2012 | Podbelski et al. |
| 2012/0200908 A1 | 8/2012 | Bergh et al. |
| 2012/0229275 A1 | 9/2012 | Mattern |
| 2012/0232969 A1 | 9/2012 | Fadell et al. |
| 2012/0235493 A1 | 9/2012 | Kiuchi et al. |
| 2012/0236386 A1 | 9/2012 | Mehtani et al. |
| 2012/0239209 A1* | 9/2012 | Brown ...................... E06B 7/28 700/278 |
| 2012/0259583 A1 | 10/2012 | Noboa et al. |
| 2012/0268803 A1 | 10/2012 | Greer |
| 2012/0293855 A1* | 11/2012 | Shrivastava ............. E06B 9/24 359/275 |
| 2013/0057937 A1 | 3/2013 | Berman et al. |
| 2013/0060357 A1 | 3/2013 | Li et al. |
| 2013/0085614 A1 | 4/2013 | Wenzel et al. |
| 2013/0085615 A1 | 4/2013 | Barker |
| 2013/0085616 A1 | 4/2013 | Wenzel et al. |
| 2013/0088331 A1 | 4/2013 | Cho et al. |
| 2013/0131869 A1 | 5/2013 | Majewski et al. |
| 2013/0157493 A1 | 6/2013 | Brown |
| 2013/0158790 A1* | 6/2013 | McIntyre, Jr. .......... G02F 1/163 701/36 |
| 2013/0182308 A1 | 7/2013 | Guarr et al. |
| 2013/0196600 A1* | 8/2013 | Capers ................. H04W 24/06 455/41.2 |

(56) References Cited

U.S. PATENT DOCUMENTS

| | | |
|---|---|---|
| 2013/0241299 A1 | 9/2013 | Snyker et al. |
| 2013/0242370 A1 | 9/2013 | Wang |
| 2013/0263510 A1 | 10/2013 | Gassion |
| 2013/0271812 A1* | 10/2013 | Brown ............... E06B 9/24 359/275 |
| 2013/0271813 A1* | 10/2013 | Brown ............... E06B 9/24 359/275 |
| 2013/0271814 A1* | 10/2013 | Brown ............... G02F 1/163 359/275 |
| 2013/0271815 A1 | 10/2013 | Pradhan et al. |
| 2013/0278989 A1 | 10/2013 | Lam et al. |
| 2013/0289999 A1 | 10/2013 | Hymel |
| 2013/0307771 A1 | 11/2013 | Parker et al. |
| 2014/0067733 A1 | 3/2014 | Humann |
| 2014/0142937 A1 | 5/2014 | Powledge et al. |
| 2014/0156097 A1 | 6/2014 | Nesler et al. |
| 2014/0160550 A1 | 6/2014 | Brown et al. |
| 2014/0169795 A1 | 6/2014 | Clough |
| 2014/0170863 A1 | 6/2014 | Brown |
| 2014/0172430 A1 | 6/2014 | Rutherford et al. |
| 2014/0172557 A1* | 6/2014 | Eden ............... G06F 3/0488 705/14.49 |
| 2014/0182350 A1 | 7/2014 | Bhavaraju et al. |
| 2014/0185284 A1 | 7/2014 | Hsu et al. |
| 2014/0229174 A1 | 8/2014 | Graumann et al. |
| 2014/0236323 A1* | 8/2014 | Brown ............... E06B 9/24 700/90 |
| 2014/0259931 A1 | 9/2014 | Plummer |
| 2014/0268287 A1 | 9/2014 | Brown et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0330569 A1 | 11/2014 | Kolavennu et al. |
| 2014/0347190 A1* | 11/2014 | Grimm ............... G08B 5/36 340/815.4 |
| 2014/0349497 A1* | 11/2014 | Brown ............... E06B 7/28 439/110 |
| 2014/0367057 A1 | 12/2014 | Feldstein |
| 2014/0368899 A1 | 12/2014 | Greer |
| 2014/0371931 A1 | 12/2014 | Lin et al. |
| 2014/0379353 A1 | 12/2014 | Boies et al. |
| 2015/0002919 A1* | 1/2015 | Jack ............... G02F 1/1533 359/275 |
| 2015/0003822 A1* | 1/2015 | Fukada ............... H04L 43/50 398/2 |
| 2015/0023661 A1* | 1/2015 | Borkenhagen ..... H04Q 11/0005 398/45 |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0098121 A1 | 4/2015 | Turnbull et al. |
| 2015/0112667 A1 | 4/2015 | Kozuka et al. |
| 2015/0116811 A1* | 4/2015 | Shrivastava ............... G08C 17/02 359/275 |
| 2015/0120297 A1 | 4/2015 | Meruva |
| 2015/0122474 A1 | 5/2015 | Petersen |
| 2015/0129140 A1 | 5/2015 | Dean et al. |
| 2015/0160525 A1 | 6/2015 | Shi |
| 2015/0162006 A1 | 6/2015 | Kummer |
| 2015/0293422 A1 | 10/2015 | Pradhan et al. |
| 2015/0378230 A1 | 12/2015 | Gudmunson et al. |
| 2015/0378231 A1 | 12/2015 | Greer et al. |
| 2016/0040478 A1 | 2/2016 | Lundy et al. |
| 2016/0054633 A1 | 2/2016 | Brown et al. |
| 2016/0070151 A1 | 3/2016 | Shrivastava et al. |
| 2016/0109778 A1 | 4/2016 | Shrivastava et al. |
| 2016/0134932 A1 | 5/2016 | Karp et al. |
| 2016/0154290 A1* | 6/2016 | Brown ............... E06B 3/6722 359/275 |
| 2016/0170206 A1 | 6/2016 | Osborne et al. |
| 2016/0202589 A1 | 7/2016 | Nagel et al. |
| 2016/0203403 A1* | 7/2016 | Nagel ............... H04L 51/32 706/61 |
| 2016/0266878 A1 | 9/2016 | Mankovskii |
| 2016/0299210 A1 | 10/2016 | Zeine |
| 2016/0327293 A1 | 11/2016 | Grabowski et al. |
| 2016/0358603 A1 | 12/2016 | Azam et al. |
| 2017/0075183 A1 | 3/2017 | Brown |
| 2017/0075323 A1 | 3/2017 | Shrivastava et al. |
| 2017/0076721 A1 | 3/2017 | Bargetzi et al. |
| 2017/0082903 A1 | 3/2017 | Vigano et al. |
| 2017/0092269 A1 | 3/2017 | Haubrich et al. |
| 2017/0097259 A1 | 4/2017 | Brown et al. |
| 2017/0139301 A1 | 5/2017 | Messere et al. |
| 2017/0188437 A1 | 6/2017 | Banta |
| 2017/0197494 A1 | 7/2017 | Li |
| 2017/0200424 A1 | 7/2017 | Xu et al. |
| 2017/0212400 A1 | 7/2017 | Shrivastava et al. |
| 2017/0234067 A1* | 8/2017 | Fasi ............... G05B 13/041 700/275 |
| 2017/0251488 A1* | 8/2017 | Urban ............... H04W 72/1263 |
| 2017/0253801 A1 | 9/2017 | Bae et al. |
| 2017/0279930 A1 | 9/2017 | Zhang |
| 2017/0285432 A1* | 10/2017 | Shrivastava ............ G06Q 50/10 |
| 2017/0285433 A1 | 10/2017 | Shrivastava et al. |
| 2017/0347129 A1 | 11/2017 | Levi et al. |
| 2017/0364395 A1 | 12/2017 | Shrivastava et al. |
| 2018/0090992 A1* | 3/2018 | Shrivastava ............ G02F 1/163 |
| 2018/0122366 A1 | 5/2018 | Nishikawa et al. |
| 2018/0129172 A1* | 5/2018 | Shrivastava ............ G02F 1/163 |
| 2018/0144712 A1 | 5/2018 | Threlkel et al. |
| 2018/0189117 A1 | 7/2018 | Shrivastava et al. |
| 2018/0267380 A1 | 9/2018 | Shrivastava et al. |
| 2018/0284555 A1* | 10/2018 | Klawuhn ............ E06B 9/24 |
| 2018/0293981 A1 | 10/2018 | Ni et al. |
| 2018/0335939 A1* | 11/2018 | Karunamuni ............ G06F 8/38 |
| 2019/0138740 A1 | 5/2019 | Shrivastava et al. |
| 2019/0155122 A1 | 5/2019 | Brown et al. |
| 2019/0271895 A1 | 9/2019 | Shrivastava et al. |
| 2019/0331978 A1 | 10/2019 | Shrivastava et al. |
| 2019/0346734 A1 | 11/2019 | Shrivastava et al. |
| 2019/0347141 A1 | 11/2019 | Shrivastava et al. |
| 2019/0353972 A1 | 11/2019 | Shrivastava et al. |
| 2019/0384652 A1 | 12/2019 | Shrivastava et al. |
| 2020/0041963 A1 | 2/2020 | Shrivastava et al. |
| 2020/0041967 A1 | 2/2020 | Shrivastava et al. |
| 2020/0057421 A1 | 2/2020 | Trikha et al. |
| 2020/0103841 A1 | 4/2020 | Pillai et al. |
| 2020/0150508 A1 | 5/2020 | Patterson et al. |
| 2020/0387041 A1* | 12/2020 | Shrivastava ............ E06B 9/24 |

FOREIGN PATENT DOCUMENTS

| | | |
|---|---|---|
| CN | 1692348 A | 11/2005 |
| CN | 1808505 A | 7/2006 |
| CN | 101013211 A | 8/2007 |
| CN | 101023711 A | 8/2007 |
| CN | 101213788 A | 7/2008 |
| CN | 101501757 A | 8/2009 |
| CN | 101510078 A | 8/2009 |
| CN | 101969207 A | 2/2011 |
| CN | 102203370 A | 9/2011 |
| CN | 102414601 A | 4/2012 |
| CN | 102598469 A | 7/2012 |
| CN | 103327126 A | 9/2013 |
| CN | 103547965 A | 1/2014 |
| CN | 103649826 A | 3/2014 |
| DE | 10124673 A1 | 11/2002 |
| EP | 0445314 | 9/1991 |
| EP | 0869032 | 10/1998 |
| EP | 0835475 B1 | 9/2004 |
| EP | 1510854 A1 | 3/2005 |
| EP | 1417535 | 11/2005 |
| EP | 1619546 A2 | 1/2006 |
| EP | 1929701 | 6/2008 |
| EP | 0920210 | 6/2009 |
| EP | 2161615 | 3/2010 |
| EP | 2357544 | 8/2011 |
| EP | 2648086 A2 | 10/2013 |
| EP | 2764998 A1 | 8/2014 |
| EP | 2357544 B1 | 10/2014 |
| EP | 3015915 A1 | 5/2016 |
| EP | 2837205 B1 | 2/2017 |

(56) References Cited

FOREIGN PATENT DOCUMENTS

| | | |
|---|---|---|
| EP | 3293941 A1 | 3/2018 |
| EP | 3352053 A1 | 7/2018 |
| JP | 63-208830 | 8/1988 |
| JP | 02-132420 | 5/1990 |
| JP | 05-178645 | 7/1993 |
| JP | 10-063216 | 3/1998 |
| JP | H10-215492 A | 8/1998 |
| JP | 2003-284160 A | 10/2003 |
| JP | 2004-245985 | 9/2004 |
| JP | 2007-156909 A | 6/2007 |
| JP | 4694816 B2 | 6/2011 |
| JP | 4799113 B2 | 10/2011 |
| JP | 2013-057975 A | 3/2013 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| KR | 10-2012-0045915 | 5/2012 |
| KR | 10-1323668 B1 | 11/2013 |
| KR | 10-2014-0004175 A | 1/2014 |
| KR | 10-1346862 B | 1/2014 |
| KR | 10-1799323 B1 | 11/2017 |
| RU | 2378672 C2 | 10/2010 |
| RU | 2009132962 A | 10/2010 |
| RU | 104808 U1 | 5/2011 |
| RU | 2012107324 A | 9/2013 |
| TW | 200532346 A | 10/2005 |
| WO | WO1998/016870 | 4/1998 |
| WO | WO2002/013052 | 2/2002 |
| WO | WO2004/003649 | 1/2004 |
| WO | WO2005/098811 | 10/2005 |
| WO | WO2005/103807 | 11/2005 |
| WO | WO2007/016546 A2 | 2/2007 |
| WO | WO2007/146862 | 12/2007 |
| WO | WO2008/030018 | 3/2008 |
| WO | WO2008/147322 | 12/2008 |
| WO | WO2009/042359 A1 | 4/2009 |
| WO | WO2009/124647 | 10/2009 |
| WO | WO2010/120771 | 10/2010 |
| WO | WO2011/020478 | 2/2011 |
| WO | WO2011/087684 | 7/2011 |
| WO | WO2011/087687 | 7/2011 |
| WO | WO2011/124720 | 10/2011 |
| WO | WO2011/127015 | 10/2011 |
| WO | WO2012/079159 | 6/2012 |
| WO | WO2012/080618 | 6/2012 |
| WO | WO2012/080656 | 6/2012 |
| WO | WO2012/080657 | 6/2012 |
| WO | WO2012/125332 A2 | 9/2012 |
| WO | WO2012/145155 | 10/2012 |
| WO | WO2013/059674 | 4/2013 |
| WO | WO2013/109881 | 7/2013 |
| WO | WO2013/155467 | 10/2013 |
| WO | WO2013/158464 A1 | 10/2013 |
| WO | WO2013/177575 A1 | 11/2013 |
| WO | WO2014/082092 | 5/2014 |
| WO | WO2014/121809 | 8/2014 |
| WO | WO2014/121863 | 8/2014 |
| WO | WO2014/130471 | 8/2014 |
| WO | WO2014/134451 | 9/2014 |
| WO | WO2014/209812 A1 | 12/2014 |
| WO | WO2015/051262 A1 | 4/2015 |
| WO | WO2015/077097 A1 | 5/2015 |
| WO | WO2015/134789 | 9/2015 |
| WO | WO2015/168626 | 11/2015 |
| WO | WO2016/004109 | 1/2016 |
| WO | WO2016/085964 | 6/2016 |
| WO | WO2016/094445 | 6/2016 |
| WO | WO2016/183059 A1 | 11/2016 |
| WO | WO2017/007841 A1 | 1/2017 |
| WO | WO2017/059362 | 4/2017 |
| WO | WO2017/075059 | 5/2017 |
| WO | WO2017/155833 | 9/2017 |
| WO | WO2017/189618 | 11/2017 |
| WO | WO2017/189618 A1 | 11/2017 |
| WO | WO2017/192881 | 11/2017 |
| WO | WO2018/098089 | 5/2018 |
| WO | WO2018/200702 A1 | 11/2018 |
| WO | WO2018/200740 A1 | 11/2018 |
| WO | WO2018/200752 A1 | 11/2018 |
| WO | WO2019/203931 | 10/2019 |

OTHER PUBLICATIONS

U.S. Appl. No. 62/102,515, filed Jan. 12, 2015, Nagar et al.
U.S. Office Action dated Sep. 4, 2018 in U.S. Appl. No. 15/320,725.
U.S. Notice of Allowance dated Mar. 20, 2019 in U.S. Appl. No. 15/320,725.
U.S. Final Office Action dated Jan. 27, 2014 in U.S. Appl. No. 13/479,137.
U.S. Final Office Action dated Feb. 26, 2015 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Sep. 23, 2013 in U.S. Appl. No. 13/479,137.
U.S. Office Action dated Jul. 3, 2014 in U.S. Appl. No. 13/479,137.
U.S. Final Office Action dated Sep. 19, 2016 in U.S. Appl. No. 14/887,178.
U.S. Final Office Action dated Mar. 17, 2017 in U.S. Appl. No. 14/887,178.
U.S. Office Action dated Mar. 25, 2016 in U.S. Appl. No. 14/887,178.
U.S. Office Action dated Oct. 23, 2017 in U.S. Appl. No. 14/887,178.
U.S. Notice of Allowance dated Mar. 9, 2018 in U.S. Appl. No. 14/887,178.
U.S. Office Action dated Jul. 24, 2018 in U.S. Appl. No. 15/978,029.
U.S. Notice of Allowance dated Dec. 13, 2018 in U.S. Appl. No. 15/978,029.
Preliminary Amendment dated Jan. 18, 2017 in U.S. Appl. No. 15/123,069.
U.S. Office Action dated Apr. 27, 2018 in U.S. Appl. No. 15/123,069.
U.S. Notice of Allowance dated Nov. 28, 2018 in U.S. Appl. No. 15/123,069.
U.S. Office Action dated Jul. 6, 2018 in U.S. Appl. No. 15/534,175.
U.S. Notice of Allowance dated Apr. 17, 2019 in U.S. Appl. No. 15/534,175.
U.S. Office Action dated Aug. 7, 2018 in U.S. Appl. No. 15/910,936.
U.S. Notice of Allowance dated Dec. 14, 2018 in U.S. Appl. No. 15/910,936.
U.S. Notice of Allowance dated Apr. 17, 2019 in U.S. Appl. No. 15/910,936.
U.S. Office Action dated Sep. 11, 2017 in U.S. Appl. No. 14/951,410.
U.S. Final Office Action dated Mar. 15, 2018 in U.S. Appl. No. 14/951,410.
U.S. Notice of Allowance dated Oct. 22, 2018 in U.S. Appl. No. 14/951,410.
U.S. Office Action dated Feb. 7, 2019 in U.S. Appl. No. 15/623,237.
U.S. Office Action dated Feb. 7, 2019 in U.S. Appl. No. 15/691,468.
U.S. Final Office Action dated Jan. 31, 2019 in U.S. Appl. No. 15/534,175.
International Preliminary Report on Patentability dated Jun. 8, 2017 in PCT/US2015/062480.
International Search Report and Written Opinion dated Feb. 15, 2016 in PCT/US2015/062480.
International Search Report and Written Opinion dated May 29, 2015 in Application No. PCT/US2015/019031.
International Preliminary Report on Patentability dated Sep. 15, 2016 in Application No. PCT/US2015/019031.
International Preliminary Report on Patentability dated Jan. 12, 2017 in PCT Application No. PCT/US15/38667.
International Search Report and Written Opinion dated Oct. 16, 2015 in PCT Application No. PCT/US15/38667.

(56) References Cited

OTHER PUBLICATIONS

International Preliminary Report on Patentability dated Jun. 22, 2017 in PCT Application No. PCT/US15/64555.
International Search Report and Written Opinion dated Oct. 16, 2015 in PCT Application No. PCT/US15/64555.
International Search Report and Written Opinion (ISA/KR) dated Jan. 9, 2018 in PCT Application No. PCT/US17/54120.
International Preliminary Report on Patentability dated Apr. 18, 2019 in PCT Application No. PCT/US17/54120.
International Search Report and Written Opinion dated Nov. 16, 2018 in PCT Application No. PCT/US2018/029460.
International Search Report and Written Opinion dated Oct. 15, 2018 in PCT Application No. PCT/US2018/029406.
CN Office Action dated Aug. 28, 2018 in CN Application No. 201580070776.3.
CN Office Action dated Mar. 19, 2019 in CN Application No. 201580070776.3.
EP Extended Search Report dated Nov. 8, 2018 in EP Application No. 15863112.7.
EP Extended Search Report dated Jun. 19, 2017 in EP Application No. 15758538.1.
EP Office Action dated Aug. 21, 2018 in EP Application No. 15758538.1.
EP Extended Search Report dated Feb. 15, 2018 in EP Application No. 15814233.1.
EP Examination Report dated Mar. 4, 2019 in EP Application No. 15814233.1.
EP Extended Search Report dated Jun. 5, 2018 in EP Application No. 15868003.3.
RU Office Action dated Sep. 24, 2018 in RU Application No. 2016139012.
Taiwanese Office Action dated Dec. 12, 2018 in TW Application No. 107129150.
CN Office Action dated Feb. 2, 2019 in CN Application No. 201580015979.2.
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
"SageGlass Unplugged™—wireless dynamic glass", 2014, 2 pages.
"Ossia Wireless Charging", screenshot and picture of Cota device, accessed Apr. 20, 2015, 1 page.
"SageGlass Mobile App" screenshot, accessed Aug. 28, 2015, 1 page.
"Sage Product Highlights" screenshot, accessed Aug. 28, 2015, 1 page.
"SageGlass Unplugged" screenshot, accessed Aug. 28, 2015, 1 page.
U.S. Office Action dated Jan. 18, 2013 in U.S. Appl. No. 13/049,756.
U.S. Final Office Action dated Aug. 19, 2013 in U.S. Appl. No. 13/049,756.
U.S. Office Action dated Oct. 6, 2014 in U.S. Appl. No. 13/049,756.
U.S. Final Office Action dated Jul. 2, 2015 in U.S. Appl. No. 13/049,756.
U.S. Office Action dated Oct. 6, 2014 in U.S. Appl. No. 13/968,258.
U.S. Final Office Action dated Jun. 5, 2015 U.S. Appl. No. 13/968,258.
U.S. Office Action dated Feb. 3, 2012 in U.S. Appl. No. 13/049,750.
U.S. Final Office Action dated Apr. 30, 2012 in U.S. Appl. No. 13/049,750.
U.S. Notice of Allowance dated May 8, 2012 in U.S. Appl. No. 13/049,750.
U.S. Office Action dated Jan. 16, 2015 in U.S. Appl. No. 14/468,778.
U.S. Office Action dated Mar. 27, 2012 in U.S. Appl. No. 13/049,623.
U.S. Notice of Allowance dated Jul. 20, 2012 in U.S. Appl. No. 13/049,623.
U.S. Office Action dated Dec. 24, 2013 in U.S. Appl. No. 13/309,990.
Notice of Allowanced dated Jun. 17, 2014 in U.S. Appl. No. 13/309,990.
U.S. Office Action dated Oct. 11, 2013 in U.S. Appl. No. 13/449,235.
U.S. Notice of Allowance dated Jan. 10, 2014 in U.S. Appl. No. 13/449,235.
U.S. Office Action dated Feb. 24, 2015 in U.S. Appl. No. 14/163,026.
U.S. Office Action dated Nov. 18, 2016 in U.S. Appl. No. 14/391,122.
U.S. Final Office Action dated Jul. 3, 2017 in U.S. Appl. No. 14/391,122.
U.S. Final Office Action dated Feb. 8, 2018 in U.S. Appl. No. 14/391,122.
U.S. Office Action dated Sep. 1, 2017 in U.S. Appl. No. 14/391,122.
U.S. Office Action dated Jun. 22, 2018 in U.S. Appl. No. 14/391,122.
U.S. Final Office Action dated Nov. 20, 2018 in U.S. Appl. No. 14/391,122.
U.S. Notice of Allowance dated Mar. 11, 2019 in U.S. Appl. No. 14/391,122.
U.S. Office Action dated Nov. 29, 2013 in U.S. Appl. No. 13/449,248.
U.S. Office Action dated Nov. 29, 2013 in U.S. Appl. No. 13/449,251.
U.S. Final Office Action dated May 16, 2014 in U.S. Appl. No. 13/449,248.
U.S. Office Action dated Sep. 29, 2014 in U.S. Appl. No. 13/449,248.
U.S. Final Office Action dated May 15, 2014 in U.S. Appl. No. 13/449,251.
U.S. Office Action dated Oct. 28, 2014 in U.S. Appl. No. 13/449,251.
U.S. Office Action dated Jun. 3, 2015 in U.S. Appl. No. 13/449,251.
U.S. Office Action dated Sep. 15, 2014 in U.S. Appl. No. 13/682,618.
U.S. Notice of Allowance dated Jan. 22, 2015 in U.S. Appl. No. 13/682,618.
U.S. Notice of Allowance dated Apr. 13, 2015 in U.S. Appl. No. 14/657,380.
Letter dated Dec. 1, 2014 re Prior Art re U.S. Appl. No. 13/772,969 from Ryan D. Ricks representing MechoShade Systems, Inc.
Third-Party Submission dated Feb. 2, 2015 and Feb. 18, 2015 PTO Notice re Third-Party Submission for U.S. Appl. No. 13/772,969.
European Search Report dated Aug. 11, 2014 in European Application No. 12757877.1.
International Search Report and Written Opinion dated Sep. 26, 2012, issued in PCT/US2012/027828.
International Preliminary Report on Patentability dated Sep. 26, 2013, issued in PCT/US2012/027828.
European Search Report dated Jul. 29, 2014 in European Application No. 12758250.0.
International Search Report and Written Opinion dated Sep. 24, 2012, issued in PCT/US2012/027909.
International Preliminary Report on Patentability dated Sep. 26, 2013, issued in PCT/US2012/027909.
European Search Report dated Jul. 23, 2014 in European Application No. 12756917.6.
International Search Report and Written Opinion dated Sep. 24, 2012, issued in PCT/US2012/027742.
International Preliminary Report on Patentability dated Sep. 26, 2013, issued in PCT/US2012/027742.
Chinese Office Action dated Mar. 26, 2015 in Chinese Application No. 2015032301101560.
European Search Report dated Mar. 5, 2015 in European Application No. 12841714.4.
International Search Report and Written Opinion dated Mar. 28, 2013 in PCT/US2012/061137.
International Preliminary Report on Patentability dated May 1, 2014 in PCT/US2012/061137.
International Search Report and Written Opinion dated Jul. 23, 2013, issued in PCT/US2013/036235.
International Preliminary Report on Patentability dated Oct. 30, 2014 issued in PCT/US2013/036235.
Chinese Office Action dated Jun. 21, 2017 in CN Application No. 201380025802.1.
European (extended) Search Report dated Dec. 4, 2015 in European Application No. 13775052.7.
Russian Office Action dated Mar. 9, 2017 in Russian Application No. 2014145565.
International Search Report and Written Opinion dated Jul. 26, 2013, issued in PCT/US2013/036456.

(56) References Cited

OTHER PUBLICATIONS

International Preliminary Report on Patentability dated Oct. 23, 2014 issued in PCT/US2013/036456.
International Search Report and Written Opinion dated Jul. 11, 2013, issued in PCT/US2013/034998.
International Preliminary Report on Patentability dated Oct. 30, 2014 issued in PCT/US2013/034998.
International Search Report and Written Opinion dated Dec. 26, 2013, issued in PCT/US2013/053625.
International Preliminary Report on Patentability dated Feb. 19, 2015 issued in PCT/US2013/053625.
International Search Report and Written Opinion dated May 26, 2014, issued in PCT/US2014/016974.
Communication re Third-Party Observation dated Dec. 4, 2014 and Third-Party Observation dated Dec. 3, 2014 in PCT/US2014/016974.
International Search Report and Written Opinion dated Oct. 16, 2014, issued in PCT/US2014/043514.
European (Extended) Search Report dated Aug. 25, 2017 in European Application No. 17156033.7.
Chinese Office Action dated Jan. 15, 2018 in CN Application No. 201380025802.1.
International Search Report and Written Opinion (ISA:KR) dated Jul. 18, 2017, issued in PCT/US2017/29476.
International Preliminary Report on Patentability dated Nov. 8, 2018 in PCT/US2017/29476.
International Search Report and Written Opinion (ISA:KR) dated Mar. 19, 2018, issued in PCT/US2017/062634.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"How Cleantech wants to make a 2012 comeback" http://mountainview.patch.com/articles/how-cleantech-wants-to-make-a-2012-comeback, Jan. 23, 2012.
APC by Schneider Electric, Smart-UPS 120V Product Brochure, 2013, 8 pp.
Hoosier Energy, "How do they do that? Measuring Real-Time Cloud Activity" Hoosier Energy Current Connections, undated. (http://members.questline.com/Article.aspx?articleID=18550&accountID=196000&nl=11774).
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].
National Aeronautics & Space Administration, "Cloud Radar System (CRS)," (undated) [http://har.gsfc.nasa.gov/index.php?section=12].
Science and Technology Facilities Council. "Cloud Radar: Predicting the Weather More Accurately." ScienceDaily, Oct. 1, 2008. [www.sciencedaily.com/releases/2008/09/080924085200.htm].
"Remote Sensing: Clouds," Department of Atmospheric and Ocean Science, University of Maryland, (undated) [http://www.atmos.umd.edu/~pinker/remote_sensing_clouds.htm].
U.S. Appl. No. 16/253,971, filed Jan. 22, 2019, Brown et al.
U.S. Appl. No. 16/338,403, filed Mar. 29, 2019, Shrivastava et al.
U.S. Appl. No. 16/096,557, filed Oct. 25, 2018, Shrivastava et al.
U.S. Office Action dated Aug. 22, 2019 in U.S. Appl. No. 16/298,776.
U.S. Corrected Notice of Allowability dated Jun. 4, 2020 in U.S. Appl. No. 16/298,776.
U.S. Notice of Allowance dated Apr. 6, 2020 in U.S. Appl. No. 16/298,776.
U.S. Office Action dated Aug. 21, 2019 in U.S. Appl. No. 16/508,099.
U.S. Final Office Action dated Mar. 3, 2020 in U.S. Appl. No. 16/508,099.
U.S. Office Action dated Jul. 25, 2019 in U.S. Appl. No. 16/253,971.
U.S. Final Office Action dated Mar. 18, 2020 in U.S. Appl. No. 16/253,971.
U.S. Notice of Allowance dated Jul. 17, 2019 in U.S. Appl. No. 15/123,069.
U.S. Notice of Allowance dated Apr. 9, 2020 in U.S. Appl. No. 15/123,069.
U.S. Final Office Action dated Jul. 3, 2019 in U.S. Appl. No. 15/623,237.
U.S. Notice of Allowance dated May 6, 2020 in U.S. Appl. No. 15/623,237.
U.S. Notice of Allowance dated Jul. 1, 2020 in U.S. Appl. No. 15/623,237.
U.S. Final Office Action dated Jul. 2, 2019 in U.S. Appl. No. 15/691,468.
U.S. Office Action dated May 6, 2020 in U.S. Appl. No. 15/691,468.
U.S. Notice of Allowance (corrected) dated Apr. 18, 2019 in U.S. Appl. No. 15/320,725.
U.S. Notice of Allowance dated Jul. 17, 2019 in U.S. Appl. No. 15/320,725.
U.S. Notice of Allowance dated Jul. 25, 2019 in U.S. Appl. No. 15/534,175.
U.S. Office Action dated Feb. 4, 2019 in U.S. Appl. No. 15/623,235.
U.S. Notice of Allowance dated May 14, 2019 in U.S. Appl. No. 15/623,235.
U.S. Preliminary Amendment dated Dec. 31, 2019 in U.S. Appl. No. 16/608,159.
CN Office Action dated Oct. 9, 2019 in CN Application No. 201580070776.3.
EP Extended Search Report dated Nov. 28, 2019 in EP Application No. 19188907.0.
Australian Examination Report dated Mar. 2, 2020 in AU Application No. 2015353569.
International Search Report and Written Opinion (ISA/KR) dated Jun. 14, 2019 in PCT/US2019/019455.
EP Extended Search Report dated Dec. 17, 2019 in EP Application No.
Australian Examination Report dated Dec. 24, 2019 in AU Application No. 2015227056.
CN Office Action dated Aug. 16, 2019 in CN Application No. 201580015979.2.
CN Office Action dated Jan. 15, 2020 in CN Application No. 201580015979.2.
CN Office Action dated Jun. 3, 2020 in CN Application No. 201580015979.2.
CN Office Action dated Mar. 9, 2020 in CN Application No. 201580040461.4.
CN Office Action dated Feb. 3, 2020 in CN Application No. 201580072749.X.
EP Office Action dated May 14, 2020 in EP Application No. 15868003.3.
JP Office Action dated Nov. 19, 2019 in JP Application No. 2017-549175.
JP Office Action dated Jun. 16, 2020 in JP Application No. 2017-549175.
Russian Office Action dated Jul. 10, 2019 in RU Application No. 2017123902.
International Preliminary Report on Patentability dated Nov. 7, 2019 in PCT Application No. PCT/US2018/029460.
International Search Report and Written Opinion dated Jul. 11, 2019 in PCT Application No. PCT/US2019/030467.
International Preliminary Report on Patentability dated Nov. 7, 2019 in PCT Application No. PCT/US2018/029406.
Taiwanese Office Action dated May 13, 2019 in TW Application No. 104139217.
U.S. Office Action dated May 18, 2020 in U.S. Appl. No. 16/096,557.

(56) References Cited

OTHER PUBLICATIONS

Indian Office Action dated Sep. 17, 2019 in Indian Application No. 2533/KOLNP/2014.
Chinese Office Action dated May 20, 2020 in CN Application No. 201810932986.4.
European Extended Search Report and Opinion dated Nov. 7, 2019 in European Application No. 17790290.5.
International Preliminary Report on Patentability (ISA:KR) dated Jun. 6, 2019, issued in PCT/US2017/062634.
European Extended Search Report and Opinion dated May 20, 2020 in European Application No. 17874769.7.
U.S. Appl. No. 63/010,977, filed Apr. 16, 2020, Makker et atl.
U.S. Appl. No. 16/946,947, filed Jul. 13, 2020, Shrivastava et al.
U.S. Office Action dated Jul. 23, 2020 in U.S. Appl. No. 16/508,099.
U.S. Notice of Allowance dated Dec. 7, 2020 in U.S. Appl. No. 16/508,099.
U.S. Office Action dated Jul. 29, 2020 in U.S. Appl. No. 16/253,971.
U.S. Notice of Allowability (supplemental) dated Sep. 30, 2020 in U.S. Appl. No. 15/123,069.
U.S. Notice of Allowance dated Nov. 3, 2020 in U.S. Appl. No. 15/691,468.
U.S. Office Action dated Sep. 30, 2020 in U.S. Appl. No. 16/254,434.
U.S. Office Action dated Jul. 21, 2020 in U.S. Appl. No. 16/523,624.
U.S. Notice of Allowance dated Dec. 31, 2020 in U.S. Appl. No. 16/523,624.
U.S. Office Action dated Jul. 21, 2020 in U.S. Appl. No. 16/555,377.
U.S. Notice of Allowance dated Dec. 31, 2020 in U.S. Appl. No. 16/555,377.
U.S. Office Action dated Aug. 7, 2020 in U.S. Appl. No. 16/338,403.
U.S. Final Office Action dated Dec. 23, 2020 in U.S. Appl. No. 16/338,403.
Taiwanese Office Action dated Feb. 27, 2020 in TW Application No. 108126548.
International Preliminary Report on Patentability dated Oct. 29, 2020 in PCT/US2019/019455.
EP Office Action dated Nov. 19, 2020 in EP Application No. 15758538.1.
CN Office Action dated Oct. 21, 2020 in CN Application No. 201580040461.4.
Australian Office Action dated Aug. 10, 2020 in AU Application No. 2015360714.
Australian Office Action dated Dec. 4, 2020 in AU Application No. 2015360714.
CN Office Action dated Sep. 30, 2020 in CN Application No. 201580072749.X.
IN Office Action dated Nov. 24, 2020 in IN Application No. 201737020192.
JP Examination Report dated Nov. 26, 2020 in JP Application No. 2017-549175.
EP Extended Search Report dated Oct. 1, 2020 in EP Application No. 17858928.9.
EP Extended Search Report dated Nov. 11, 2020 in EP Application No. 18791117.7.
International Preliminary Report on Patentability dated Nov. 12, 2020 in PCT Application No. PCT/US2019/030467.
U.S. Appl. No. 14/468,778, filed Aug. 26, 2014.
U.S. Final Office Action dated Nov. 5, 2020 in U.S. Appl. No. 16/096,557.
U.S. Notice of Allowance dated Jan. 13, 2021 in U.S. Appl. No. 16/096,557.
Chinese Office Action dated Nov. 23, 2020 in CN Application No. 201810932986.4.
Lululemon athletica, "Mirror", The Mirror Gym product brochure, known Dec. 8, 2020, 9 pp, <<https://shop.lululemon.com/story/mirror-home-gym>>, retrieved Jan. 29, 2021.
U.S. Appl. No. 15/733,765, filed Oct. 19, 2020, Shrivastava et al.
U.S. Appl. No. 17/083,128, filed Oct. 28, 2020, Patterson et al.
U.S. Appl. No. 63/080,899, filed Sep. 21, 2020, Makker et al.
U.S. Notice of Allowance dated Feb. 4, 2021 in U.S. Appl. No. 16/253,971.
U.S. Notice of Allowance dated Mar. 10, 2021 in U.S. Appl. No. 15/691,468.
European Office Action dated Feb. 25, 2021 in EP Application No. 15863112.7.
Indian Office Action dated Feb. 24, 2021 in in Application No. 201737021981.
KR Office Action dated Jan. 22, 2021 in KR Application No. 10-2016-7025862.
CN Notice of Allowance with Supplemental Search Report (w/translation) dated Mar. 1, 2021 in CN Application No. 201580040461.4.
EP Office Action dated Jan. 29, 2021 in EP Application No. 15868003.3.
CN Office Action dated Mar. 8, 2021 in CN Application No. 201580072749.X.
U.S. Appl. No. 63/146,365, filed Feb. 5, 2021, Brown et al.
U.S. Appl. No. 63/124,673, filed Dec. 11, 2020, Tai et al.
U.S. Appl. No. 17/249,442, filed Mar. 2, 2021, Shrivastava et al.
U.S. Appl. No. 17/171,667, filed Feb. 9, 2021, Brown et al.
U.S. Appl. No. 63/163,305, filed Mar. 19, 2021, Trikha et al.
U.S. Appl. No. 17/249,148, filed Feb. 22, 2021, Shrivastava et al.

\* cited by examiner

A - Direct Sunlight Penetration
B - Clear Sky Prediction
C - Real-time Irradiance accounting for obstructed and reflected

SITE STATUS DASHBOARD

Site Condition Status Details:
Site Status History:
Window Controller Status Details:

| Details | Name | Status | UpdateDateTime |
|---|---|---|---|
| Details | Location_A | ● | 2/27/2014 5:16:33 AM |
| Details | Location_B | ● | 2/27/2014 5:16:33 AM |
| Details | Location_C | ● | 2/27/2014 5:16:33 AM |
| Details | Location_D | ● | 2/27/2014 5:16:33 AM |
| Details | Location_E | ● | 2/27/2014 5:16:33 AM |
| Details | Location_F | ● | 2/27/2014 5:16:33 AM |
| Details | Location_G | ● | 2/27/2014 5:16:33 AM |
| Details | Location_H | ● | 2/27/2014 5:16:33 AM |
| Details | Location_I | ● | 2/27/2014 5:16:33 AM |
| Details | Location_J | ● | 2/27/2014 5:16:33 AM |
| Details | Location_K | ● | 2/27/2014 5:16:33 AM |
| Details | Location_L | ● | 2/27/2014 5:16:33 AM |
| Details | Location_M | ● | 2/27/2014 5:16:33 AM |
| Details | Location_N | ● | 2/27/2014 5:16:33 AM |
| Details | Location_O | ● | 2/27/2014 5:16:33 AM |
| Details | Location_P | ● | 2/27/2014 5:16:33 AM |
| Details | Location_Q | ● | 2/27/2014 5:16:33 AM |
| Details | Location_R | ● | 2/27/2014 5:16:33 AM |

*Figure 8*

Shows window response to commands issued

Compare state transitions of windows connected to different network controllers.

| ZONE # | WC# | WC ID/BAR CODE | FRAME | IGU # | W | H | SF | NOTES |
|---|---|---|---|---|---|---|---|---|
| ZONE-1 | WC1 | | FRAME-F | W1 | 54 1/8 | 68 1/8 | 25.61 | |
| | WC2 | | | W2 | 54 1/8 | 68 1/8 | 25.61 | |
| | WC3 | | | W3 | 54 1/8 | 68 1/8 | 25.61 | |
| | WC4 | | FRAME-E | W4 | 54 1/8 | 68 1/8 | 25.61 | |
| | | | | W5 | 52 5/8 | 68 1/8 | 24.90 | |
| | | | | W6 | 52 5/8 | 68 1/8 | 24.90 | |
| | WC5 | | | W7 | 52 5/8 | 68 1/8 | 24.90 | |
| | WC6 | | FRAME-D | W8 | 52 5/8 | 68 1/8 | 24.90 | |
| | | | | W9 | 52 5/8 | 68 1/8 | 24.90 | |
| | WC7 | | | W10 | 52 5/8 | 68 1/8 | 24.90 | |
| | | | | W11 | 52 5/8 | 68 1/8 | 24.90 | |
| | WC8 | | FRAME-C | W12 | 52 5/8 | 68 1/8 | 24.90 | |
| | | | | W13 | 52 5/8 | 68 1/8 | 24.90 | |
| | WC9 | | | W14 | 52 5/8 | 68 1/8 | 24.90 | |
| | | | | W15 | 52 5/8 | 68 1/8 | 24.90 | |
| | WC10 | | FRAME-B | W16 | 52 5/8 | 68 1/8 | 24.90 | |
| | | | | W17 | 52 5/8 | 68 1/8 | 24.90 | |
| | | | | W18 | 52 5/8 | 68 1/8 | 24.90 | |
| | WC11 | | | W19 | 52 5/8 | 68 1/8 | 24.90 | |
| | | | FRAME-A | W20 | 52 5/8 | 68 1/8 | 24.90 | |
| | | | | W21 | 52 9/16 | 68 1/8 | 24.87 | |
| | | | | W22 | 52 9/16 | 68 1/8 | 24.87 | |
| | WC12 | | | W23 | 52 9/16 | 68 1/8 | 24.87 | |

*Figure 18A*

MONITORING SITES CONTAINING SWITCHABLE OPTICAL DEVICES AND CONTROLLERS

CROSS REFERENCE TO RELATED APPLICATIONS

This application is a continuation of U.S. patent application Ser. No. 15/691,468, entitled "MONITORING SITES CONTAINING SWITCHABLE OPTIOCAL DEVICES AND CONTROLLERS," filed Aug. 30, 2017, which is a continuation-in-part of U.S. patent application Ser. No. 15/123,069, entitled "MONITORING SITES CONTAINING SWITCHABLE OPTICAL DEVICES AND CONTROLLERS," filed Sep. 1, 2016, which is a national phase application of PCT Patent Application No. PCT/US15/19031, entitled "MONITORING SITES CONTAINING SWITCHABLE OPTICAL DEVICES AND CONTROLLERS," filed Mar. 5, 2015, which claims benefit of U.S. Provisional Patent Application No. 61/948,464, entitled "MONITORING SITES CONTAINING SWITCHABLE OPTICAL DEVICES AND CONTROLLERS," filed Mar. 5, 2014, and U.S. Provisional Patent Application No. 61/974,677, entitled "MONITORING SITES CONTAINING SWITCHABLE OPTICAL DEVICES AND CONTROLLERS," filed Apr. 3, 2014; this application is a continuation-in-part of U.S. patent application Ser. No. 15/534,175, entitled "MULTIPLE INTERACTING SYSTEMS AT A SITE," filed Jun. 8, 2017, which is a national phase application of PCT Patent Application No. PCT/US15/64555, entitled "MULTIPLE INTERACTING SYSTEMS AT A SITE," filed Dec. 8, 2015, which claims benefit of U.S. Provisional Patent Application No. 62/088,943, entitled "MULTIPLE INTERACTING SYSTEMS AT A SITE," filed Dec. 8, 2014; this application is a continuation-in-part of U.S. patent application Ser. No. 14/391,122, entitled "APPLICATIONS FOR CONTROLLING OPTICALLY SWITCHABLE DEVICES," filed Oct. 7, 2014, which is a national phase application of PCT Patent Application No. PCT/US13/36456, entitled "APPLICATIONS FOR CONTROLLING OPTICALLY SWITCHABLE DEVICES," filed on Apr. 12, 2013, which claims benefit of U.S. Provisional Patent Application No. 61/624,175, entitled "APPLICATIONS FOR CONTROLLING OPTICALLY SWITCHABLE DEVICES," filed on Apr. 13, 2012; and this application is a continuation-in-part of U.S. patent application Ser. No. 15/891,866, entitled "MULTIPURPOSE CONTROLLER FOR MULTISTATE WINDOWS," filed Feb. 8, 2018, which is a continuation of U.S. patent application Ser. No. 14/932,474, entitled "MULTIPURPOSE CONTROLLER FOR MULTISTATE WINDOWS," filed Nov. 4, 2015, which is a continuation of U.S. patent application Ser. No. 13/968,258, entitled "MULTIPURPOSE CONTROLLER FOR MULTISTATE WINDOWS," filed Aug. 15, 2013, which is a continuation of U.S. patent application Ser. No. 13/049,756, entitled "MULTIPURPOSE CONTROLLER FOR MULTISTATE WINDOWS," filed Mar. 16, 2011. Each of the above patent applications is incorporated herein by reference in its entirety and for all purposes.

BACKGROUND

Electrically tintable windows such as electrochromic windows, sometimes referred to as "smart windows," have been deployed in limited installations. As such windows gain acceptance and are more widely deployed, they may require increasingly sophisticated control and monitoring systems, as there may be a various systems interacting with smart windows for the benefit of buildings and associated infrastructure. Improved techniques for managing large installations and interacting building systems are necessary.

SUMMARY

Certain aspects of the present disclosure pertain to a building system that includes a plurality of windows, wherein each window has at least one switchable optical device and a window network. The window network includes a plurality of end window controllers, a plurality of intermediate controllers, and a master controller. The plurality of end window controllers is configured to control a tint level of the at least one switchable optical device of each window. Each intermediate controller is configured to couple with one or more of the plurality of end window controllers. The master controller is coupled to a network and is configured to couple with each of the plurality of end window controllers and/or the plurality of intermediate controllers. Control of the switchable optical devices is distributed across the end window controllers, the intermediate controllers, and the master controller. The window network is also configured to control the plurality of windows based at least in part on user input received by the window network.

In some configurations, the window network may be further configured to convey a user request to control the switchable optical devices of the plurality of windows. In some configurations, at least one of the end window controllers, at least one of the intermediate controllers, or the master controller is configured to receive the user input. In some embodiments, the window network may be configured respond to a user's remote control device.

In some embodiments, the system may further include a wall switch connected to the window network and/or one or more of the windows, where the wall switch is configured to issue tint level commands to the one or more of the windows.

In some embodiments, a plurality of sensors may be configured to provide sensor input to the window network. In these cases, the window network may be further configured to control the switchable optical devices of the plurality of windows based at least in part on the sensor input.

In some embodiments, the window network may be further configured to control the switchable optical devices of the plurality of windows based at least in part on information obtained by the window network. In some embodiments, the window network may be configured analyze data gathered from user interactions with the window network and modify a mode of operating the optically switchable devices of at least some of the plurality of windows based on the data gathered from user interactions.

In some embodiments, the window network comprises a firewall. In some embodiments, the master controller is configured to recognize each of the intermediate controllers, each of the end window controllers, and each of the windows.

In some embodiments, the master controller may be configured to override the control of at least one of the controllers and at least one of the end window controllers. Similarly, in some cases, at least one of the intermediate controllers may be configured to override the control of at least one of the plurality of end window controllers.

In some embodiments, each of the end window controllers may be configured to operate in accordance to a first rule set, each of the intermediate controllers may be configured to operate in accordance to a second rule set, and the master controller may be configured to operate in accordance to a third rule set, where the first, second, and third rule sets may be the same or different from each other.

In some embodiments, the distribution of the control of the plurality of windows may be changeable by increasing or decreasing the number of end window controllers or the number of windows.

In some embodiments, the master controller may be configured to authenticate one or more of the end window controllers and/or one or more of the intermediate controllers.

Another aspect of the present disclosure relates to a method that may be implemented on a plurality of sites, wherein at least one of the sites includes a plurality of windows, a plurality of end window controllers, a plurality of intermediate controllers, and a master controller. Each of the windows has at least one switchable optical device, and each of the end controllers is configured to control tint level of one or more of the switchable optical devices. Each intermediate controller is coupled to one or more of the plurality of end window controllers, and the master controller is coupled with each of the intermediate controllers and to an external network. The control of the plurality of windows is distributed across the end window controllers, the intermediate controllers, the master controller, and the external network. The method includes the operations (a)-(c). In operation (a), logic is used to analyze data gathered from at least some of the windows and/or controllers at the plurality of sites and learn a modification and/or a mode of operation. In operation (b), the logic is used to apply the modification to at least one of the sites such that the control of the windows is based in part on the modification and/or mode of operation learned by the logic. In operation (c) the data gathered from at least some of the plurality of windows and/or controllers at the plurality of sites is provided to the external network.

In some cases, the sites include a plurality of sensors. The data gathered may include sensor data from the sensors at the sites and/or data on energy savings for at least one of the sites.

In some cases, the learned modification and/or mode of operation may be based at least in part on a user preference. In some cases, that method may include responding to a remote-control device.

In some cases, at least one of the sites includes a plurality of communication interfaces coupled with the end window controllers.

In some cases, the master controller may be configured to utilize the logic for applying control algorithms that incorporate the data collected on the external network. In some cases, the master controller may be configured to couple with at least one third-party device for sending and receiving control signals.

In some cases, control of the windows may employ the data gathered and provided to the external network. In some cases, the control of the windows may be based at least in part on a user input provided via the external network.

In some cases, control of the windows may be redistributed amongst the end window controllers, intermediate controllers, and the master controller by increasing or decreasing the number of the end window controllers or windows. In some cases, control of the windows may be based at least in part on a user input.

In some cases, analyzing data includes analyzing data gathered on weather for at least one of sites and control of the windows is based at least in part on weather data. In some cases, by controlling the windows, a temperature of at least one of the sites may be controlled.

These and other features and advantages will be described in further detail with reference to the associated drawings.

BRIEF DESCRIPTION OF THE DRAWINGS

FIG. 8 shows an example of a dashboard for site monitoring system.

FIGS. 18A-H present information used by a site monitoring system to detect and analyze a problem with a window controller in a group of controllers for windows on a single façade.

DETAILED DESCRIPTION

Figure 1A:
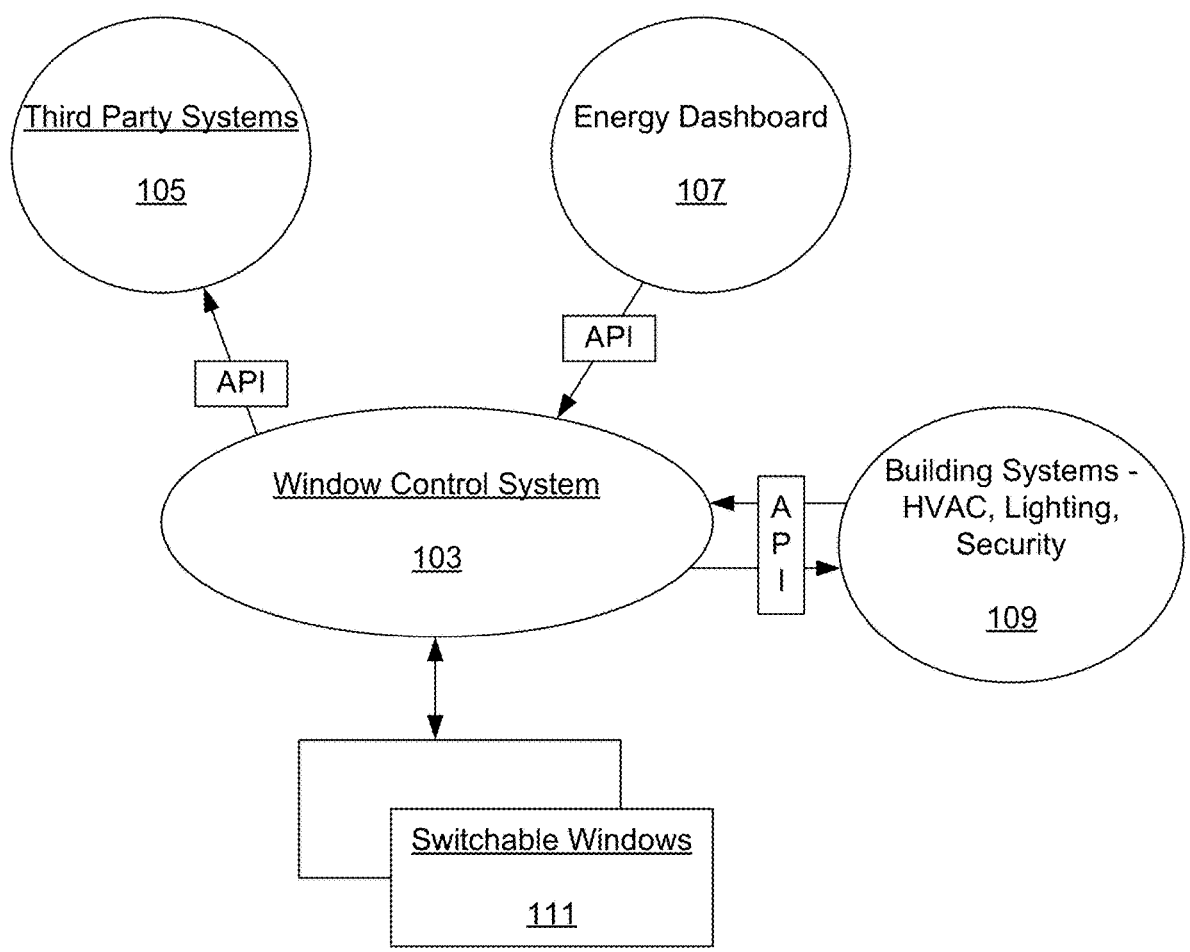
FIG. 1A is a block diagram of interacting systems, including a window system, interfacing with one another via APIs.

This document describes, inter alia, a platform for communicating among one or more otherwise independent systems involved in controlling functions of buildings or other sites having switchable optical devices deployed therein and a platform for monitoring one or more buildings or other sites having switchable optical devices deployed therein. Such independent systems include a window control system and one or more other independent systems such as systems that control residential home products (e.g., NEST (Nest Labs of Palo Alto, Calif.), which controls thermostats, smoke alarms, etc.), HVAC systems, security systems, lighting control systems, and the like. Together the systems control and/or monitor multiple features and/or products, including switchable windows and other infrastructure of a site, which may be a commercial, residential, or public site. Networks and related infrastructure that may be used with the disclosed embodiments are presented in FIGS. 1A-E, as well as in U.S. Provisional Patent Application No. 62/085,179, filed Nov. 26, 2014, and in U.S. patent application Ser. No. 14/951,410, filed Nov. 24, 2015, both incorporated herein by reference in its entirety.

In some cases, a site has one or more controllers that control the switching of one or more deployed devices. The site may also have sensors such as light sensors, thermal sensors, and/or occupancy sensors that provide data used in making decisions about when and by how much to switch the devices. In certain embodiments, the site employs switchable optical devices such as electrochromic devices on structures such as windows and/or mirrors. In the description that follows, switchable optical devices are often referred to as "windows" or "electrochromic windows." It should be understood that such terms include structures other than windows that have switchable optical devices. Further, the switchable devices are not limited to electrochromic devices, but include such other switchable devices as liquid crystal devices, electrophoretic devices, and the like, which may be non-pixelated.

Typically, one of the interacting systems is a window control network. The interacting systems of a site may use sensor output or other information of one system to make decisions about the operation of a different system. Further, a system may analyze information it collects from a site (or sites) to provide control instructions or other instructions for a different system. One system may, if appropriate, control the functioning of elements of a different system. For example, a window control system may send instructions to a lighting system and/or an HVAC system to adjust the lighting level or air conditioning level in a room or zone where the window system controls tint levels of windows. To permit the independent systems to interact they may need to express their properties and/or functions via Application Programming Interfaces (APIs).

Systems employ APIs to allow external systems to access data and/or functions that are otherwise opaque to the external systems. APIs provide syntax and a portal to permit the access. For example, an API for a window control system may allow access to window sensor data (e.g., temperature) through a URL, user name, and handshake. HomeKit compliant definitions provide APIs for controlling Apple (Apple Inc. of Cupertino, Calif.) home appliances and Thread compliant definitions provide APIs for controlling appliances of many other technology companies including NEST and Samsung (Samsung Group of Seoul, South Korea). Thread and HomeKit define standard connection protocols for messaging.

In some embodiments, the window control system can be or include a site monitoring system. A site monitoring system may analyze information from sites to determine when a device, a sensor, or a controller has a problem. The system may, if appropriate, act on the problem. In certain embodiments, the system learns customer/user preferences and adapts its control logic to meet the customer's goals.

In a related way, the system may learn how to better conserve energy, sometimes through interaction with a site's lighting and/or HVAC systems, and then modify the controller settings accordingly. By doing this over multiple sites, the system may learn entirely new energy control methods, which it can deploy on other sites. As an example, the system may learn how to control heating load when confronted with a type of rapidly changing weather (e.g., a storm). Through experience, the system learns how to adjust window tinting, e.g. at sites where storms occur frequently, and then apply its learned mode of adjustment to other sites when storms occur there. The system may, in turn, learn something new from adjusting window tint at the latter storm site and relay that learning to the previous or other sites.

In certain embodiments, the site monitoring system includes a dashboard that flags sites with windows, sensors, and/or controllers that are out of specification. The dashboard allows a technician to view the details of a flagged window, sensor, or controller and see the log or performance data of the component. Thus the system allows for proactive and/or prophylactic adjustment and/or repair of a window, sensor or controller, e.g. before the end user may realize the performance of the unit is out of specification. In this way, a better end user experience is realized.

Terminology

An "optically switchable device" or "switchable optical device" is a thin device that changes optical state in response to electrical input. It reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

Examples of optically switchable devices include electrochromic devices, certain electrophoretic devices, liquid crystal devices, and the like. Optically switchable devices may be provided on various optically switchable products, such as windows, mirrors, displays, and the like. In certain embodiments, these products are typically provided in a non-pixelated format.

An "optical transition" is a change in any one or more optical properties of an optically switchable device. The optical property that changes may be, for example, tint, reflectivity, refractive index, color, etc. In certain embodiments, the optical transition will have a defined starting optical state and a defined ending optical state. For example, the starting optical state may be 80% transmissivity and the ending optical state may be 50% transmissivity. The optical transition is typically driven by applying an appropriate electric potential across the two thin conductive sheets of the optically switchable device.

A "starting optical state" is the optical state of an optically switchable device immediately prior to the beginning of an optical transition. The starting optical state is typically defined as the magnitude of an optical state which may be tint, reflectivity, refractive index, color, etc. The starting optical state may be a maximum or minimum optical state for the optically switchable device; e.g., 90% or 4% transmissivity. Alternatively, the starting optical state may be an intermediate optical state having a value somewhere between the maximum and minimum optical states for the optically switchable device; e.g., 50% transmissivity.

An "ending optical state" is the optical state of an optically switchable device immediately after the complete optical transition from a starting optical state. The complete transition occurs when optical state changes in a manner understood to be complete for a particular application. For example, a complete tinting might be deemed a transition from 75% optical transmissivity to 10% transmissivity. The ending optical state may be a maximum or minimum optical state for the optically switchable device; e.g., 90% or 4% transmissivity. Alternatively, the ending optical state may be an intermediate optical state having a value somewhere between the maximum and minimum optical states for the optically switchable device; e.g., 50% transmissivity.

"Bus bar" refers to an electrically conductive strip attached to a conductive layer such as a transparent conductive electrode spanning the area of an optically switchable device. The bus bar delivers electrical potential and current from an external lead to the conductive layer. An optically switchable device includes two or more bus bars, each connected to a single conductive layer of the device. In various embodiments, a bus bar forms a long thin line that spans most of the length of the length or width of a device. Often, a bus bar is located near the edge of the device.

"Applied Voltage" or $V_{app}$ refers the difference in potential applied to two bus bars of opposite polarity on the electrochromic device. Each bus bar is electronically connected to a separate transparent conductive layer. The applied voltage may different magnitudes or functions such as driving an optical transition or holding an optical state. Between the transparent conductive layers are sandwiched the optically switchable device materials such as electrochromic materials. Each of the transparent conductive layers experiences a potential drop between the position where a bus bar is connected to it and a location remote from the bus bar. Generally, the greater the distance from the bus bar, the greater the potential drop in a transparent conducting layer. The local potential of the transparent conductive layers is often referred to herein as the $V_{TCL}$. Bus bars of opposite polarity may be laterally separated from one another across the face of an optically switchable device.

"Effective Voltage" or $V_{eff}$ refers to the potential between the positive and negative transparent conducting layers at any particular location on the optically switchable device. In Cartesian space, the effective voltage is defined for a particular x,y coordinate on the device. At the point where $V_{eff}$ is measured, the two transparent conducting layers are separated in the z-direction (by the device materials) but share the same x,y coordinate.

"Hold Voltage" refers to the applied voltage necessary to indefinitely maintain the device in an ending optical state.

Figure 3:
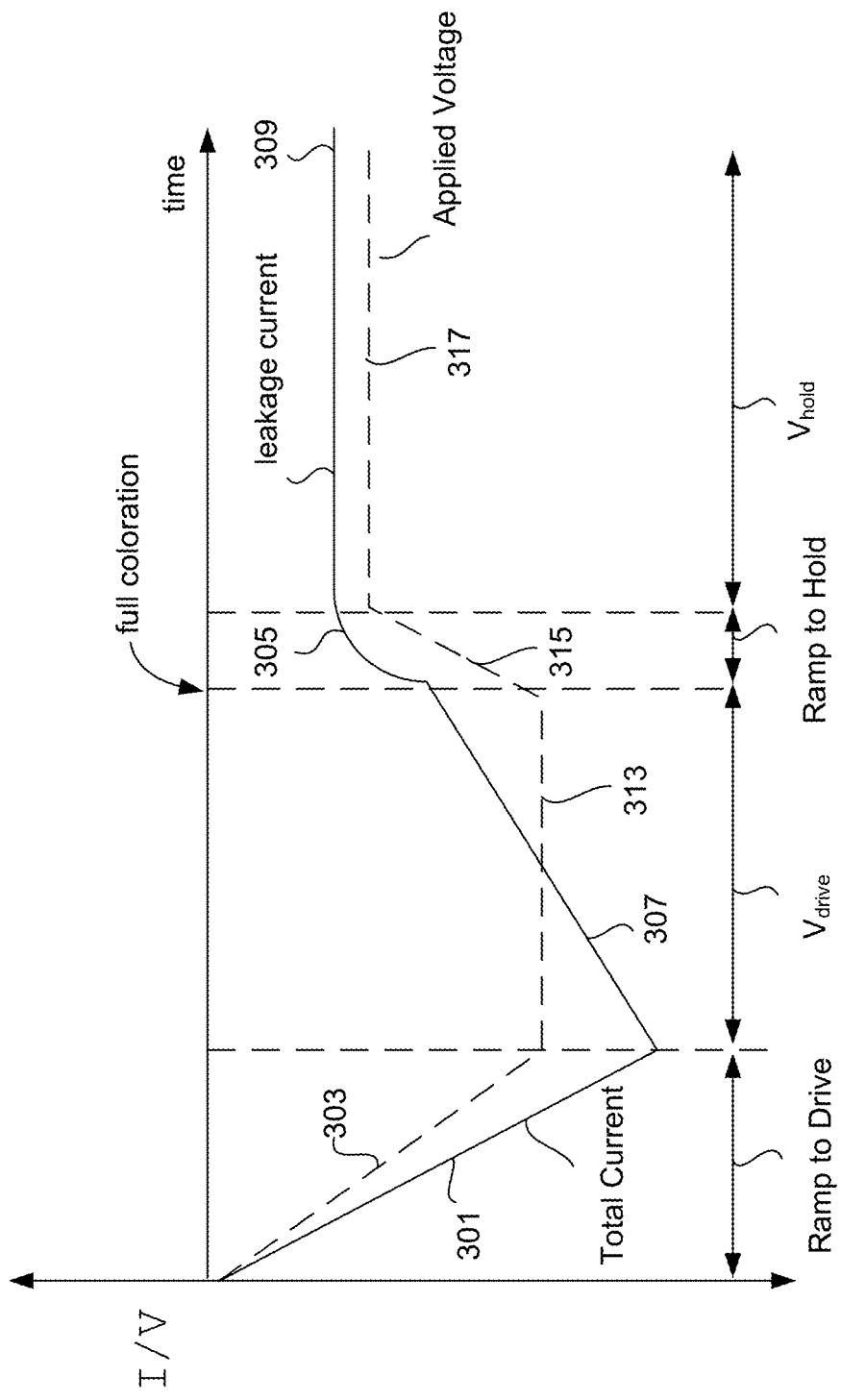
FIG. 3 is a graph depicting certain voltage and current profiles associated with driving an electrochromic device from bleached to colored.

"Drive Voltage" refers to the applied voltage provided during at least a portion of the optical transition. The drive voltage may be viewed as "driving" at least a portion of the optical transition. Its magnitude is different from that of the applied voltage immediately prior to the start of the optical transition. In certain embodiments, the magnitude of the drive voltage is greater than the magnitude of the hold voltage. An example application of drive and hold voltages is depicted in FIG. 3.

A window "controller" (sometimes referred to as an "end" controller) is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite.

In some embodiments, a window controller can power one or more electrochromic devices in an electrochromic window. In certain embodiments, this function of the window controller is augmented with one or more other functions such as antenna transceiver functionality and/or other functions described below. Window controllers described herein may provide power to switch the optical state of a device. For example, the controller has its own power source and directs application of power from the window power source to the window. In other embodiments, the power source for the optically switchable device may be separate from the window controller. However, it is convenient to include a power source with the window controller and to configure the controller to power the window directly, because it obviates the need for separate wiring for powering the electrochromic window.

Further, the window controllers described herein may be standalone controllers which may be configured to control the functions of a single optically switchable window or a plurality of such windows, without integration of the window controller into a network such as a building control network or a building management system (BMS). Window controllers, however, may be integrated into a window network, a building control network, a BMS, or other system.

A "site" refers to a building or other location of installed switchable optical devices. The switchable devices are provided in a network and operated under the control of one or more algorithms that collectively make up a window control system. In some implementations, a site may be monitored and/or controlled by a site monitoring system. Transitions from one optical state to another may be dictated by programs or logic such as that described in U.S. patent application Ser. No. 13/772,969, filed Feb. 21, 2013, which is incorporated herein by reference in its entirety. A site may have other systems that communicate with the window control network. Examples of the other systems include lighting systems, HVAC systems, fan systems, security systems, and smart thermostat service or other home appliance service. In some cases, the other system is a user-customizable interface for controlling devices in one a plurality of systems. For example, a user may have window tinting, room temperature, and lighting preferences that attach for the user. Such preferences may be triggered by the user's manual input, e.g., via a mobile device, or a system detecting the user's proximity, e.g., through communication with the user's worn digital sensor or smart mobile phone when the user enters a room or zone. Examples of sites include residential buildings, office buildings, schools, airports, hospitals, government buildings, etc. Its rooms may have network controlled thermostats such as those provided by NEST.

In some implementations, one or more control functions (e.g., algorithms) are used to control the switchable devices and may be implemented on the site by one or more window controllers, network controllers, and/or master controllers (sometimes referred to as a master network controllers or master window controllers). As described further below, the system may send and/or retrieve data to any or all of these controllers depending upon the particular setup at each site that the system monitors. For example, the system may communicate with a master controller at one site, while communicating with network controllers at another site. In some cases, a site monitoring system may be configured to communicate directly with an end or leaf window controller. For example, a site monitoring system may be configured to assume control over optically switchable devices by communicating directly with a window controller when an intermediate controller (e.g., a master controller or a network controller) is unresponsive or offline but electrical power is still available to the window controller. This may occur, for instance, if a master controller loses power, but a window controller continues to operate on reserve battery power. The site monitoring system may additionally be configured to return control of optically switchable devices to the intermediate controller once the intermediate controller becomes responsive. A site monitoring system may temporarily exercise direct control over a window controller when, for example, new firmware is being installed on the intermediate controller, or when the intermediate controller loses power. In another example, the system communicates only with master controllers at all sites. In yet another example, the system may communicate indirectly with one or more window controllers at a site, for example, the system may communicate directly with a BMS which relays window controller data to the system and vice versa.

"Window control system" refers to a network or system that controls one or more optical switchable devices such as windows at a particular site and accesses and/or maintains data relevant to controlling the windows. A window control system may also be referred to as a window intelligence system, a window network, or simply a window system. In some implementations, a window control system may be monitored and/or controlled by a site monitoring system, or a processing center that communicates with multiple sites. It may receive data about the switchable optical devices and associated controllers and sensors at one or more sites, and from this data, make decisions about switching the devices. It may send data and/or control messages to the windows on the site(s). It may also detect and/or present potential problems, identify trends in the performance of devices and/or controllers, modify algorithms for controlling the switchable optical devices, etc. In some implementations, the site monitoring system is located remotely from one or more of the multiple sites that it monitors. In disclosed embodiments, a window control system interacts with other systems. Window control systems are further described below, including the description of FIGS. 1A-E. Various examples of window control systems suitable for use with this disclosure include those described in U.S. Pat. No. 8,705,162, filed Apr. 17, 2012, U.S. patent application Ser. No. 14/951,410, filed Nov. 24, 2015, and U.S. Provisional Patent Application No. 62/248,181, filed Oct. 29, 2015, each incorporated herein by reference in its entirety.

"Monitoring" refers to the collection of information by a window control system or a site monitoring system. The information may relate to sensors, windows, controllers, and other connected systems. Monitoring provides a site management system with information about the sites it services. Monitoring may also involve analysis of collected data for, e.g., identification of patterns, trends, and various calculated parameters. In some cases, information collected through monitoring is used by a site monitoring system to determine how to control devices and/or systems at sites being monitored.

"Controlling" refers to operating a system or device by transmitting a control signal, instructions, and/or a driving signal that causes a controlled system or device to operate in an intended fashion. The operation of an optically switchable window is controlled by a window controller which may be controlled by another controller on a window control network. In some cases, one or more window control networks may be controlled by a site monitoring system.

APIs for Window Control Systems

FIG. 1A shows a window control system 103, and associated windows 111, and other systems associated with a site. The figure illustrates the multiple interacting systems and the interfaces between them. As mentioned, the other systems that interface with the window system 103 include third party systems 109 such as HVAC systems, security systems, and lighting systems. Window control system 103 may also interface with building control service entities 105 such as NEST. Still, further, system 103 can interface with third party dashboards 107, which may be used by consultants, etc. to present monitoring and/or performance information about one or more sites. The services provided by any of these systems (103, 105, 107, and 109) may be hosted at any of various locations. For example, they may be hosted locally on an internal server and associated databases, or they may be hosted externally on a leased or owned virtualized collection of servers (e.g., a cloud-based service). FIG. 1A shows the logical positions at which APIs may exist between the entities. Firewalls can exist at any of these locations. In various embodiments, "third party systems," the "building control service entities," and the "dashboards" are systems that are controlled by entities other than the entity that controls the window control system. However, this is not necessarily case. A third party system may simply be a system that has its own physical and/or logical infrastructure that is wholly or partially separate from the infrastructure(s) of the window control network.

In some embodiments, APIs allow external systems to view data collected by the window system. This includes data directly collected by the window system and also includes information relevant to the external systems and derived by the window system from the raw data it collects.

In some embodiments, APIs allow the window control system to access and control third-party systems. For example, a lighting control system may provide an API that under certain conditions allow the window control system to access the lighting control system. In some implementations, the window control system employs associated heuristics that permit or trigger the window control system to control aspects of the external system via an API.

In some embodiments, APIs allow external systems to control aspects of a window control system such as tinting of windows in a particular zone. As with the prior case, there may be particular conditions that trigger the allowance of the external system to access the functionality of the window control system.

In general, an API interface is deployed or executes on a device or system remote from the window controller of a window control system. For example, the API may execute at the cloud level or master controller level in window control network. However, this need not be the case, and in fact, it may be desirable to have the API execute at the window controller (or have the window controller contain fail over API processing capability) to maintain inter-system communications in the event of loss of window network functionality. In such implementations, the local window controller(s) can locally communicate with third party systems and maintain comfort and service for an occupant.

In some embodiments, when the external network is down due to a network outage, server failure, or other reason, the window network will continue to function without requiring information gathered from the external network. For example, the window network can continue to make and/or implement tinting control decisions. While during normal operation, the window network may employ information or commands from the external network, the window network may be configured to operate autonomously when the external network becomes unavailable. Such functionality may be implemented in one or more end window controllers, intermediate network controllers, and/or a master controller, any of which may normally communicate, directly or indirectly, with one another and external systems.

In some embodiments, in the event of window network device or external network failure, operation of the window control system may be maintained through scheduled orders or events. Window system control instructions can be scheduled to occur at particular times of day or in response to specific events. Thus continuity of window control operations is maintained even if devices or the external network fails. Examples of scheduling are described below.

Examples of APIs for Window Control Systems

1. A window control system provides raw collected information and/or processed information derived from the raw information to an interfacing system:
   a) Sent information may include sensed data, predicted events, and site and device product and set up information.
   b) Examples (any of these by window, zone, façade, side of a building or other site):
   Temperature—interior or external
   Sensed solar irradiance—directional
   Interior photosensors—glass or mullion
   Solar heat gain,
   Occupancy—IR, motion,—number of persons in the room
   Solar calculator (angle, intensity)—azimuthally, inclination
   Weather—cloud cover
   Snow on the ground—frozen lake
   Site and device set up information—Examples follow:
     GET/sites present metadata about sites, including applicable ip addresses
     GET/site/{site_id} presents metadata about a specific site and the zone groups and zones within that site
     GET/zone/{zone_id} presets information about a specific zone, what devices and services are available, etc.
   c) The interfacing system receiving this information may use this information to make decisions for controlling and otherwise managing its own equipment (not windows).
   d) The interfacing system can present this information in its own dashboard.
   e) The set up information enables peer interfacing systems to provide services within the context of the window zones that the site owner has invested in setting up. For example, the site owner can set up zone information once and use the same zones in controlling lighting, heating, home appliances, etc. Zones for window control systems are described further in the context of PCT Patent Application No. PCT/US13/36456, filed Apr. 12, 2013, and incorporated herein by reference in its entirety.

2. The window control system provides its own window tinting information (current and/or future) to an interfacing system:
   a) E.g., the window network will increase tint in the windows of zone Z by 30% at time X. The transition will take time T.
   b) The information can be provided per zone or with other set up information about the site. This aspects of 1 (e) apply.
   c) The interfacing system receiving this information may use this information to make decisions for controlling and otherwise managing its own equipment (not windows).
   d) The interfacing system can present this information in its own dashboard.

3. A window control system provides value added content to an interfacing system:
   a) The window network uses its available information such as sensor data and current and future tint levels (per window, zone, etc.) to determine value added content useful to interacting, non-window, systems.
   b) Examples of such content include:
   For HVAC, the amount of energy coming through the façade as sensed and/or predicted with a solar calculator. Granularity (per floor, per direction)—based on time as well. Calculate number of BTUs that they need to provide. Heating/cooling BTUs required for a façade or window opening.
   For a smart home appliance service—provide temperature gradient determined from temperature at thermostat and temperature at a window. Large difference might suggest that the interfacing system needs to bump up the heating (or cooling) for comfort.
   For a lighting control system—provide suggested lighting levels determined by, e.g., how much light from windows and at what direction, solar calculator, environmental conditions (clouds, snow, reflection), occupancy, user initiated tinting decisions, etc.
   c) The interfacing system receiving this information may use this information to make decisions for controlling and otherwise managing its own equipment (not windows).
   d) The interfacing system can present this information in its own dashboard.

4. The window control system exposes its functionality:
   a) An interfacing system, such as a smart home appliance control service, a lighting system, or a security system may make tinting decisions based on its own needs and/or may send window tint level commands to the window network (without BACnet)
   b) Home automation example—the window control system allows a smart thermostat (or other home appliance) service (e.g., NEST) to control of window tinting. This may be based on time of day, occupancy, and other types of information that the smart home appliance service has and uses. Similarly, embodiments allow remote control of thermostat and tinting. Embodiments allow vacation mode in an external service to clear windows and allow in light to reduce the likelihood of pipes freezing. Embodiments allow a security company to darken home windows at certain times, and allow lights to come on. Embodiments allow clearing of windows at 10 PM so neighbors can see in the house.
   c) Security/occupancy example—a window control system allows control of our window system such as dark in lock down and clear in a burglary.

d) The window control functionality can be exposed per zone or with other set up information about the site. This aspects of 1 (e) apply.

5. A window control system controls the equipment of an interfacing system:

a) For example, a lighting or air conditioning system gives the window control system permission to control lighting or air conditioning based on tinting/clearing decisions.

Heat is generated by electrical equipment such as televisions, computers, and office equipment. Sensing plug loads (office equipment, etc.) may be enabled by the site providing load sensors (real-time power monitors for each area of interest). These sensors may be part of the HVAC or lighting system. In certain embodiments, the window control systems accesses devices from such systems (via an API) and gathers information from them, then combines that information with other data it collects and uses the result to control the interfacing system's devices. For example the window system may read plug loads and combine it with the incident energy striking the façade and the current HVAC heating/cooling BTUs to optimize energy use in that location.

b) Examples providing control over networked thermostat:

The window control system instructs the thermostat to back off air conditioning when the window system has reduced or will begin reducing heat load through window tinting.

Sensors in window control system detect occupancy by, e.g., BLE (Blue Tooth Low Energy) beacons deployed in window controllers and/or wall interfaces. With this information, the window control system instructs a thermostat to change its mode from away mode to home mode.

c) The window control system may exercise the control by making calls to the interfacing system's API (e.g., a thermostat control API). Alternatively, the interfacing system may subscribe to the window control system's API, and based on information provided from the window control system take action.

6. A user-customizable system interfaces with the window control system and other peer systems. The user-customizable system presents a user's preferences to control devices on site systems and causes them to enter states pre-defined by the user.

a) For example, a user may have window tinting, room temperature, and lighting preferences that attach for the user.

b) Such preferences may be triggered by the user's manual input, e.g., via a mobile device, or a system detecting the user's proximity, e.g., through communication with the user's worn digital sensor or smart mobile phone when the user enters a room or zone.

Window Control Systems

Figure 1B:
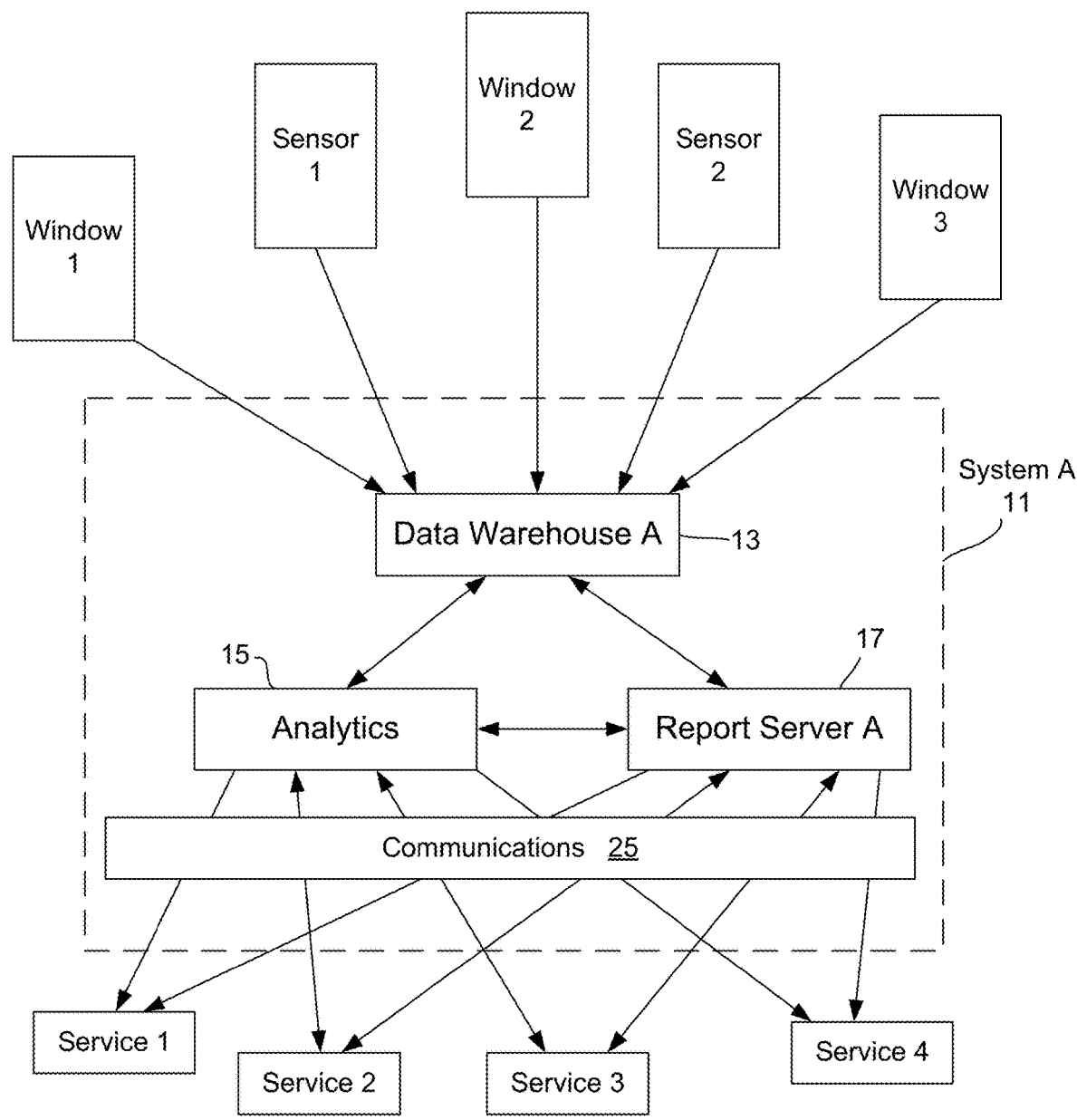
FIG. 1B is a block diagram of a smart window system for interfacing with external systems.

One example of a window control system appropriate for interfacing with other systems is depicted in FIG. 1B. As shown there, the interfacing logic of a window system A11 interfaces with multiple window controllers (1-3), sensors (1-2), and optionally other infrastructure associated with the switchable windows and controllers. System A11 may access the window controllers, sensors, and other infrastructure via a window controller network, which may be configured as described elsewhere herein. System A11 also interacts with multiple external systems or services 1-4 (e.g., a smart home appliance network service (e.g., NEST) or HVAC system) accessible through workstations, portable computers, mobile devices such as smartphones, and the like, each able to send and/or receive information relevant to its function. In some implementations, a service or system may be permitted access to only a subset of the information available to the window system.

Figure 1C:
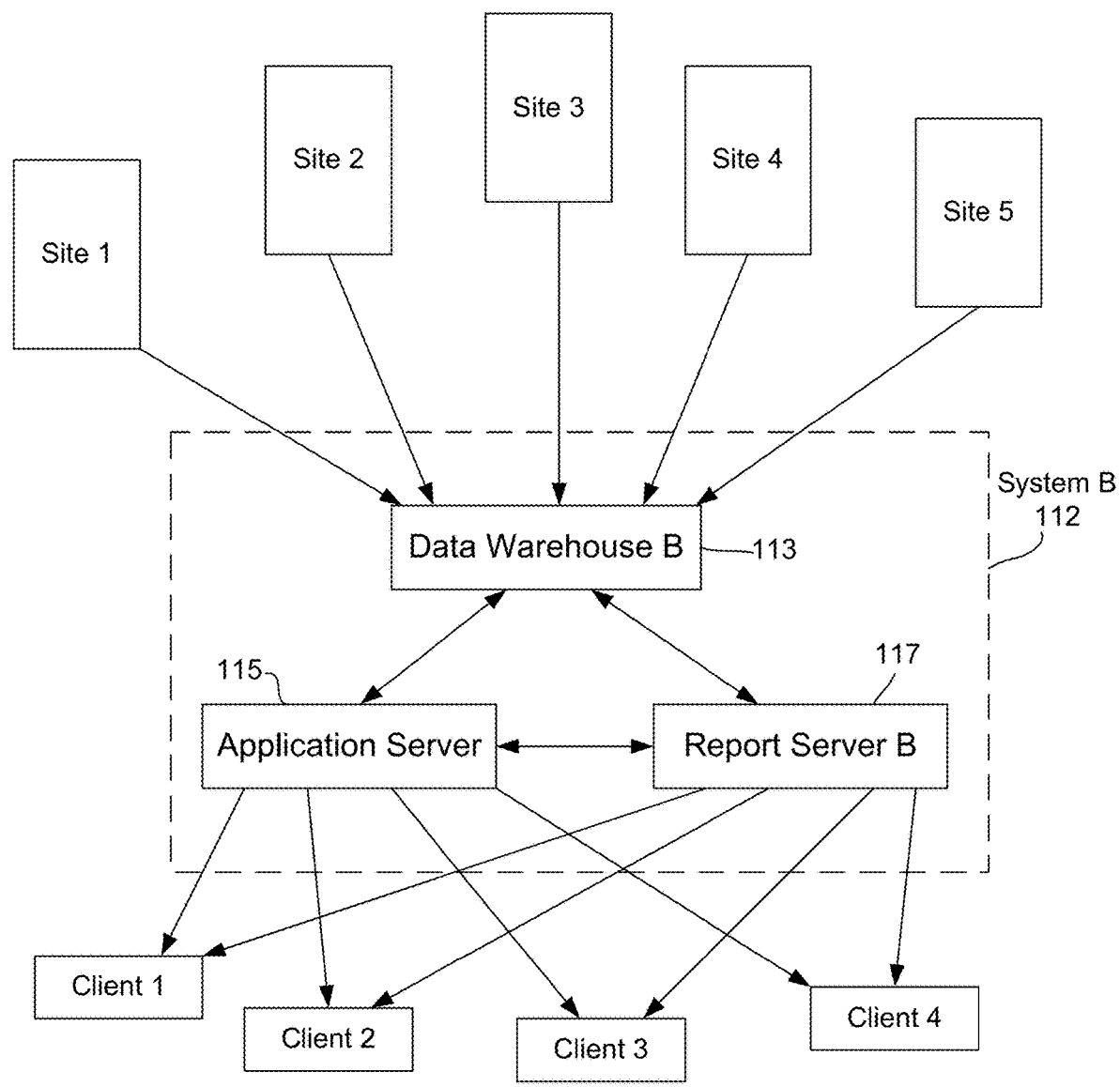
FIG. 1C is a block diagram of a network hierarchy with a monitoring network controller.

In some implementations, one or more sites may be monitored or controlled by a site monitoring system. As shown in FIG. 1C, a site monitoring system B112 interfaces with multiple monitored sites—sites 1-5. Each site has one or more switchable optical devices such as electrochromic windows and one or more controllers designed or configured to control switching of the windows. The site monitoring system B112 also interfaces with multiple client machines—clients 1-4. The clients may be workstations, portable computers, mobile devices such as smartphones, and the like, each client able to present information about the functioning of devices in the sites. Personnel associated with site monitoring system B112 may access this information from one or more of the clients. In some instances, the clients are configured to communicate with one another. In some implementations, personnel associated with one or more sites may access a subset of the information via a client. In various implementations, the client machines run one or more applications designed or configured to present views and analysis of the optical device information for some or all of the sites.

System A11 and system B112 may be implemented in various hardware and/or software configurations. In the embodiment depicted in FIG. 1B, system A11 includes a data warehouse A13, an analytics server 15, and a report server A17. In that example, the data warehouse interfaces directly with the window controllers and/or sensors by, e.g., a window control network containing a hierarchy of controllers are described below with reference to FIGS. 1D-F. The data warehouse stores data from these features in a relational database or other data storage arrangement. In the embodiment depicted in FIG. 1C, system B112 includes a data warehouse B113, an application server 115, and a report server B117. In some embodiments, the data is stored in a database or other data repositories such as an Oracle DB, a Sequel DB, or a custom designed database. Data warehouse A13 may obtain information from any of a number of sensor and controller types such as those described elsewhere herein. Data warehouse B113 may obtain information from any of a number of entities such as master controllers at the sites. In the embodiment depicted in FIG. 1B, analytics server 15 and report server A17 interface with the external systems to provide services and reports, respectively. In FIG. 1C, application server 115 and report server B117 interface with clients to provide application services and reports, respectively. In some embodiments, report server A17 and report server B117 run Tableau, Jump, Actuate (Open Text), or a custom designed report generator. In the embodiment depicted in FIG. 1B, data warehouse A13 and analytics server 15 each provides information to report server A17. Similarly, in FIG. 1C, data warehouse B 113 and analytics server 115 each provide information to report server B117. In the embodiment depicted in FIG. 1B, communication between data warehouse A13 and analytics server 15 is bidirectional. The interface with the external services and/or systems may be made via a communications interface 25 configured with logic for using APIs for each of the external services/systems. Depending on the respective requirements of the window intelligence system A11 and the external systems/services, the communications between them may be bidirectional or monodirectional. The window intelligence system may interface with the external systems/services via a wireless connection or a cable connection implemented in communications block 25. In the embodiment depicted in FIG. 1C, communication between data warehouse B113 and application server 115 is bidirectional, as is communication between data warehouse B113 and report server B117 as well as application server 115 and report server B117.

Figure 1D:
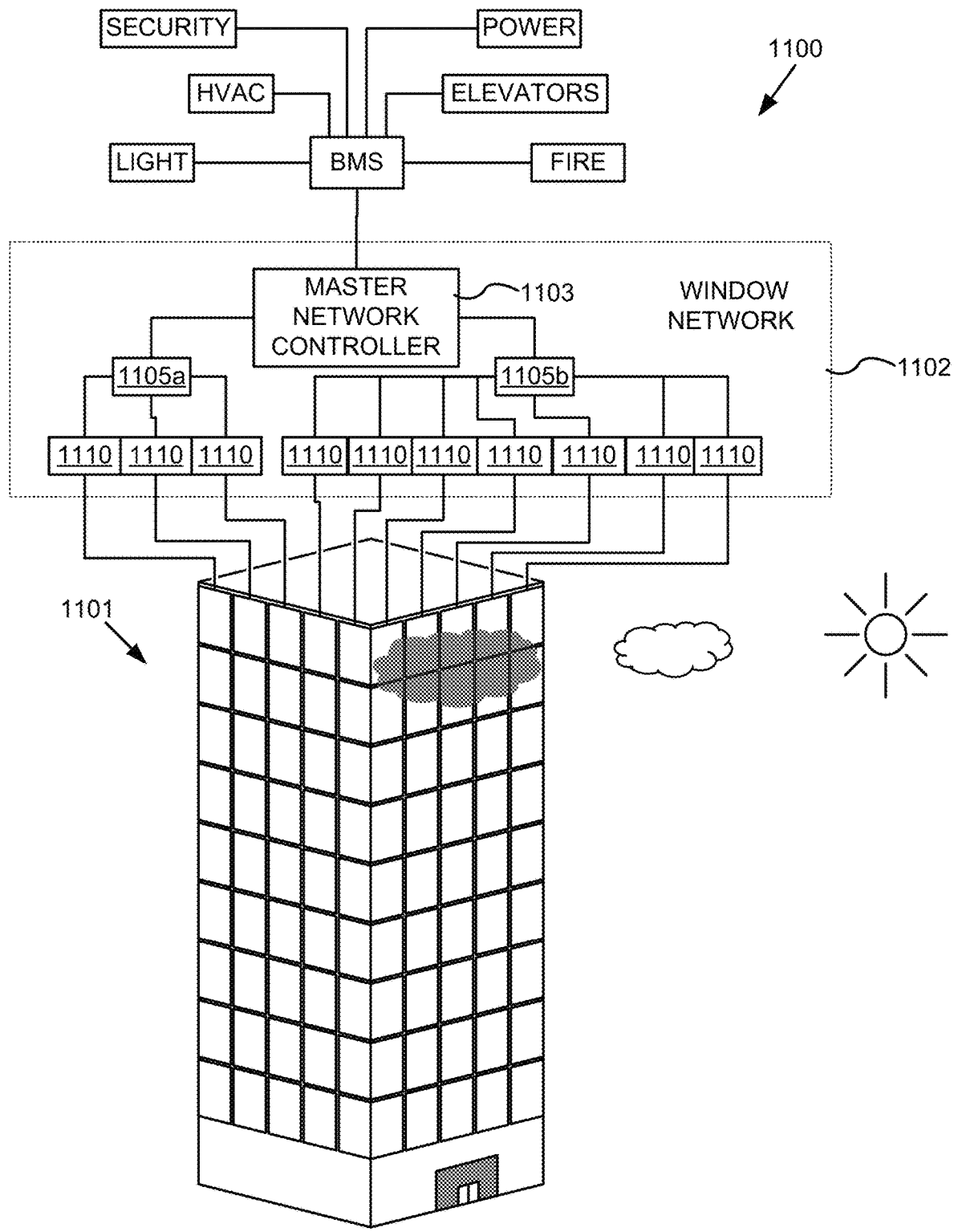
FIG. 1D depicts a schematic diagram of an embodiment of a site with a building management system (BMS) for interacting with a window control network.
Figure 1E:
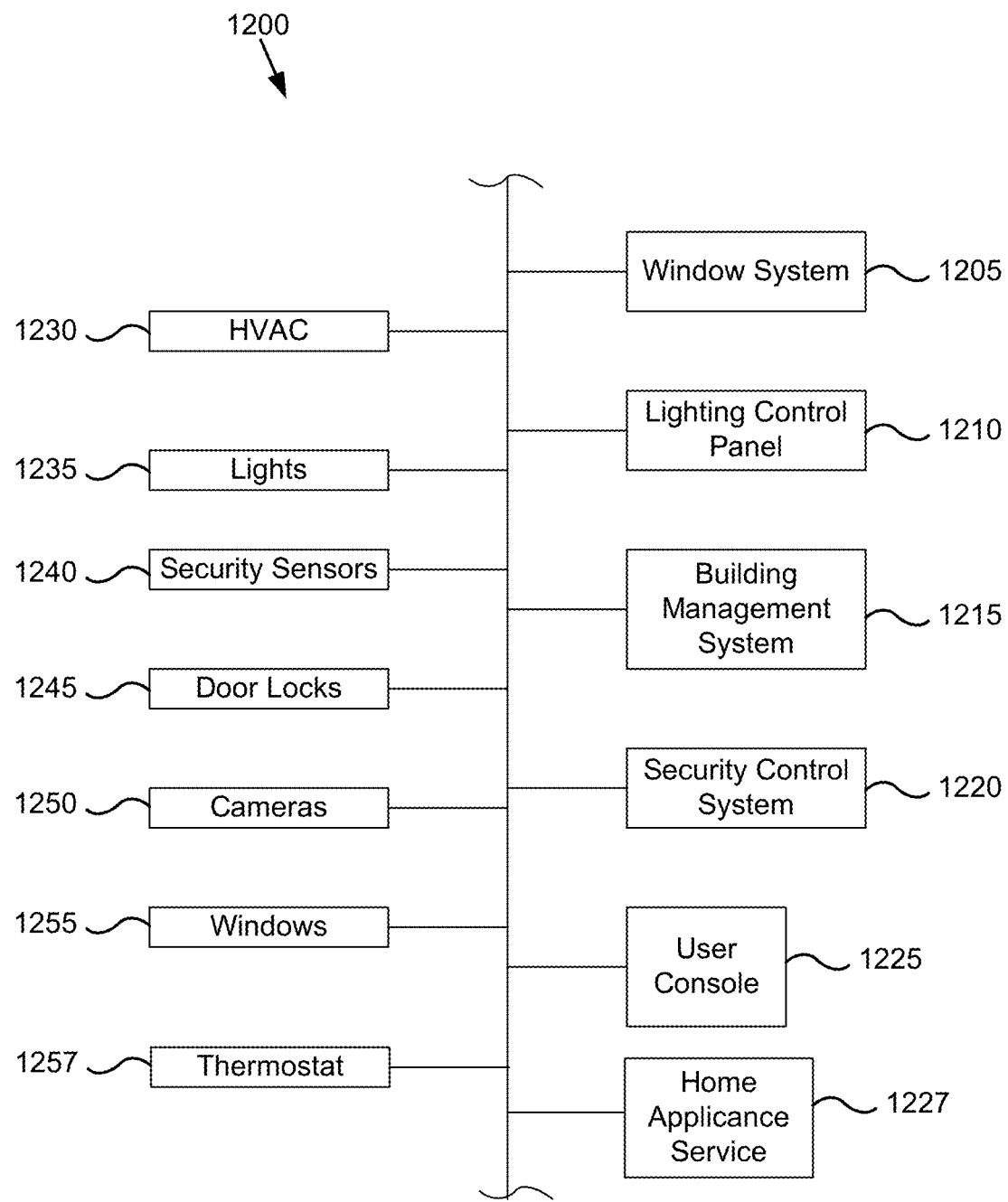
FIG. 1E depicts a block diagram of a building network.
Figure 1F:
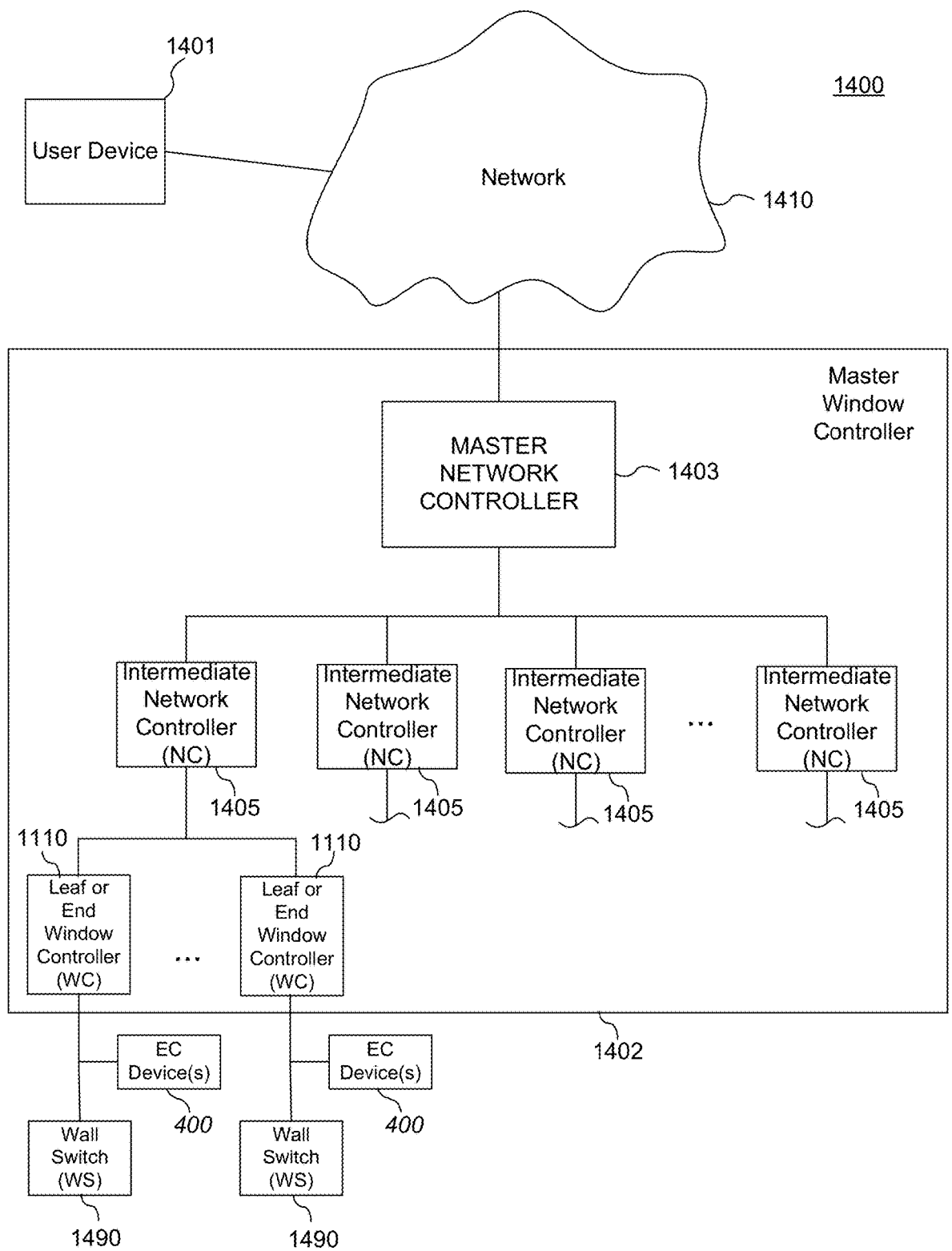
FIG. 1F is a diagram of components of a window network for controlling functions of one or more tintable windows of a building.

Example configurations of window control systems are shown in FIGS. 1D-F and discussed below. Typically, a window control system will include multiple switchable optical devices, each directly controlled by a controller, multiple sensors such as illumination sensors, and one or more higher level controllers such as network controllers and master controllers.

In certain embodiments, the window intelligence system A11 is implemented in the "cloud." The system can be centralized or distributed and can be accessed from anywhere using client application by authorized personnel. The various components of the system may be located together or apart in one or more sites, a location remote from all sites and/or in the cloud. Additional features, functions, modules, etc. of the system A11 may include a data and event reporter and a data and event log and/or a database.

In certain embodiments, the site monitoring system B112 may include one or more interfaces for communicating with the remote sites. These interfaces are typically ports or connections for securely communicating over the internet. Of course, other forms of network interfaces may be used. The data may be compressed before sending from a site to the site monitoring system. The site monitoring system may interface with the individual sites via a wireless connection or cable connection. In certain embodiments, window intelligence system A 11 and site monitoring system B112 are implemented in the "cloud." Window intelligence system A11 and site monitoring system B112 can be centralized or distributed and can be accessed from anywhere using client application by authorized personnel. The various components of each system may be located together or apart in one or more sites, a location remote from all sites and/or in the cloud. Additional features, functions, modules, etc. of the site monitoring system may include a data and event reporter, a data and event log and/or a database, data analyzer/reporter, and communicator.

While in many embodiments, all or most of the site data analysis is performed at the site monitoring system, this is not always the case. In some implementations, some site level analytics, data compression, etc. is performed at the remote site prior to sending site data to the site monitoring system. For example, a network or master network controller may have sufficient processing power and other resources for conducting analytics, data compression, etc. and thus processing may be distributed to take advantage of this. This distribution of processing power may not be static, that is, depending on what functions are being performed, the monitoring system may draw on remote processors for performing the aforementioned tasks, or not. Thus the monitoring system may be configured with the flexibility of using remote processors at the site or not.

Through monitoring of the sensors and controllers, a window intelligence system or a site monitoring system may provide many types of services such as any one or more of the following services:

a. Customer service—the system can be configured to note when data from a switchable device, a sensor, and/or a controller indicates a problem in an external system. The system may indicate that the problem may be immediate, such as a malfunction, or an impending problem can be anticipated, e.g. when a component's performance drifts from specified parameters (while still functioning adequately). In response, service personnel may be summoned to correct the problem or communicate that there is a problem. In the latter scenario, service personnel may, e.g., reprogram the switchable device's controller to compensate for a drift from specification. In some instances, potential issues are flagged and resolved before they become apparent to the external system or site. For example, the aforementioned reprogramming may provide adequate performance from the window permanently or provide adequate performance until a field service person can visit the site and replace or repair the unit. The system may be configured to autocorrect problems with external systems. Unless stated otherwise, any of the problems, issues, errors, etc. described herein can be auto-corrected using heuristics in the window control system. In one example, the system detects a drift from specification in an electrochromic window and automatically reprograms the window's controller(s) to compensate for the drift. The system also alerts service personnel as to this event. The service personnel can then decide the best course of action, e.g., further reprogramming, replacing the window, replacing the controller, and the like. The occupant may have no indication that anything has gone awry with the window and/or controller, the occupant's perception of the window's performance may be unchanged throughout these.

Alert notifications may be sent when issues are detected. The system enables quick resolution of problems. For example, a dashboard interface may provide the ability to drill down into issues from a high-level summary. From the high-level summary, the system may provide easy access to site-specific context based log file sections, schematics, pictures, and reports. In some implementations, the system flags an entire site when one or more problems with the site are identified. In this way, persons interacting with the system need not be exposed to minutiae concerning the issue until they want such information. Thus, e.g., service personnel can quickly choose a flagged site, and drill down to the actual problem, which may be e.g. a single window with a non-critical issue. This allows the service personal to (a) quickly determine where problems arise, (b) quickly determine the nature of the problem at each site, and (c) prioritize any problems effectively. See FIG. 8.

The system may also provide look ahead data to external systems such as HVAC systems, thereby enabling such systems to enhance user comfort and/or save energy.

b. Customize the installation based on observed usage trends. User preferences may be incorporated in a program over time. As an example, the window system or site monitoring system may determine how an end user (e.g. occupant) tries to override a heating or lighting control algorithm at particular times of day and uses this information to predict future behavior of the user. It may inform the relevant external system and/or modify the window control algorithm to set tint levels according to the learned user preference.

c. Deploy learned approaches to other external systems or installations (e.g., how to best tint windows, light windows, heat/cool rooms when an afternoon thunderstorm approaches). There are benefits achieved in using the collective experience and information from an installed base of switchable device networks. For example, it helps to fine tune control algorithms, customize window/network products for a particular market segment, and/or test new ideas (e.g., control algorithms, sensor placement).

d. Energy consulting services. Such services may use information about a building such as energy consumption of a building, window tinting decisions, solar radiation flux (e.g., on different sides of a building), local weather information (cloud cover, temperature, etc.), etc. Such information may be provided in various time increments, e.g., months, weeks, days, hours, minutes, etc. Energy consulting services may use such information in developing analyses and/or recommendations for the building(s) from which the information was obtained and/or similar building (e.g., nearby buildings, buildings in similar climates, or at similar latitudes). Also, energy consulting services may use the information to provide analyses and/or recommendations to energy infrastructure entities such as utilities, HVAC equipment suppliers, campuses, entities that provide control services to power grids, etc.

e. Vendors who market information. Some vendors integrate information from various sources and bundle useful tags customized to buyer needs.

Data Monitored

The following description presents examples of some types of site information that may be monitored by a window control system or a site monitoring system. The information may be provided from various sources such as voltage and/or current versus time data for individual switchable devices, sensor output data versus time, communications and network events and logs for controller networks, etc. The time variable may be associated with external events such as solar position, weather, etc., as well as time of day or calendar day. Information with a periodic component may be analyzed in the frequency domain as well as the time domain.

1. From Window Controllers I/V Data:
   a. Changes in peak current. This is sometimes produced during application of a ramp to drive voltage for producing an optical transition. See FIGS. 2 and 3.
   b. Changes in hold (leakage) current. This may be observed at an end state of a switchable device. A rate of increasing leakage current may correlate with the likelihood that a short has developed in the device. Sometimes an electrical short causes an undesirable blemish such as a halo in the device. In some cases, a site monitoring system may detect an electrical short in an electrochromic window as part of its data collection.
   c. Change in voltage compensation required. Voltage compensation is the change in voltage required to account for the voltage drop in the conductive path from the power supply to the switchable device.
   d. Change in total charge transferred. This may be measured over a period of time and/or during a certain state of the switchable device (e.g., during drive or during hold).
   e. Change in power consumption. Power consumption may be calculated by (I*V) per window or controller.
   f. Comparison with other WC (window controllers) on the same façade with identical loads. This allows the monitoring system to determine that a particular controller has an issue, rather than a particular device controlled by the controller. For example, a window controller may be connected to five insulated glass units, each exhibiting the same issue. Because it is unlikely that five devices will all suffer from the same issue, the monitoring system may conclude that the controller is to blame.
   g. Instances of abnormal profiles: e.g., double tinting/ double clearing. Double tinting/clearing refers to a situation where a normal drive cycle (voltage and/or current profile) is applied and it is found that the switchable device has not switched, in which case a second drive cycle must be conducted.
   h. Switching characteristics vs. external weather. At certain temperatures or weather conditions, the monitoring system expects particular switching results or performance. Deviations from the expected response suggest an issue with a controller, a switchable device, and/or a sensor. See FIG. 12.

The changes and comparisons described here can be produced from data collected at, e.g., the network controller level. Historical data (days, weeks, months, years) is preserved in the window intelligence system, and such data can be used for comparison. With such data, variations due to temperature can be identified and ignored, if appropriate. The various changes, along or in combination, may provide a signature of a problem in a window, a controller, a sensor, etc. Any one or more of the foregoing parameters may identify an increase in impedance at any position from the power supply to (and including) the switchable device. This path may include the switchable device, a bus bar connected to the device, a lead attach to the bus bar, a connector to the lead attach or IGU, a group of wires (sometimes called a "pigtail") between the connector (or IGU) and the power supply. As an example, a change in any or more of parameters 1a-1e may indicate corrosion caused by water in a window frame. A model using a combination of these parameters may recognize the signature of such corrosion and accurately report this issue remotely.

2. From Window Controller State and Zone State Changes:
   a. Any window controller getting out of sync with zone—may be due to communication issues. Example: If there are multiple controllers in a zone, and one of these controllers does behave as expected, the window system or site monitoring system may conclude that the aberrant controller is not receiving or following commands over a communications network. The system can take action to isolate the source of the problem and correct it.
   b. Longest switching time for the zone and adjustments to make all glass switch at the same rate. The system may identify a particular switchable device that is not switching at a desired rate or an expected rate. See FIG. 15. Without replacing or modifying the device, the window system or site monitoring system may modify the switching algorithm so that the device switches at the expected rate. For example, if a device is observed to switch too slowly, its ramp to drive or drive voltage may be increased. This can be done remotely.

3. From System Logs:
   a. Any change in frequency of communication errors— increase in noise or device degradation. The received communications from a controller may be slowed or stopped. Or, the send communications may not be acknowledged or acted upon.
   b. Connection degradation if pigtail starts showing up as disconnected. In certain embodiments, a connector provides a signal indicating that it is becoming disconnected. A window controller may receive such signals, which can be logged at the window system or site monitoring system. See FIG. 13.

4. From Sensor Data:
   a. Any degradation over time. This may be manifest as a signal magnitude reduction. It may be caused by various factors including damage to the sensor, dirt on the sensor, an obstruction appearing in front of the sensor, etc.

b. Correlation with external weather. Normally, the window system or site monitoring system will assume that the photo sensor output should correlate with the weather.
c. Comparison with zone state change to ensure Intelligence working correctly. The window system or site monitoring system normally expects that the zone will change state when its photosensor output meets certain state-change criteria. For example, if the sensor indicates a transition to sunny conditions, the switchable devices in the zone should tint. In certain embodiments, there are one or more photosensors per zone. See FIGS. 14A-D.
d. Any changes in surroundings after commissioning. As an example, a tree grows in front of the sensor or a building is constructed in front of a sensor. Such changes in surroundings may be evidenced by multiple sensors affected by the changes being similarly affected (e.g., their photo sensor outputs go down at the same time). Among other purposes, commissioning provides information about the deployment of sensors, controllers, and/or switchable optical devices in a site. Commissioning is further described in PCT Application No. PCT/US2013/036456, filed Apr. 12, 2013, which is incorporated herein by reference in its entirety.
e. Data from a central or multifunctional sensor. In some embodiments, a building has a multifunctional sensor providing sensed data for a variety of parameters relevant to window tinting or other building management. Examples of individual sensors that may be included in such multifunctional sensor include temperature sensors, directional photosensors (e.g., three or more photosensors oriented in different azimuthal and/or altitudinal directions), humidity sensors, etc. The photosensors may capture visible light, IR radiation, UV radiation, or any combination thereof. In certain embodiments, the multifunctional sensor provides weather related data. In one example, the sensor is a ring sensor as described in U.S. Patent Application No. 62/238,100, filed Oct. 6, 2015, and incorporated herein by reference in its entirety.

5. From Log File Analysis of Driver of State Changes:
a. Overrides by zone—further tuning of control algorithms for the zone. The window system or site monitoring system may learn the requirements of a particular site and adapt its learning algorithm to address the requirements. Various types of adaptive learning are described in PCT Application No. PCT/US2013/036456, filed Apr. 12, 2013, which was previously incorporated herein by reference in its entirety.
b. iOS (or other mobile device) vs. Wall Switch overrides—consumer preference. When overrides are observed, the monitoring system may note which type of device initiated the override, a wall switch or a mobile device. More frequent use of wall switches may indicate a training issue or a problem with the window application on the mobile device.
c. Time/Frequency of various states—usefulness of each state. When multiple tint states are available, and some are underused, it may indicate to the remote monitoring system that there is an issue with a particular state. The system may change the transmissivity or other characteristic of the state.
d. Variation by market segment. The frequency of use (popularity) of certain states or other properties of a site's switching characteristics may correlate with a market segment. When a window system or site monitoring system learns this, it may develop and provide market-specific algorithms. Examples of market segments include airports, hospitals, office buildings, schools, government buildings, etc.
e. Total number of transitions—Expected number of cycles over warranty period and life by market segment. This may provide in situ lifecycle information. See FIG. 12.

6. Energy Calculations:
a. Energy saved by zone by season, total system energy saving by season. The window system or site monitoring system may determine energy savings to identify algorithms, device types, structures, etc. that provide improvements, compare sites, and improve lower performing sites. See FIGS. 14B and 14D. Provide performance information and recommendations to external systems such as HVAC systems and smart thermostat service or other home appliance services (e.g., NEST).
b. Provide advanced energy load information to AC system by zone. Buildings have large thermal masses, so air conditioning and heating do not take effect immediately. Using a solar calculator or other predictive tools (describe elsewhere herein), the window system or site monitoring system can provide advance notice to HVAC systems or NEST so they can begin a transition early. It may be desirable to provide this information by zone. Moreover, a window system or site monitoring system may tint one or more windows or zones to aid the HVAC system in doing its job. For example, if a heat load is expected on a particular façade, the system may provide advance notice to the HVAC system and also tint windows on that side of the building to reduce what would otherwise be the HVAC's cooling requirements. Depending upon the tinting speed of the windows, the system can calculate and time tinting and HVAC activation sequences appropriately. For example, if the windows tint slowly, the HVAC activation may be sooner, if they tint quickly, then the HVAC signal to action may be delayed or ramped more slowly to reduce load on the system. See FIGS. 14B and 14D.

7. Window Antennas
a. In certain embodiments, windows and/or associated structures (e.g., controllers, IGU spacers, and frames) have antennas attached or fabricated thereon. Examples of such window antennas are described in PCT Patent Application No. PCT/US2015/062387, filed Nov. 24, 2015, and incorporated herein by reference in its entirety.
b. A window antenna can provide the location of occupants and/or visitors, who carry communication enabled devices such as mobile phones.
c. A window antenna can also detect the presence of intruders and other security related information (e.g., when a window has a privacy setting activated).
d. A window antenna can also detect the bandwidth consumed or available on services provided by the window antennas.

In certain embodiments, the windows, controllers, and/or sensors have their performance or response checked at an initial point in time and thereafter rechecked repeatedly. In some cases, recent performance/response measurements are compared with earlier performance/response measurements to detect trends, deviations, stability, etc. If necessary, adjustments can be made or service can be provided to address trends or deviations detected during comparisons. The collection of relevant parameters for a window, sensor, or controller may serve as a "fingerprint" for the device. Such parameters include voltage response, current response, communications fidelity, etc. as described elsewhere herein. In some embodiments, windows, sensors, and/or controllers are checked and optionally fingerprinted at the factory. For example, a switchable window may go through a burn in procedures during which relevant parameters can be extracted. Windows exhibiting problems can have their current performance compared against earlier fingerprints to optionally determine whether the problem developed after shipping/installation or during operation. Fingerprints can also be generated, optionally automatically, when the devices are commissioned (e.g., installed at a site and initially detected and cataloged). Fingerprints can be stored in a memory associated with the window, e.g. in a pigtail. In certain embodiments, the window system or the site monitoring system may also reprogram the memory in the pigtail (or other memory) remotely and automatically. Commissioning is described in PCT Patent Application No. PCT/US2013/036456, filed Apr. 12, 2013, and incorporated herein by reference in its entirety.

In certain embodiments, during commissioning at a new site, the system compares a designed site layout to the actual, as commissioned layout, to flag any discrepancy at time of commissioning. This may be used to correct a device, controller, etc. at the site or to correct design document. In some cases, the system simply verifies that all window controllers, network controllers, zones, etc. match between design document and actual site implementation. In other cases, a more extensive analysis is conducted, which may verify cable lengths etc. The comparison may also identify installation problems such as incorrect photosensor orientations, defective photosensors, etc., and optionally automatically correct such problems. As indicated, during commissioning, the system may obtain and store initial fingerprints of many or all individual components in the site, including voltage/current measurements at switchable optical devices for different device transitions. Such fingerprints may be used to periodically check the site and detect degradation in upstream hardware (i.e. wiring, power supplies, uninterrupted power supply (UPS)), as well as window controllers and switchable optical devices. Using a UPS in a switchable optical window network is described in U.S. Patent Application No. 62/019,325, filed Jun. 30, 2014, which is incorporated herein by reference in its entirety.

Auto-Detection and Auto-Correction by the System

While much of the discussion herein focuses on systems for detecting and diagnosing issues with networks of switchable optical devices, a further aspect of the disclosure concerns a window system or site monitoring system that leverages these capabilities to automatically collect data, automatically detect problems and potential problems, automatically notify personnel or systems of problems or potential problems, automatically correcting such problems or potential problems, and/or automatically interfacing with building or corporate systems to analyze data, implement corrections, generate service tickets, etc.

Examples of this Automatic Features of Systems

1. If there is a slow degradation in current to a window (or other signature of non-fatal issue with switching current received by a window), the window system or site monitoring system can auto-correct this issue by, for example, directing a controller associated with the window to increase the switching voltage to the window. The system may calculate an increase in voltage using empirical and/or analytic techniques that relate changes in current drawn or optical switching properties to changes in applied voltage. The changes in voltage may be limited to a range such as a range defining safe levels of voltage or current for the devices in the window network. The changes to the voltage may be implemented by the system reprogramming one or more memories storing tint transition instructions for the window in question. For example, a memory associated with the window, e.g. in a pigtail of the window, is programmed from the factory to contain window parameters that allow a window controller to determine appropriate drive voltages for the electrochromic coating associated with the window. If there is degradation or similar issues, one or more of these parameters may need change and so the system reprograms the memory. This may be done, e.g., if the window controller automatically generates drive voltage parameters based on the stored values in the memory (e.g., a memory associated with the pigtail). That is, rather than the system sending new drive parameters to the window controller, the system may simply reprogram the window memory so the window controller can determine new drive parameters itself. Of course, the system may also provide the tint transition parameters to the window controller, which can then apply them according to its own internal protocol, which may involve storing them in an associated memory or providing them to a higher level network controller.

2. If there is a slow degradation in photosensor (or other signature of non-fatal issue with a sensor) causing a lower than accurate reading, the window system or site monitoring system can auto-correct the sensor reading before using the reading for other purposes such as input for optical device switching algorithms. In certain embodiments, the system applies an offset within some limit to compensate a photosensor reading. This allows for, e.g., uninterrupted occupant comfort and automatic adjustment of window tinting for improved aesthetics. Again, for example, the occupant may not realize that any of these changes to the window and/or related components or software has occurred.

3. If the system detects that a room is occupied or learns that the room is commonly occupied, and the tinting algorithm applies a tint after the glare begins, the site monitoring system may automatically adjust the tint algorithm to start earlier, when the room is occupied or predicted to be occupied. In certain embodiments, glare is detected by a photosensor located in a room or outside a room where the glare occurs. The algorithm may employ an occupancy sensor located within the room.

4. When the system detects a difference in tinting times for different windows in the same façade, it may cause all windows to tint at the same time and, if desired, to the same tint level by auto adjusting ramping voltage parameters (if the occupant wants whole façade tinting at the same time).

5. The system may detect a window controller that is out of synchronization with other window controllers for a group of windows in a zone or a façade. The description of FIGS. 18A-H contains a detailed explanation of such example. The system may then bring the window back into sync automatically by adjusting the applied switching voltage or taking other remedial action within its control.

Ancillary Services

The remote monitoring system of the window system or site monitoring system may collect and use local climate information, site lighting information, site thermal load information, and/or weather feed data for various purposes. A few examples follow.

Weather Service Rating: There are existing services that rely on weather feeds/data to sell and/or enable their services. For example, "smart sprinklers" and even landscaping companies using conventional sprinkler systems use weather data to program their watering patterns. These weather data are often local, e.g. zip code based data, and there are multiple sources of weather data. In certain embodiments, the remote monitoring system uses actual data it collects to rate what weather services predict for any given area. The system may determine which is most accurate and provide that rating to services that rely on weather feeds. Any given weather service may be more accurate depending on the geographical area, e.g. weather service A might be best in San Francisco, but not as good in the Santa Clara Valley (where service B is better). The system can provide a rating service identifying which weather feed is more reliable for a given area, by collecting its actual sensor data, doing statistical analysis, and providing to customers as valuable intelligence. This information is useful for entities other than sites; examples include sprinkler companies, companies that use or control solar panels, outdoor venues, any entity that relies on the weather.

Weather Service: The system can collect sensor data live over large geographic areas. In certain embodiments, it provides this data to weather services so that they can more accurately provide weather data. In other words, weather services rely heavily on satellite imagery and larger sky pattern data feeds. Information from one more sites with switchable optical devices and associated sensors, widely deployed, can provide real time ground level information on the sun, clouds, heat, etc. Combining these two data, more accurate weather forecasts can be achieved. This approach may be viewed as creating a sensor net across the country or other geographic region where multiple sites exist.

Consumer Behavior: Indirect data from end user patterns can be gleaned, e.g. by knowing when/how end users tint or bleach optically tintable windows in any geographical location or region. In certain embodiments, data collected by the window system or site monitoring system is analyzed for patterns that may have value to other consumer products vendors. For example, "heavy tinters" may indicate: aversion to sun/heat, the fact that high sun levels are present, the need for more water in a region, a region ripe for more sunglasses sales, etc. Likewise, "heavy bleachers" may indicate opposite trends that will be useful to vendors that sell, e.g.: sun lamps, tea, books, heating pads, furnaces, tanning booths, and the like.

Building Management Systems (BMSs) and Smart Appliance Systems

A BMS is a computer-based control system installed at a site (e.g., a building) that can monitor and control the site's mechanical and electrical equipment such as ventilation, lighting, power systems, elevators, fire systems, and security systems. In certain embodiments, a BMS may be designed or configured to communicate with a window system or site monitoring system to receive control signals and communicate monitored information from systems at the site. A BMS consists of hardware, including interconnections by communication channels to a computer or computers, and associated software for maintaining conditions in the site according to preferences set by the occupants, site manager, and/or window system manager. For example, a BMS may be implemented using a local area network, such as Ethernet. The software can be based on, for example, internet protocols and/or open standards. One example of software is software from Tridium, Inc. (of Richmond, Va.). One communications protocol commonly used with a BMS is BACnet (building automation and control networks).

A BMS is most common in a large building, although home automation systems are becoming more common. Typically, a BMS functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window control system interfaces with a BMS, where the window control system is configured to control one or more electrochromic windows or other tintable windows. In one embodiment, each of the one or more tintable windows includes at least one all solid state and inorganic electrochromic device. In another embodiment, each of the one or more tintable windows includes only all solid state and inorganic electrochromic devices. In another embodiment, one or more of the tintable windows are multistate electrochromic windows, as described in U.S. patent application Ser. No. 12/851,514, filed on Aug. 5, 2010, and entitled "Multipane Electrochromic Windows."

FIG. 1D is a schematic diagram of an embodiment of a site network 1100 having a BMS that manages a number of systems of a building, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source (UPS) grids.

Also, the BMS interfaces with a window network 1102. In this example, window network 1102 is depicted as a distributed network of window controllers including a master network controller, 1103, intermediate network controllers, 1105a and 1105b, and end or leaf controllers 1110. End or leaf controllers 1110 may be similar to window controller 450 described with respect to FIGS. 4 and 5. For example, master network controller 1103 may be responsible for interfacing with the BMS, e.g., via an API, and each floor of building 1101 may have one or more intermediate network controllers 1105a and 1105b, while each window of the building has its own end or leaf controller 1110. In this example, each of controllers 1110 controls a specific tintable window of building 1101. In certain embodiments, window network 1102 and/or master network controller 1103 communicates with a window intelligence system or site monitoring system or component thereof such as a data warehouse.

Each of controllers 1110 can be in a separate location from the tintable window that it controls, or can be integrated into the tintable window. For simplicity, only a few tintable windows of building 1101 are depicted as controlled by master window controller 1102. In a typical setting there may be a large number of tintable windows in a building controlled by window network 1102, which may be a distributed network of window controllers. In alternative embodiments, a single end controller (also referred to herein as a window controller), which controls the functions of a single tintable window also falls within the scope of the embodiments disclosed herein.

By incorporating feedback from a window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of staff, and various combinations of these, because the tintable windows can be automatically controlled. In certain embodiments, any one or more of these functions can be provided by the system, which may communicate with the windows and window controllers directly or indirectly, via a BMS.

In some embodiments, a BMS may not be present or a BMS may be present but may not directly communicate with a master network controller or communicate at a high level with a master network controller. In these embodiments, a master network controller can provide, for example, enhanced: 1) environmental control, 2) energy savings, 3) flexibility in control options, 4) improved reliability and usable life of other systems due to less reliance thereon and therefore less maintenance thereof, 5) information availability and diagnostics, 6) effective use of staff, and various combinations of these, because the tintable windows can be automatically controlled. In these embodiments, maintenance on the BMS does not interrupt control of the tintable windows.

In certain embodiments, a BMS may be in communication with the window system, via an API, to receive control signals and transmit monitored data from one or more systems controlled by the BMS. In other embodiments, the window system or site monitoring system may be in direct communication with the master window controller and/or other systems in a site network to manage the systems.

FIG. 1E is a block diagram of an alternative embodiment employing a network 1200 for a site (e.g., building). The network 1200 may employ any number of different communication protocols, including BACnet. As shown, site network 1200 includes a window system 1205, a lighting control panel 1210, a BMS 1215, a security control system, 1220, a user console, 1225, a smart thermostat service or other home appliance service (e.g., NEST) 1227. These different controllers and systems at the site may be used to receive input from and/or control a HVAC system 1230, lights 1235, security sensors 1240, door locks 1245, cameras 1250, tintable windows 1255, and thermostats 1257 of the site. As stated, in some embodiments, window system 1205 may be in communication with a master controller, such as master controller 1103 from FIG. 1D.

A lighting control panel may include circuits or other logic to control the interior lighting, the exterior lighting, the emergency warning lights, the emergency exit signs, and the emergency floor egress lighting. A lighting control panel (e.g., panel 1210) also may access occupancy sensors in the rooms of the site. BMS 1215 may include a server that receives data from and issues commands to the other systems and controllers of site network 1200. For example, BMS 1215 may receive data from and issue commands to each of the window controller 1205, lighting control panel 1210, and security control system 1220. Security control system 1220 may include magnetic card access, turnstiles, solenoid driven door locks, surveillance cameras, burglar alarms, metal detectors, and the like. User console 1225 may be a computer terminal that can be used by the site manager to schedule operations of, control, monitor, optimize, and troubleshoot the different systems of the site. Software from Tridium, Inc. may generate visual representations of data from different systems for user console 1225.

Each of the different controls may control individual devices/apparatus. Window system 1205 controls windows 1255. Lighting control panel 1210 controls lights 1235. BMS 1215 may control HVAC 1230. Security control system 1220 controls security sensors 1240, door locks 1245, and cameras 1250. Data may be exchanged and/or shared between all of the different devices/apparatus and controllers that are part of site network 1200.

In some cases, the systems of site network 1100 or site network 1200 may run according to daily, monthly, quarterly, or yearly schedules. For example, the lighting control system, the window control system, the HVAC, and the security system may operate on a 24-hour schedule accounting for when people are at the site during the work day. At night, the site may enter an energy savings mode, and during the day, the systems may operate in a manner that minimizes the energy consumption of the site while providing for occupant comfort. As another example, the systems may shut down or enter an energy savings mode over a holiday period.

The scheduling information may be combined with geographical information. Geographical information may include the latitude and longitude of a site such as, for example, a building. In the case of a building, geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a site such as, for example, the building 1101 in FIG. 1D, that includes a site network, tintable windows for the exterior windows (e.g., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior condition monitoring, the building may include exterior sensors on the roof of the building. Alternatively, the building may include an exterior sensor associated with each exterior window or an exterior sensor on each side of the building. An exterior sensor on each side of the building could track the irradiance on a side of the building as the sun changes position throughout the day.

When a window controller is integrated into a site network, outputs from exterior sensors may be input to a site network and/or window system. In some cases, these outputs may be provided as input to a local window controller. For example, in some embodiments, output signals from any two or more exterior sensors are received. In some embodiments, only one output signal is received, and in some other embodiments, three, four, five, or more outputs are received. These output signals may be received over a site network.

In some embodiments, the output signals received by sensor(s) include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to a determined level of tint. For example, referring to FIG. 1D, this may include master network controller 1103 issuing commands to one or more intermediate network controllers 1105a and 1105b, which in turn issue commands to end controllers 1110 that control each window of the building. Master network controller 1103 may issue commands based on commands received from a BMS and/or a window system. End controllers 1100 may apply voltage and/or current to the window to drive the change in tint pursuant to the instructions.

In some embodiments, a site including tintable windows may be enrolled in or participate in a demand response program run by the utility or utilities providing power to the site. The program may be a program in which the energy consumption of the site is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by a BMS of a building, by the window system, or by window controllers configured to control the tintable windows in the building. This warning signal can be an override mechanism that disengages the tinting control. The BMS or window system can then instruct the window controller(s) to transition the appropriate electrochromic device in the tintable windows to a dark tint level aid in reducing the power draw of the cooling systems in the building at the time when the peak load is expected.

In some embodiments, tintable windows (e.g., electrochromic windows) of windows of a site may be grouped into zones with tintable windows in a zone being instructed in a similar manner. For example, the exterior windows of the site (i.e., windows separating the interior from the exterior of a building), may be grouped into zones, with tintable windows in a zone being instructed in a similar manner. For example, groups of tintable windows on different floors of the building or different sides of a building may be in different zones. In one case, on the first floor of the building, all of the east facing tintable windows may be in zone 1, all of the south facing tintable windows may be in zone 2, all of the west facing tintable windows may be in zone 3, and all of the north facing tintable windows may be in zone 4. In another case, all of the tintable windows on the first floor of the building may be in zone 1, all of the tintable windows on the second floor may be in zone 2, and all of the tintable windows on the third floor may be in zone 3. In yet another case, all of the east facing tintable windows may be in zone 1, all of the south facing tintable windows may be in zone 2, all of the west facing tintable windows may be in zone 3, and all of the north facing tintable windows may be in zone 4. As yet another case, east facing tintable windows on one floor could be divided into different zones. Any number of tintable windows on the same side and/or different sides and/or different floors of the building may be assigned to a zone.

In some embodiments, tintable windows in a zone may be controlled by the same window controller. In some other embodiments, tintable windows in a zone may be controlled by different window controllers, but the window controllers may all receive the same output signals from sensors and use the same function or lookup table to determine the level of tint for the windows in a zone.

In some embodiments, tintable windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, tintable windows in a zone that includes the windows on a single side of the building may be controlled by a window controller or controllers that receive an output signal from a transmissivity sensor.

In some embodiments, a sensor (e.g., photosensor) may provide an output signal to a window controller to control the tintable windows of a first zone (e.g., a master control zone). The window controller may also control the tintable windows in a second zone (e.g., a slave control zone) in the same manner as the first zone. In some other embodiments, another window controller may control the tintable windows in the second zone in the same manner as the first zone.

In some embodiments, a site manager, occupants of rooms in the second zone, or other person may manually instruct (using a tint or clear command or a command from a user console of a BMS, for example) the tintable windows in the second zone (i.e., the slave control zone) to enter a tint level such as a colored state (level) or a clear state. In some embodiments, when the tint level of the windows in the second zone is overridden with such a manual command, the tintable windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a site manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the tintable windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the tintable windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a site network, may be used control the tint of a tintable window.

The references to a BMS in the above description can be replaced in some or all instances with references to a smart thermostat service or other home appliance service such as NEST. The communication between the window system and the BMS or home appliance service can be via an API as described above.

Some features of this disclosure may be implemented on a mesh network, such as the networks described in U.S. Provisional Patent Application No. 62/085,179, filed Nov. 26, 2014, previously incorporated by reference in its entirety. Devices on a mesh network can make use of information known by the network. For instance, where GPS coordinates of one or more windows are known, the other non-window devices can learn their exact locations based on the GPS data and the relative positions of all the other (window and non-window) devices. Because GPS typically does not work inside a building, direct GPS sensing of device positions inside of a building is difficult or impossible. As such, by using the absolute position information learned from the windows themselves, and the relative positions of the various devices on the network, even non-window devices that are inside of a building can learn of their exact locations. In some implementations, such network devices may be populated into the map that is auto-generated. For example, where an office building uses electrochromic windows and printers that are each capable of connecting to the mesh network, the map generated by the controller(s) may show the relative locations of all the windows and printers connected to the network. A building occupant can use this map (e.g., loaded into a smartphone application, computer, etc.) to help them find their nearest printer or other relevant device on the mesh network.

Occupancy sensors and HVAC components may also be connected to or interface with the mesh network. In such cases, the map generated by the controller(s) may show whether particular rooms are occupied based on information from the occupancy sensors, and may show other conditions (e.g., actual temperature, thermostat setting, humidity, status of lights, etc.) based on information from other HVAC components. The accuracy and precision of the map are increased with an increased number of devices on the mesh network, since the additional devices provide further data for the system to piece together.

Windows on the mesh network may be configured to interact with other devices on the mesh network, for example they may interact via an API or directly with thermostats or other HVAC components. For instance, where a window or set of windows tint (thereby reducing the rate that heat enters the building through the window(s)), the window(s) may send a signal to a thermostat or other HVAC component to reduce the degree of cooling occurring through air conditioning. Similar signals may be sent to increase the degree of cooling through air conditioning, or to control a heating system. Additionally, information gleaned by the electrochromic window (e.g., through sensors, performance, etc.) may be shared with a thermostat or other HVAC component to help inform decisions made by the thermostat or HVAC.

In some embodiments, the controllers may have instructions to control the windows based on the sensed relative and exact positions/orientations of the various windows. For example, the controllers may have instructions to color east-facing windows early in the morning to prevent the sun from heating up the east-facing rooms, and to bleach the east-facing windows later in the afternoon when the sun is not shining directly into the east-facing rooms. Any control scheme may be used, and may be programmed into a controller by a user or installer, or may be pre-programmed by a manufacturer, vendor, etc. In some embodiments the window controllers are programmable in a similar manner as a thermostat (with the option of controlling a single window or multiple windows together).

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions. In addition, other systems of a site network may include components for wired or wireless communication between different system elements.

A separate communication node for wireless communications can be, for example, another wireless window controller, an end, intermediate, or master window controller, a remote control device, a BMS, or a window system. Wireless communication is used in the window controller for at least one of the following operations: programming and/or operating the tintable window 505 (FIG. 5), collecting data from the tintable window 505 from the various sensors and protocols described herein, and using the tintable window 505 as a relay point for wireless communication. Data collected from tintable windows 505 also may include count data such as number of times an EC device has been activated, efficiency of the EC device over time, and the like. These wireless communication features is described in more detail below.

In one embodiment, wireless communication is used to operate the associated tintable windows 505, for example, via an infrared (IR), and/or radio frequency (RF) signal. In certain embodiments, the controller will include a wireless protocol chip, such as Bluetooth, EnOcean, Wi-Fi, ZigBee, and the like. Window controllers may also have wireless communication via a network. Input to the window controller can be manually input by an end user at a wall switch, either directly or via wireless communication, or the input can be from a BMS of a site of which the tintable window is a component or from a window system managing system.

In one embodiment, when the window controller is part of a distributed network of controllers, wireless communication is used to transfer data to and from each of a plurality of tintable windows via the distributed network of controllers, each having wireless communication components. For example, referring again to FIG. 1D, master network controller 1103, communicates wirelessly with each of intermediate network controllers 1105a and 1105b, which in turn communicate wirelessly with end controllers 1110, each associated with a tintable window. Master network controller 1103 may also communicate wirelessly with a BMS or with a window system. In one embodiment, at least one level of communication in the window controller is performed wirelessly.

In some embodiments, more than one mode of wireless communication is used in the window controller distributed network. For example, a master window controller may communicate wirelessly to intermediate controllers via Wi-Fi or ZigBee, while the intermediate controllers communicate with end controllers via Bluetooth, ZigBee, EnOcean, or other protocol. In another example, window controllers have redundant wireless communication systems for flexibility in end user choices for wireless communication.

Example of System for Controlling Functions of Tintable Windows

FIG. 1F is a block diagram of components of a window control system 1400 for controlling functions (e.g., transitioning to different tint levels) of one or more tintable windows at a site (e.g., building 1101 shown in FIG. 1D), according to embodiments. System 1400 may be one of the systems managed by a window system through a BMS (e.g., BMS 1100 shown in FIG. 1D) or may be managed directly by a window system and/or operate independently of a BMS.

System 1400 includes a master window controller 1402, which is typically implemented as a window control network that can send control signals to the tintable windows to control its functions. System 1400 also includes an external network 1410 in electronic communication with master window controller network 1402. Control logic and instructions for controlling functions of the tintable window(s), and/or sensor data may be communicated to the master window controller 1402 through the external network 1410. Network 1410 can be a wired or a wireless network (e.g., a cloud network). In some embodiments, network 1410 may be in communication with a BMS (e.g., over an API) to allow the BMS to send instructions for controlling the tintable window(s) through network 1410 to the tintable window(s) in a building. In some cases, the BMS may be in communication with the window system to receive instructions for controlling the tintable window(s) from the window system. In other embodiments, network 1410 may be in communication with a window system to allow the window system to send instructions for controlling the tintable window(s) through network 1410 to the tintable window(s) in a building.

In some embodiments, network 1410 may be communicatively coupled (e.g., wirelessly) with intermediate controllers 1405, end window controllers 1110, electrochromic devices 400, and user devices, allowing or facilitating communication between all devices in the system. Network 1410 may also allow for communication between multiple sites or systems, enabling one or more sites or systems to use of the information obtained from one or more other sites or systems. For example, communication between sites over an external network allows for information such as weather information to be shared and factored into tinting decisions and BMS or other system operations for each affected building. In certain embodiments, the master window controller 1402 and/or the master network controller 1403 are designed or configured to communicate with the window system or component thereof such as a data warehouse.

System 1400 also includes EC devices 400 of the tintable windows (not shown) and wall switches 1490, which are both in electronic communication with master window controller 1402. In this illustrated example, master window controller 1402 can send control signals to EC device(s) to control the tint level of the tintable windows having the EC device(s). Each wall switch 1490 is also in communication with EC device(s) and master window controller 1402. An end user (e.g., occupant of a room having the tintable window) can use the wall switch 1490 to control the tint level and other functions of the tintable window having the EC device(s).

In FIG. 1F, master window controller 1402 is depicted as a distributed network of window controllers including a master network controller 1403, a plurality of intermediate network controllers 1405 in communication with the master network controller 1403, and multiple pluralities of end or leaf window controllers 1110. Each plurality of end or leaf window controllers 1110 is in communication with a single intermediate network controller 1405. In some embodiments, intermediate network controllers 1405 operate according to their own rules or algorithms; i.e., they may operate somewhat autonomously. In some embodiments, intermediate network controllers 1405 operate under the direction of the master network controller 1403. In some embodiments, master network controller 1403 is configured to override the commands of intermediate network controller 1405.

Although master window controller 1402 is illustrated as a distributed network of window controllers, master window controller 1402 could also be a single window controller controlling the functions of a single tintable window in other embodiments. The components of the system 1400 in FIG. 1F may be similar in some respects to components described with respect to FIG. 1D. For example, master network controller 1403 may be similar to master network controller 1103 and intermediate network controllers 1405 may be similar to intermediate network controllers 1105. Each of the window controllers in the distributed network of FIG. 1F may include a processor (e.g., microprocessor) and a computer readable medium in electrical communication with the processor.

In some embodiments, master network controller 1403 or other component of the window network is configured to perform an authentication process, e.g., through handshaking, to recognize some or all devices that make up the window network (e.g., the master window controller network 1402). For example, through authentication, master network controller 1403 may determine that a particular electrochromic window with an electrochromic device 400 belongs on the window network by checking the identity or authentication certificate of the electrochromic window or electrochromic device 400, e.g., stored in the memory of a pigtail or otherwise associated with the window, e.g. embedded in the secondary sealing volume of an insulated glass unit. This authentication process may take place, e.g., during initial site commissioning or when any new addition or replacement (e.g., electrochromic window, controller, sensor, system, etc.) to the window network is made. Similarly, in some embodiments, site monitoring system B112 or processing center in FIG. 1C may be configured to authenticate the master network controllers 1403 of each site in electrical communication with it, e.g., wirelessly through network 1410. In some embodiments, master network controller 1403, and other interfaces of the window network that are in electrical communication with network 1410 may have a firewall or other malware protection.

In FIG. 1F, each leaf or end window controller 1110 is in communication with EC device(s) 400 of a single tintable window to control the tint level of that tintable window in the building. In the case of an IGU, the leaf or end window controller 1110 may be in communication with EC devices 400 on multiple lites of the IGU control the tint level of the IGU. In other embodiments, each leaf or end window controller 1110 may be in communication with a plurality of tintable windows. The leaf or end window controller 1110 may be integrated into the tintable window or may be separate from the tintable window that it controls. Leaf and end window controllers 1110 in FIG. 1F may be similar to the end or leaf controllers 1110 in FIG. 1D and/or may also be similar to window controller 450 described with respect to FIG. 5. In some implementations, end window controllers 1110 may operate autonomously, e.g., according to their own rules and algorithms, which may include algorithms directed by master network controller 1403 and intermediate network controllers 1405. In some embodiments, master window controller 1402 and/or intermediate network controller 1405 may override the commands of end window controller 1110.

Each wall switch 1490 can be operated by an end user (e.g., occupant of the room) to control the tint level and other functions of the tintable window in communication with the wall switch 1490. The end user can operate the wall switch 1490 to communicate control signals to the EC devices 400 in the associated tintable window. These signals from the wall switch 1490 may override signals from master window controller 1402 in some cases. In other cases (e.g., high demand cases), control signals from the master window controller 1402 may override the control signals from wall switch 1490. Each wall switch 1490 is also in communication with the leaf or end window controller 1110 to send information about the control signals (e.g. time, date, tint level requested, etc.) sent from wall switch 1490 back to master window controller 1402. In some cases, wall switches 1490 may be manually operated. In other cases, wall switches 1490 may be wirelessly controlled by the end user using a remote or user device 1401 (e.g., cell phone, tablet, etc.) sending wireless communications with the control signals, for example, using infrared (IR), and/or radio frequency (RF) signals. In some cases, wall switches 1490 may include a wireless protocol chip, such as Bluetooth, EnOcean, Wi-Fi, ZigBee, and the like. Although wall switches 1490 depicted in FIG. 1F are located on the wall(s), other embodiments of system 1400 may have switches located elsewhere in the room.

In some embodiments, remote or user devices 1401 (e.g., smart phones, tablets, etc.) may be used to issue control signals (e.g., tint level commands for one or more the switchable optical windows in communication with the window network). In some cases, the window system is configured such that the remote or user devices may override the control signals from master network controller 1403 to the window network, or from other components of the window network, e.g., intermediate controllers 1405 and end window controllers 1110, to the window network whether or not there is a wall switch 1490 present, in order to control the tinting of electrochromic windows on the window network. In some cases, control of the window network is only partially based on user input or requests via user devices 1401. For example, in some circumstances such as security situations or energy shortages, the user input may not override control by the master network controller 1403 or other network component, or even the external network 1410.

As stated, in some embodiments, a tint command issued by a user via a user device 1401 may override the control signals from the master window controller 1402 to the window network; master network controller 1403 may override the control signals from intermediate network controllers 1405 to the rest of the window network; and master network controller 1402 and intermediate network controller 1405 can override control signals from the end window controllers 1110 to the rest of the network. Through this hierarchy of window network control, operating rules and algorithms can be overrode by components of the window network higher up in the hierarchy depicted according to FIG. 1F.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

The references to a BMS in the above description can be replaced in some or all instances with references to a smart thermostat service or other home appliance service such as NEST. The communication between the window system and the BMS or home appliance service can be via an API as described above.

Example Switching Algorithm

Figure 2:
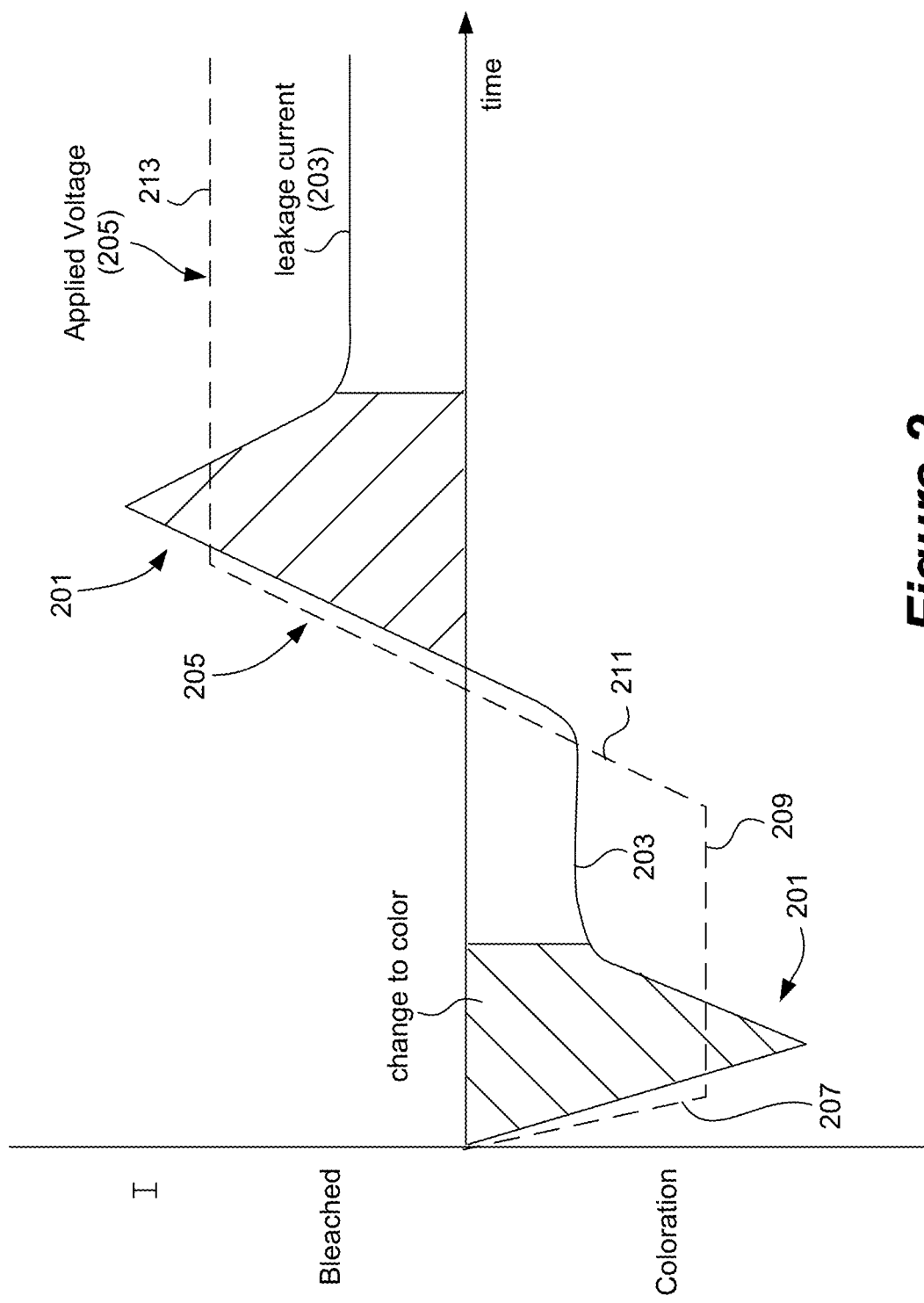
FIG. 2 is a graph depicting voltage and current profiles associated with driving an electrochromic device from bleached to colored and from colored to bleached.

To speed along optical transitions, the applied voltage is initially provided at a magnitude greater than that required to hold the device at a particular optical state in equilibrium. This approach is illustrated in FIGS. 2 and 3. FIG. 2 is a graph depicting voltage and current profiles associated with driving an electrochromic device from bleached to colored and from colored to bleached. FIG. 3 is a graph depicting certain voltage and current profiles associated with driving an electrochromic device from bleached to colored.

FIG. 2 shows a complete current profile and voltage profile for an electrochromic device employing a simple voltage control algorithm to cause an optical state transition cycle (coloration followed by bleaching) of an electrochromic device. In the graph, total current density (I) is represented as a function of time. As mentioned, the total current density is a combination of the ionic current density associated with an electrochromic transition and electronic leakage current between the electrochemically active electrodes.

Many different types electrochromic device will have the depicted current profile. In one example, a cathodic electrochromic material such as tungsten oxide is used in conjunction with an anodic electrochromic material such as nickel tungsten oxide in counter electrode. In such devices, negative currents indicate coloration of the device. In one example, lithium ions flow from a nickel tungsten oxide anodically coloring electrochromic electrode into a tungsten oxide cathodically coloring electrochromic electrode. Correspondingly, electrons flow into the tungsten oxide electrode to compensate for the positively charged incoming lithium ions. Therefore, the voltage and current are shown to have a negative value.

The depicted profile results from ramping up the voltage to a set level and then holding the voltage to maintain the optical state. The current peaks 201 are associated with changes in optical state, i.e., coloration and bleaching. Specifically, the current peaks represent delivery of the ionic charge needed to color or bleach the device. Mathematically, the shaded area under the peak represents the total charge required to color or bleach the device. The portions of the curve after the initial current spikes (portions 203) represent electronic leakage current while the device is in the new optical state.

In the figure, a voltage profile 205 is superimposed on the current curve. The voltage profile follows the sequence: negative ramp (207), negative hold (209), positive ramp (211), and positive hold (213). Note that the voltage remains constant after reaching its maximum magnitude and during the length of time that the device remains in its defined optical state. Voltage ramp 207 drives the device to its new the colored state and voltage hold 209 maintains the device in the colored state until voltage ramp 211 in the opposite direction drives the transition from colored to bleached states. In some switching algorithms, a current cap is imposed. That is, the current is not permitted to exceed a defined level in order to prevent damaging the device (e.g. driving ion movement through the material layers too quickly can physically damage the material layers). The coloration speed is a function of not only the applied voltage, but also the temperature and the voltage ramping rate.

FIG. 3 illustrates a voltage control profile in accordance with certain embodiments. In the depicted embodiment, a voltage control profile is employed to drive the transition from a bleached state to a colored state (or to an intermediate state). To drive an electrochromic device in the reverse direction, from a colored state to a bleached state (or from a more colored to less colored state), a similar but inverted profile is used. In some embodiments, the voltage control profile for going from colored to bleached is a mirror image of the one depicted in FIG. 3.

The voltage values depicted in FIG. 3 represent the applied voltage (Vapp) values. The applied voltage profile is shown by the dashed line. For contrast, the current density in the device is shown by the solid line. In the depicted profile, $V_{app}$ includes four components: a ramp to drive component 303, which initiates the transition, a $V_{drive}$ component 313, which continues to drive the transition, a ramp to hold component 315, and a $V_{hold}$ component 317. The ramp components are implemented as variations in $V_{app}$ and the $V_{drive}$ and $V_{hold}$ components provide constant or substantially constant $V_{app}$ magnitudes.

The ramp to drive component is characterized by a ramp rate (increasing magnitude) and a magnitude of $V_{drive}$. When the magnitude of the applied voltage reaches $V_{drive}$, the ramp to drive component is completed. The $V_{drive}$ component is characterized by the value of $V_{drive}$ as well as the duration of $V_{drive}$. The magnitude of $V_{drive}$ may be chosen to maintain $V_{eff}$ with a safe but effective range over the entire face of the electrochromic device as described above.

The ramp to hold component is characterized by a voltage ramp rate (decreasing magnitude) and the value of $V_{hold}$ (or optionally the difference between $V_{drive}$ and $V_{hold}$). $V_{app}$ drops according to the ramp rate until the value of $V_{hold}$ is reached. The $V_{hold}$ component is characterized by the magnitude of $V_{hold}$ and the duration of $V_{hold}$. Actually, the duration of $V_{hold}$ is typically governed by the length of time that the device is held in the colored state (or conversely in the bleached state). Unlike the ramp to drive, $V_{drive}$, and ramp to hold components, the $V_{hold}$ component has an arbitrary length, which is independent of the physics of the optical transition of the device.

Each type of electrochromic device will have its own characteristic components of the voltage profile for driving the optical transition. For example, a relatively large device and/or one with a more resistive conductive layer will require a higher value of $V_{drive}$ and possibly a higher ramp rate in the ramp to drive component. Larger devices may also require higher values of $V_{hold}$. U.S. patent application Ser. No. 13/449,251, filed Apr. 17, 2012, and incorporated herein by reference, discloses controllers and associated algorithms for driving optical transitions over a wide range of conditions. As explained therein, each of the components of an applied voltage profile (ramp to drive, $V_{drive}$, ramp to hold, and $V_{hold}$, herein) may be independently controlled to address real-time conditions such as current temperature, current level of transmissivity, etc. In some embodiments, the values of each component of the applied voltage profile is set for a particular electrochromic device (having its own bus bar separation, resistivity, etc.) and does vary based on current conditions. In other words, in such embodiments, the voltage profile does not take into account feedback such as temperature, current density, and the like.

As indicated, all voltage values shown in the voltage transition profile of FIG. 3 correspond to the $V_{app}$ values described above. They do not correspond to the $V_{eff}$ values described above. In other words, the voltage values depicted in FIG. 3 are representative of the voltage difference between the bus bars of opposite polarity on the electrochromic device.

In certain embodiments, the ramp to drive component of the voltage profile is chosen to safely but rapidly induce ionic current to flow between the electrochromic and counter electrodes. As shown in FIG. 3, the current in the device follows the profile of the ramp to drive voltage component until the ramp to drive portion of the profile ends and the $V_{drive}$ portion begins. See current component 301 in FIG. 3. Safe levels of current and voltage can be determined empirically or based on other feedback. U.S. Pat. No. 8,254,013, filed Mar. 16, 2011, issued Aug. 28, 2012 and incorporated herein by reference, presents examples of algorithms for maintaining safe current levels during electrochromic device transitions.

In certain embodiments, the value of $V_{drive}$ is chosen based on the considerations described above. Particularly, it is chosen so that the value of $V_{eff}$ over the entire surface of the electrochromic device remains within a range that effectively and safely transitions large electrochromic devices. The duration of $V_{drive}$ can be chosen based on various considerations. One of these ensures that the drive potential is held for a period sufficient to cause the substantial coloration of the device. For this purpose, the duration of $V_{drive}$ may be determined empirically, by monitoring the optical density of the device as a function of the length of time that Vdrive remains in place. In some embodiments, the duration of $V_{drive}$ is set to a specified time period. In another embodiment, the duration of $V_{drive}$ is set to correspond to a desired amount of ionic charge being passed. As shown, the current ramps down during $V_{drive}$. See current segment 307.

Another consideration is the reduction in current density in the device as the ionic current decays as a consequence of the available lithium ions completing their journey from the anodic coloring electrode to the cathodic coloring electrode (or counter electrode) during the optical transition. When the transition is complete, the only current flowing across device is leakage current through the ion conducting layer. As a consequence, the ohmic drop in potential across the face of the device decreases and the local values of $V_{eff}$ increase. These increased values of $V_{eff}$ can damage or degrade the device if the applied voltage is not reduced. Thus, another consideration in determining the duration of $V_{drive}$ is the goal of reducing the level of $V_{eff}$ associated with leakage current. By dropping the applied voltage from $V_{drive}$ to $V_{hold}$, not only is $V_{eff}$ reduced on the face of the device but leakage current decreases as well. As shown in FIG. 3, the device current transitions in a segment 305 during the ramp to hold component. The current settles to a stable leakage current 309 during $V_{hold}$.

Figure 4:
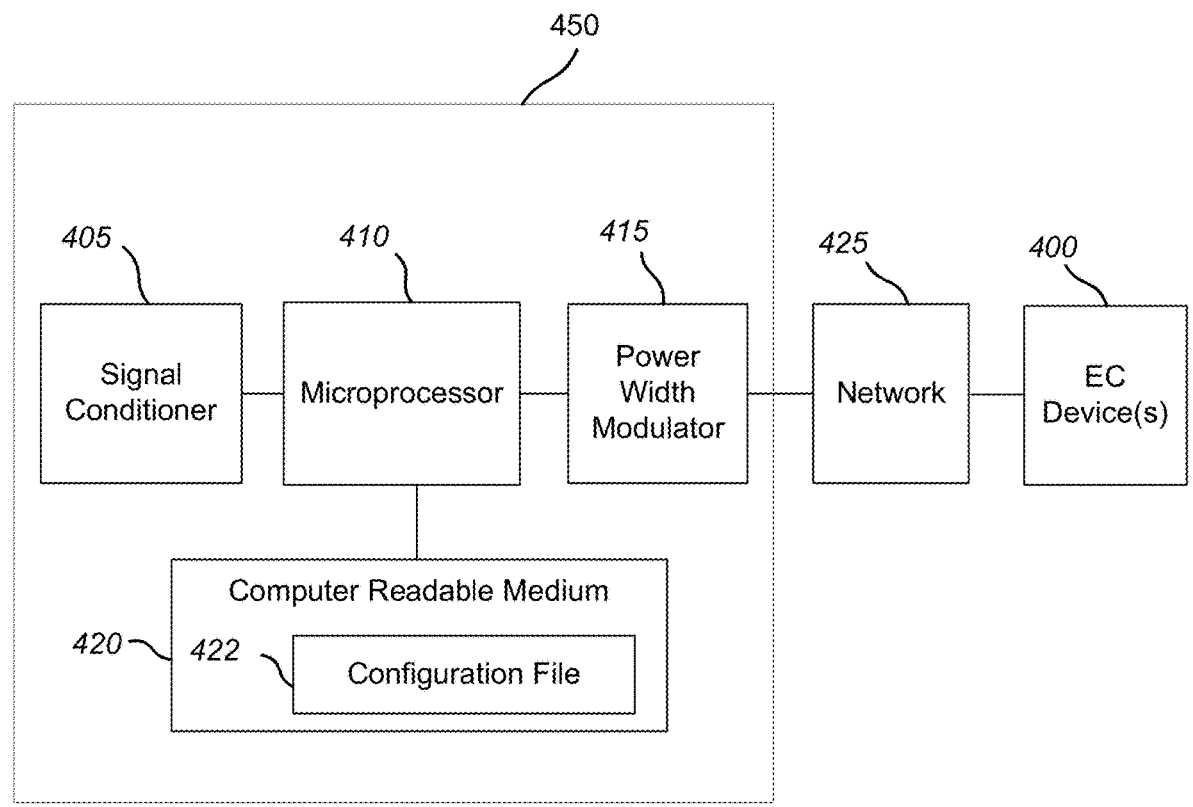
FIG. 4 depicts a simplified block diagram of components of a window controller.

FIG. 4 depicts a block diagram of some components of a window controller 450 and other components of a window controller system of disclosed embodiments. FIG. 4 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent application Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 4, the illustrated components of the window controller 450 include a window controller 450 having a microprocessor 410 or other processor, a power width modulator (PWM) 415, a signal conditioning module 405, and a computer readable medium 420 (e.g., memory) having a configuration file 422. Window controller 450 is in electronic communication with one or more electrochromic devices 400 in an electrochromic window through network 425 (wired or wireless) to send instructions to the one or more electrochromic devices 400. In some embodiments, the window controller 450 may be a local window controller in communication through a network (wired or wireless) to a master window controller.

In some embodiments, a master controller may distribute or offload tasks or computing loads to window controllers and/or network controllers. Such distributed computing logic system may be implemented for various reasons such as because the window controllers and/or network controllers have additional computing power that can be used to assist the master controller. For example, the window controllers and network controllers may assist the master controller by receiving and completing computations used in operation and maintenance of the window network. Window control systems may, e.g., be designed with extra computing power at the window controller level, network controller level and/or the master controller level so that computing loads can be distributed across the system.

In disclosed embodiments, a site may be a building having at least one room having an electrochromic window between the exterior and interior of a building. One or more sensors may be located to the exterior of the building and/or inside the room. In embodiments, the output from the one or more sensors may be input to the signal conditioning module 405 of the window controller 450. In some cases, the output from the one or more sensors may be input to a BMS or to a window system. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Room Sensors and Window Controller

Figure 5:
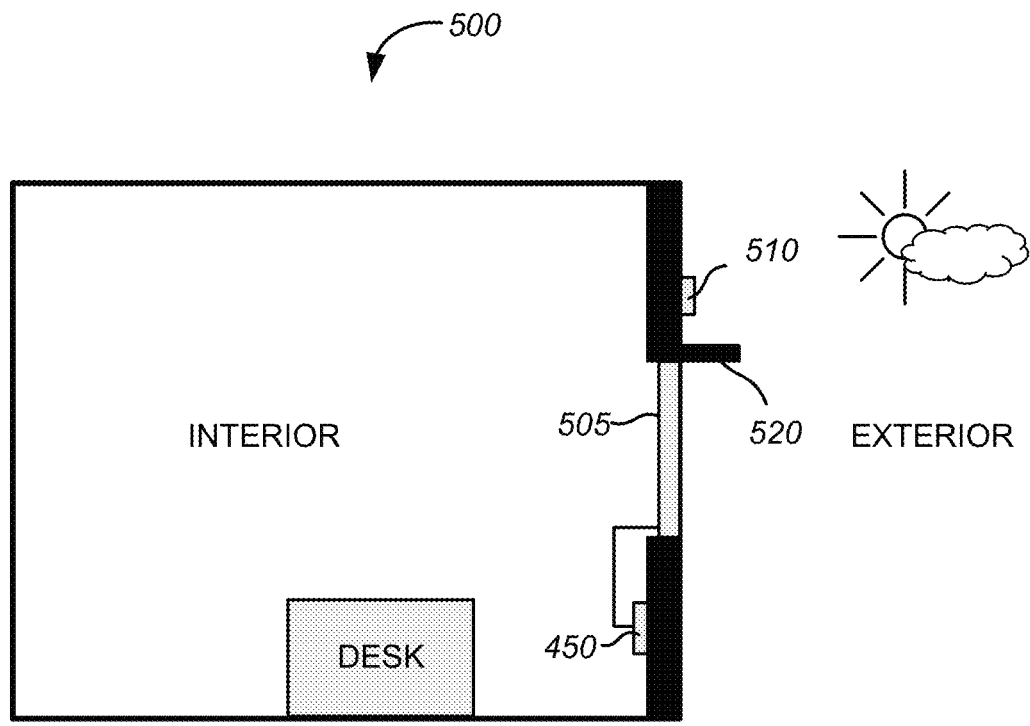
FIG. 5 depicts a schematic diagram of a room including a tintable window and at least one sensor.

FIG. 5 depicts a schematic diagram of a room 500 having a tintable window 505 with at least one electrochromic device. The tintable window 505 is located between the exterior and the interior of a building, which includes the room 500. The room 500 also includes a window controller 450 connected to and configured to control the tint level of the tintable window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/m$^2$ or other similar units. In other cases, the device may detect light in the visible range of wavelengths in units of foot candles or similar units. In many cases, there is a linear relationship between these values of irradiance and visible light.

Irradiance values from sunlight can be predicted based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single tintable window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun.

These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to a BMS or window system. The input may be in the form of a voltage signal. The BMS or window system may process the input and pass an output signal with tinting instructions to the window controller 450 directly or through a master window controller 1102 (shown in FIG. 1D). The tint level of the tintable window 505 may be determined based on configuration information, override values, etc. Window controller 450 then instructs the PWM 415, to apply a voltage and/or current to tintable window 505 to transition to the desired tint level.

In disclosed embodiments, window controller 450 can instruct the PWM 415, to apply a voltage and/or current to tintable window 505 to transition it to any one of four or more different tint levels. In disclosed embodiments, tintable window 505 can be transitioned to at least eight different tint levels described as: 0 (lightest), 5, 10, 15, 20, 25, 30, and 35 (darkest). The tint levels may linearly correspond to visual transmittance values and solar gain heat coefficient (SGHC) values of light transmitted through the tintable window 505. For example, using the above eight tint levels, the lightest tint level of 0 may correspond to an SGHC value of 0.80, the tint level of 5 may correspond to an SGHC value of 0.70, the tint level of 10 may correspond to an SGHC value of 0.60, the tint level of 15 may correspond to an SGHC value of 0.50, the tint level of 20 may correspond to an SGHC value of 0.40, the tint level of 25 may correspond to an SGHC value of 0.30, the tint level of 30 may correspond to an SGHC value of 0.20, and the tint level of 35 (darkest) may correspond to an SGHC value of 0.10.

The BMS or window system in communication with the window controller 450 or a master window controller in communication with the window controller 450 may employ any control logic to determine a desired tint level based on signals from the exterior sensor 510 and/or other input. The window controller 415 can instruct the PWM 460 to apply a voltage and/or current to electrochromic window 505 to transition it to the desired tint level.

The references to a BMS in the above description can be replaced in some or all instances with references to a smart thermostat service or other home appliance service such as NEST.

Control Logic for Controlling Windows in a Building

Figure 6:
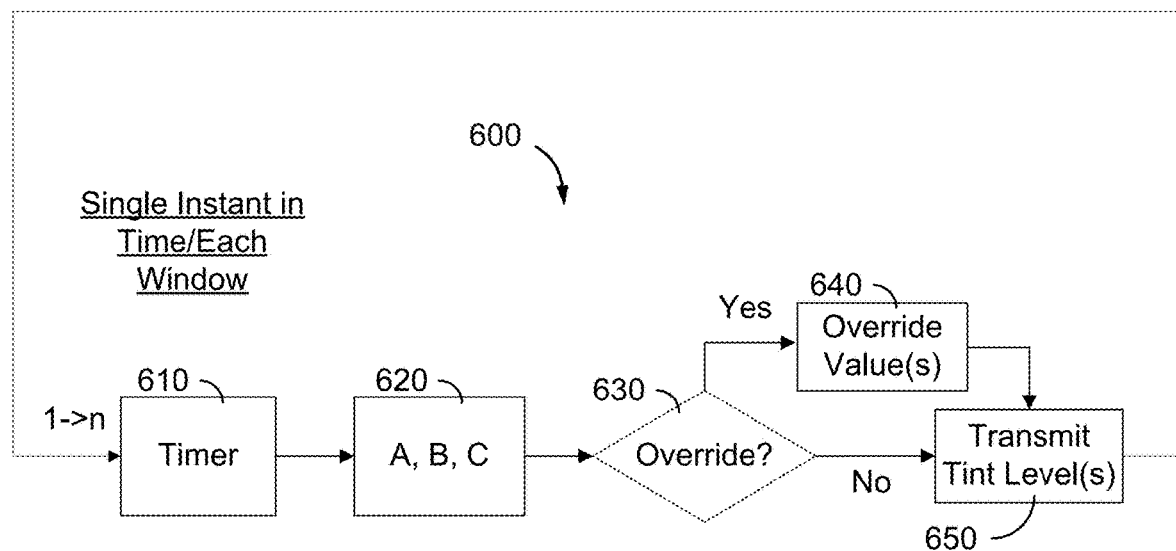
FIG. 6 is a flowchart showing some steps of predictive control logic for a method of controlling one or more electrochromic windows in a building.

FIG. 6 is a flowchart showing exemplary control logic for a method of controlling one or more tintable windows at a site, according to embodiments. The control logic uses one or more of the Modules A, B, and C to calculate tint levels for the tintable window(s) and sends instructions to transition the tintable window(s). The calculations in the control logic are run 1 to n times at intervals timed by the timer at step 610. For example, the tint level can be recalculated 1 to n times by one or more of the Modules A, B, and C and calculated for instances in time $t_i = t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass can take up to 30 minutes or more. For these large windows, calculations may be done on a less frequent basis such as every 30 minutes. Although Modules A, B, and C are used in the illustrated embodiment, one or more other logic modules can be used in other embodiments.

At step 620, logic Modules A, B, and C perform calculations to determine a tint level for each electrochromic window 505 at a single instant in time $t_i$. These calculations can be performed by the window controller 450 or by a window system. In certain embodiments, the control logic predictively calculates how the window should transition in advance of the actual transition. In these cases, the calculations in Modules A, B, and C can be based on a future time around or after transition is complete. In these cases, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

At step 630, the control logic allows for certain types of overrides that disengage the algorithm at Modules A, B, and C and define override tint levels at step 640 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic to ensure that all windows have a particularly high level of tinting. Another example of an override may be if there is no occupant in the room, for example, over a weekend in a commercial office building. In these cases, the building may disengage one or more Modules that relate to occupant comfort. In another example, an override may be that all the windows may have a high level of tinting in cold weather or all the windows may have a low level of tinting in warm weather.

At step 650, instructions with the tint levels are transmitted over a site network to window controller(s) in communication with electrochromic device(s) in one or more tintable windows 505 in the building. In certain embodiments, the transmission of tint levels to all window controllers of a building may be implemented with efficiency in mind. For example, if the recalculation of tint level suggests that no change in tint from the current tint level is required, then there is no transmission of instructions with an updated tint level. As another example, the building may be divided into zones based on window size. The control logic may calculate a single tint level for each zone. The control logic may recalculate tint levels for zones with smaller windows more frequently than for zones with larger windows.

In some embodiments, the logic in FIG. 6 for implementing the control methods for multiple tintable windows 505 in an entire site can be on a single device, for example, a single master window controller. This device can perform the calculations for each and every window in the site and also provide an interface for transmitting tint levels to one or more electrochromic devices in individual tintable windows 505.

Also, there may be certain adaptive components of the control logic of embodiments. For example, the control logic may determine how an end user (e.g. occupant) tries to override the algorithm at particular times of day and makes use of this information in a more predictive manner to determine desired tint levels. In one case, the end user may be using a wall switch to override the tint level provided by the predictive logic at a certain time each day to an override value. The control logic may receive information about these instances and change the control logic to change the tint level to the override value at that time of day.

User Interface

Figure 7:
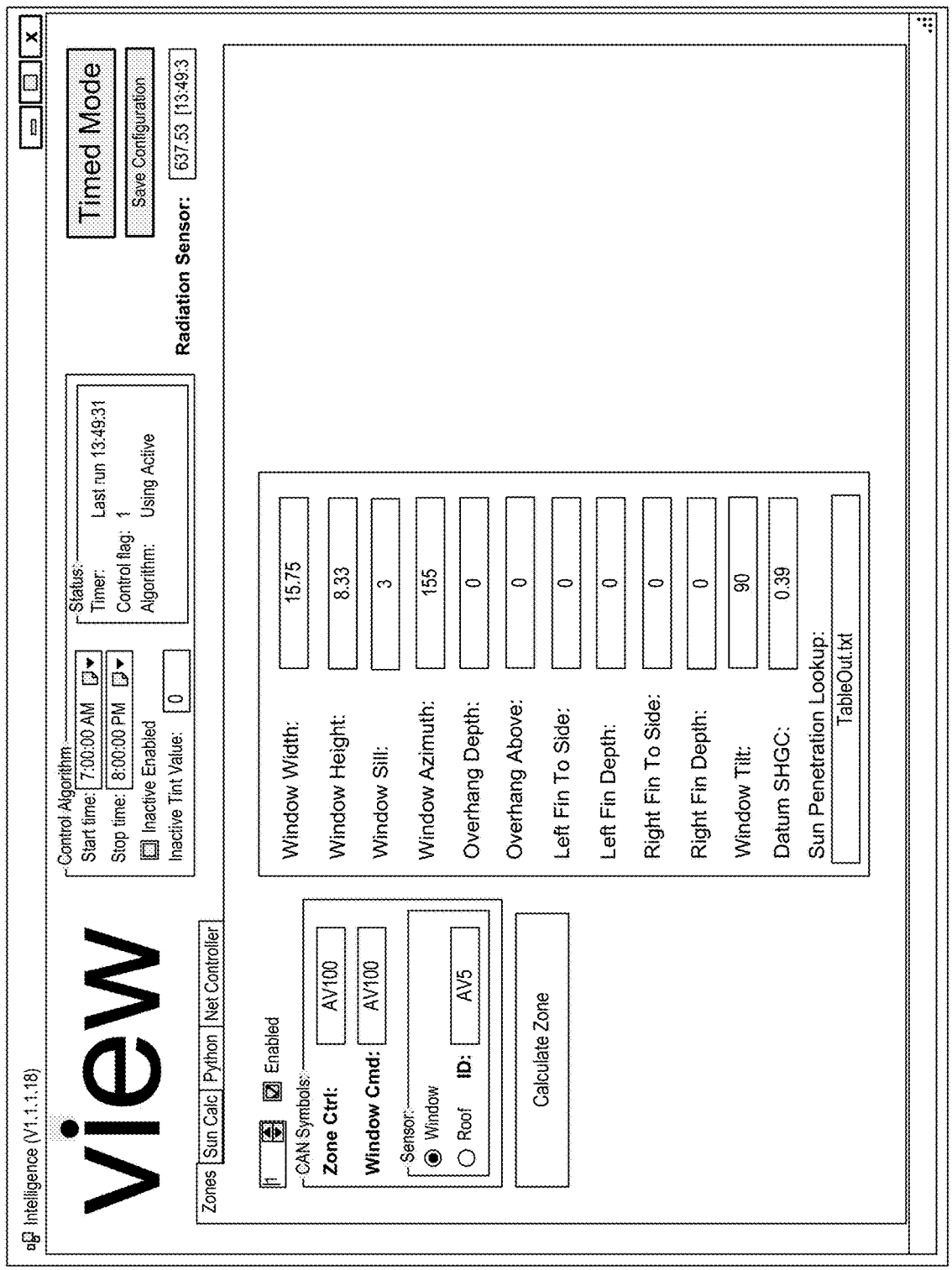
FIG. 7 is an illustration of an example of a user interface that can be used to enter schedule information to generate a schedule employed by a window controller.

The portion of the control logic employed by window controller may also include a user interface, in certain cases, in electronic communication with a master scheduler. An example of a user interface 1405 is shown in FIG. 7. In this illustrated example, the user interface 1405 is in the form of a table for entering schedule information used to generate or change a schedule employed by a master scheduler. For example, the user can enter the time period into the table by entering start and stop times. The user can also select a sensor used by a program. The user can also enter Site data and Zone/Group Data. The user can also select an occupancy lookup table to be used by selecting "Sun Penetration Lookup."

User interface 1504 is in electronic communication with a processor (e.g., microprocessor) and/or in electronic communication with a computer readable medium (CRM). The processor is in communication with the CRM. The processor is a component of the window controller 1110. The CRM may be a component of the window controller 1110 or may be a component of the BMS or site monitoring system. The logic in the master scheduler and other components of the control logic may be stored on the CRM of the window controller 1110, the BMS, or the site monitoring system User interface 1504 may include an input device such as, for example, a keypad, touchpad, keyboard, etc. User interface 1504 may also include a display to output information about the schedule and provide selectable options for setting up the schedule.

A user may input their schedule information to prepare a schedule (generate a new schedule or modify an existing schedule) using the user interface 1504.

A user may enter their site data and zone/group data using user interface 1504. Site data 1506 includes the latitude, longitude, and GMT Offset for the location of the site. Zone/group data includes the position, dimension (e.g., window width, window height, sill width, etc.), orientation (e.g., window tilt), external shading (e.g., overhang depth, overhang location above window, left/right fin to side dimension, left/right fin depth, etc.), datum glass SHGC, and occupancy lookup table for the one or more tintable windows in each zone of the site. In certain cases, site data and/or zone/group data is static information (i.e. information that is not changed by components of the predictive control logic). In other embodiments, this data may be generated on the fly. Site data and zone/group data may be stored on the CRM of the window controller 1110 or on other memory.

When preparing (or modifying) the schedule, the user selects the control program that a master scheduler will run at different time periods in each of the zones of a site. In some cases, the user may be able to select from multiple control programs. In one such case, the user may prepare a schedule by selecting a control program from a list of all control programs (e.g., menu) displayed on user interface 1405. In other cases, the user may have limited options available to them from a list of all control programs. For example, the user may have only paid for the use of two control programs. In this example, the user would only be able to select one of the two control programs paid for by the user.

EXAMPLES

A Site Monitoring System

FIG. 8 shows an example of a dashboard for site monitoring system. The depicted view includes a row for each of multiple sites monitored by the system, with each row including a site name, its current status, and a most recent update time. The status row indicates whether or not all monitored devices and controllers in the site appear to be functioning properly. A green light may be used to indicate no problems, a red light may be used to indicate that a problem exists, and a yellow light may be used to indicate that a device or controller is trending toward a problem. One field of the view provides a link to details about the site. Thus, if the dashboard shows that there may be a problem at the site, the user can obtain pull up event logs, sensor output, window electrical responses, etc. for the site. This allows the user to drill down quickly to the precise issue while still having a high-level picture of any sites that have issues.

Figure 9:
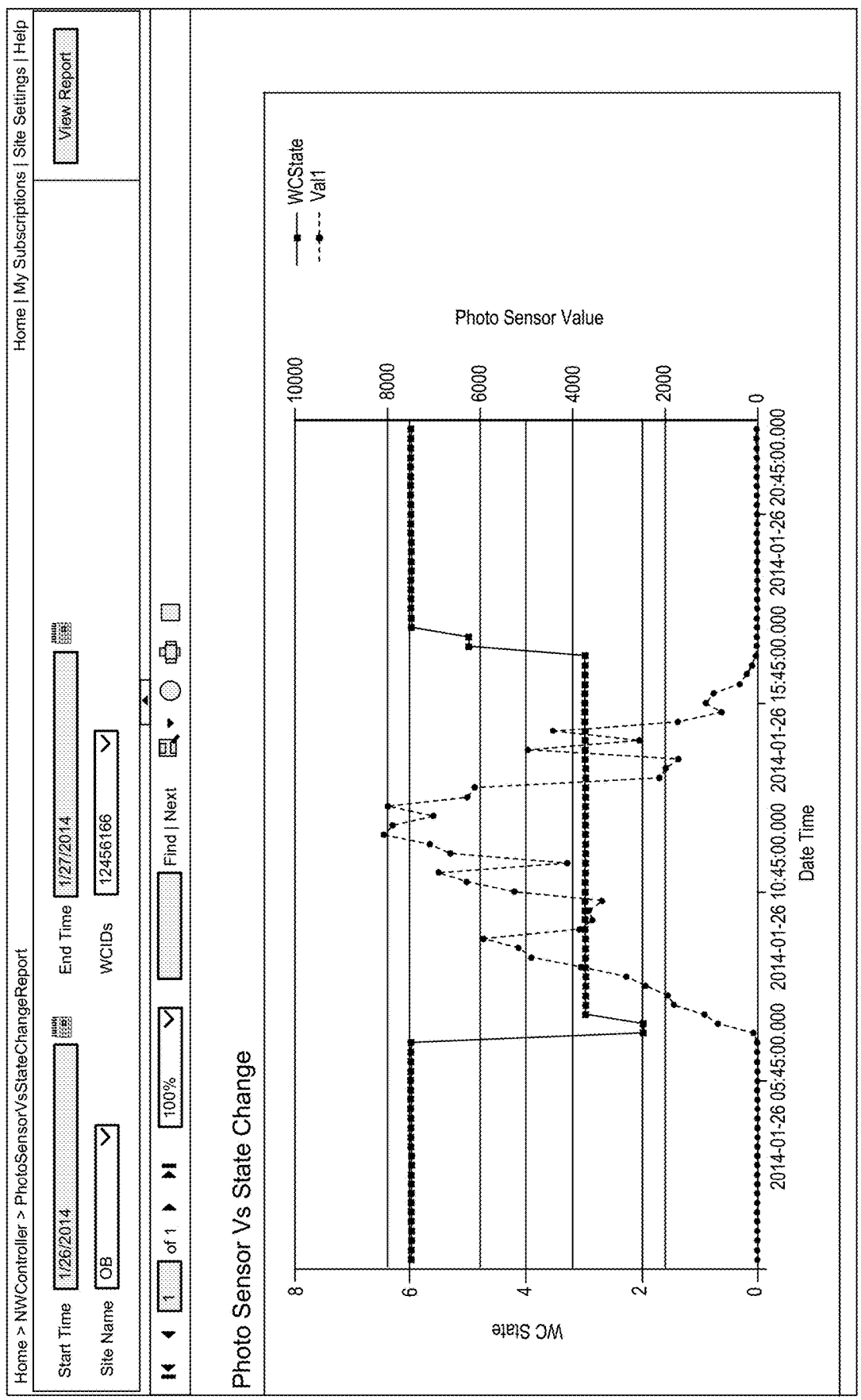
FIG. 9 presents an example of photosensor data that may be obtained by a site monitoring system.

FIG. 9 presents an example of one type of site information that may be obtained by a site monitoring system. The graph presents the output signal from a photosensor over time. This information is presented with the tint state of a window that is controlled using information from the sensor. As illustrated, the window tint state reasonably corresponds with the sensor output.

Figure 10:
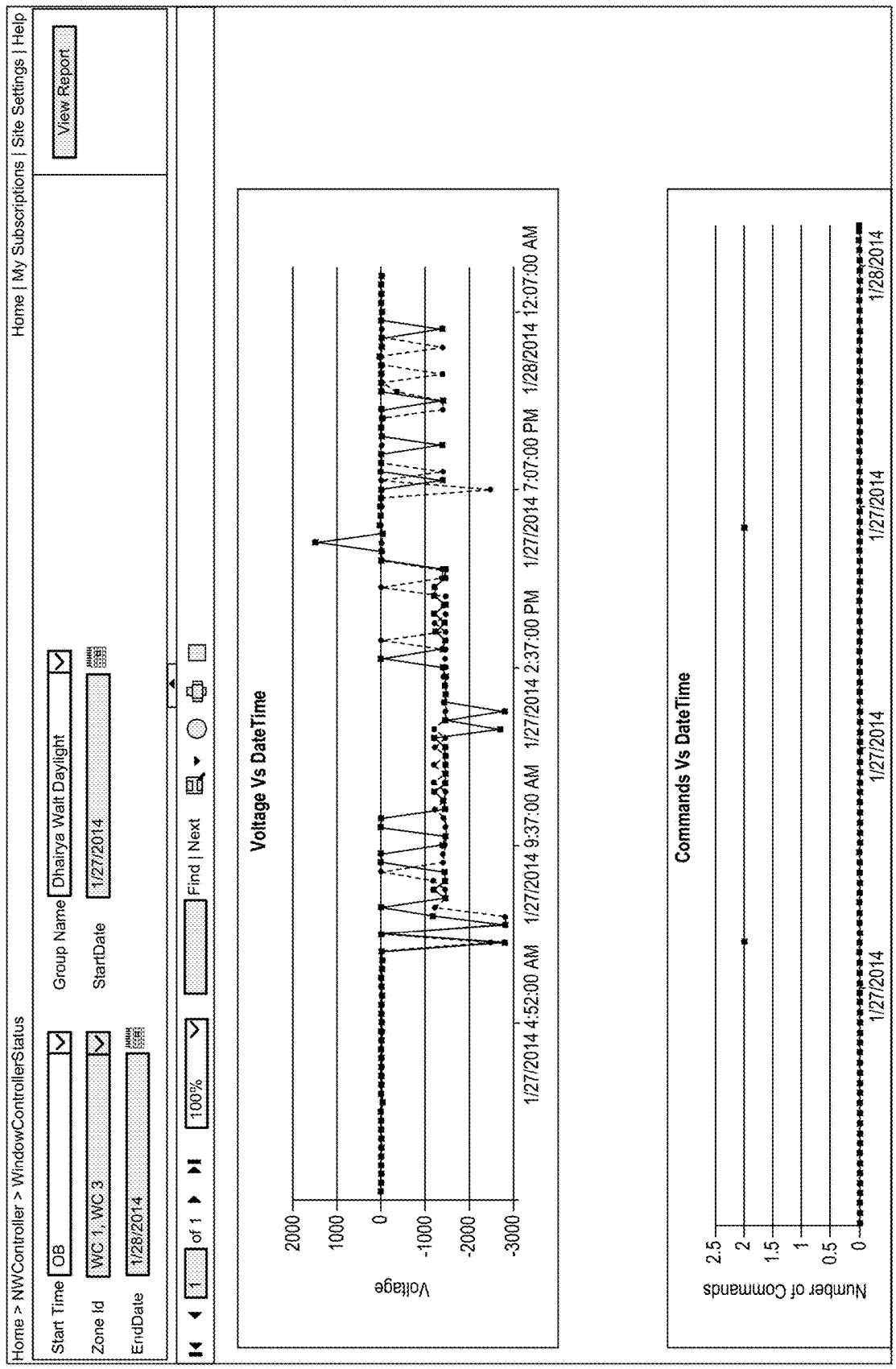
FIG. 10 presents data showing a window's response is shown in relation to commands issued by a controller for the window. This is another example of site information that may be obtained by a monitoring system.

FIG. 10 presents another example of site information that may be obtained by a monitoring system. In this case, a window's response is shown in relation to commands issued by a controller for the window.

Figure 11:
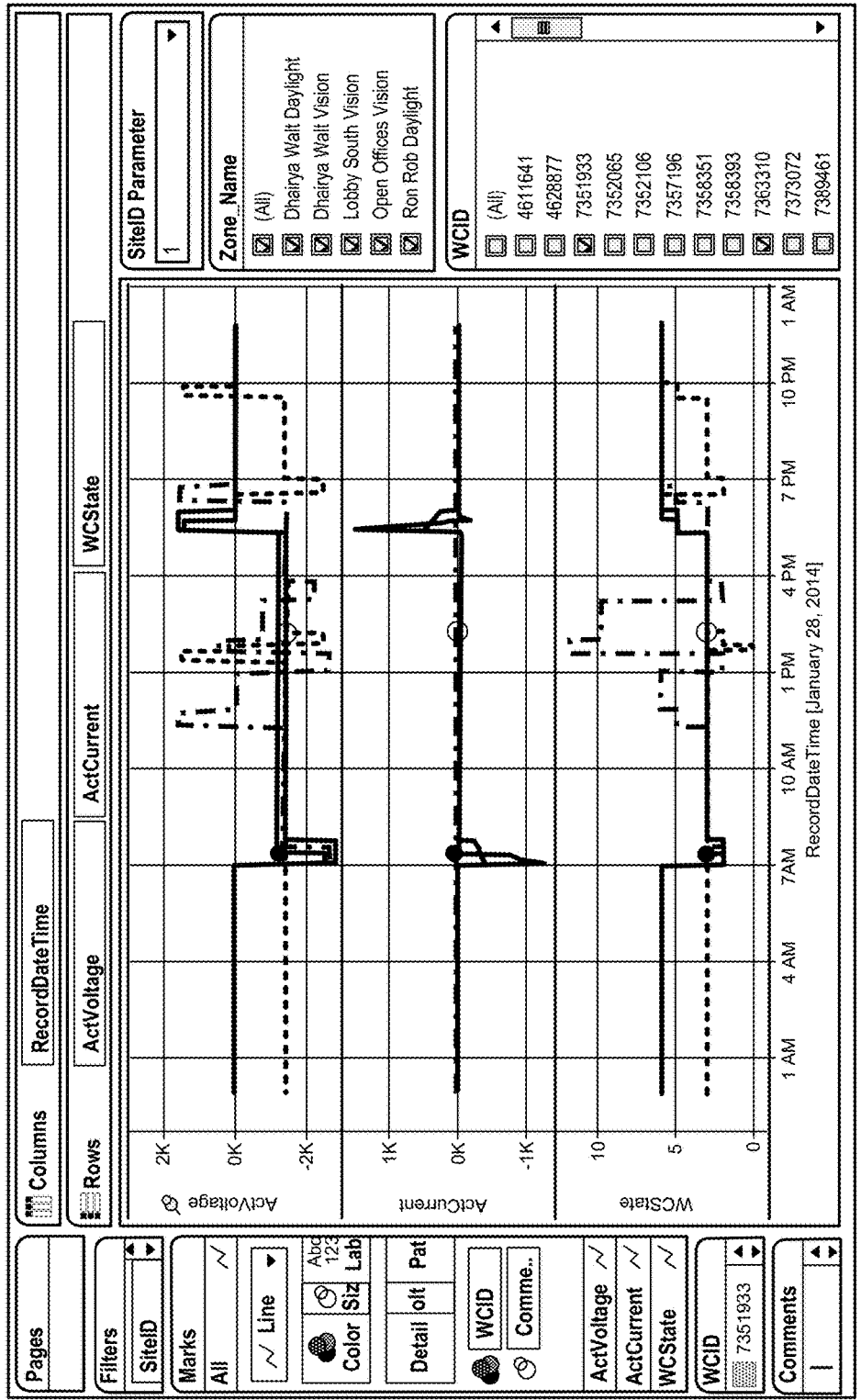
FIG. 11 shows state transitions of windows controlled by three different network controllers in a site. This is yet another example of site information that can be monitored and stored.

FIG. 11 shows yet another example of site information that can be monitored and stored. This example shows state transitions of windows (using current, voltage, and controller commands) controlled by three different network controllers in a site. If the transitions of one of the windows are inconsistent with expected behavior, it may indicate a problem with the associated network controller.

Figure 12:
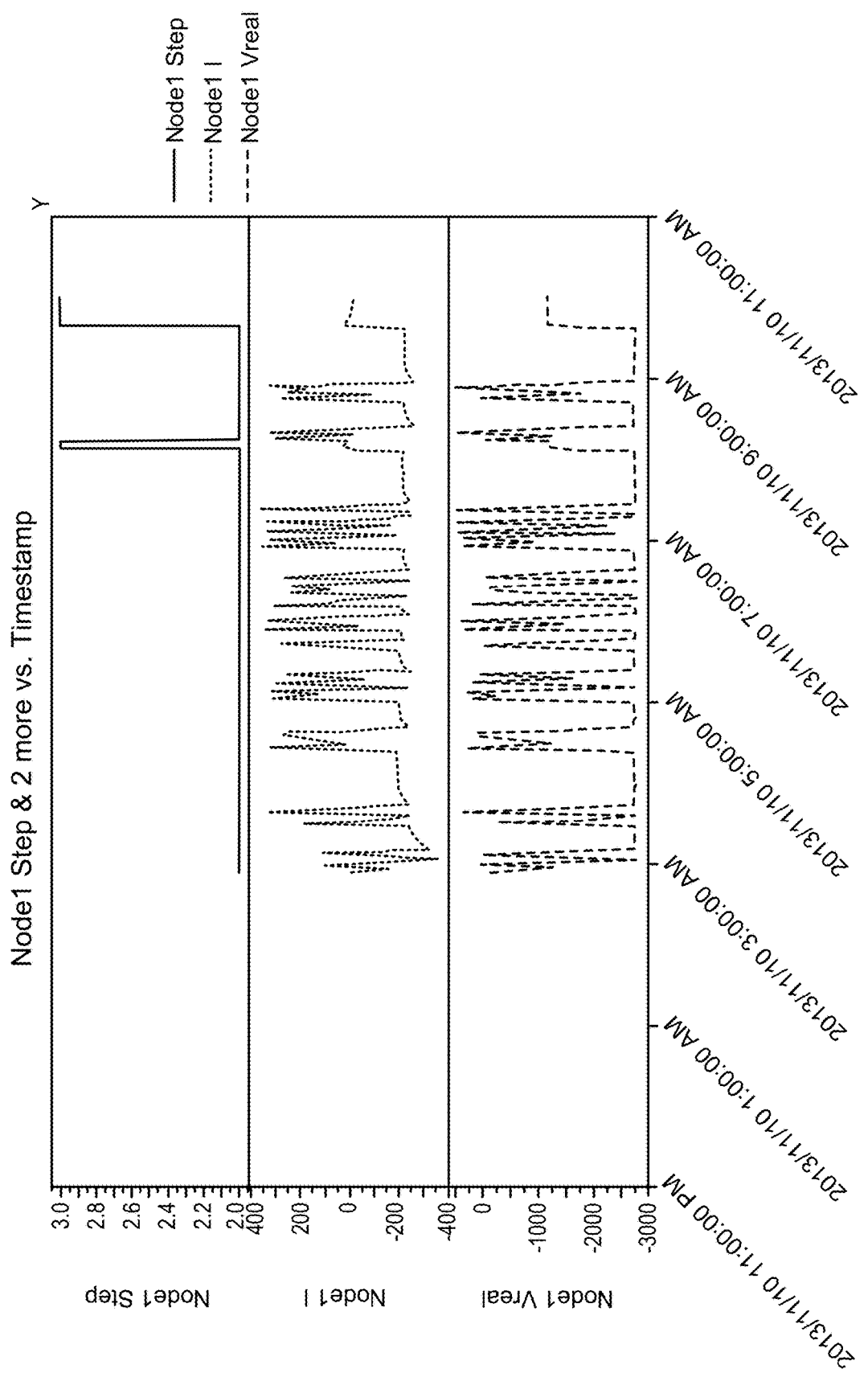
FIG. 12 shows site monitored data illustrating the case when a multiple tinting is required to switch a device from one optical state to another.

FIG. 12 illustrates the case when multiple tinting operations are required to switch a device from one optical state to another. See case 1g above. Each unsuccessful attempt to switch a device (whether successful or not) impacts the lifetime of device. The lower trace represents the voltage to the window and the middle trace represents the current to the window. In a properly executed transition, the applied voltage will settle to a hold voltage of about −1200 mV. Clearly, this is not the case with the monitored window under consideration, a situation that may be flagged by the site monitoring system. In certain embodiments, the system includes an autodiagnostic function that notes attempts to double tint and double clear, situations that may result in early failure.

Figure 13:
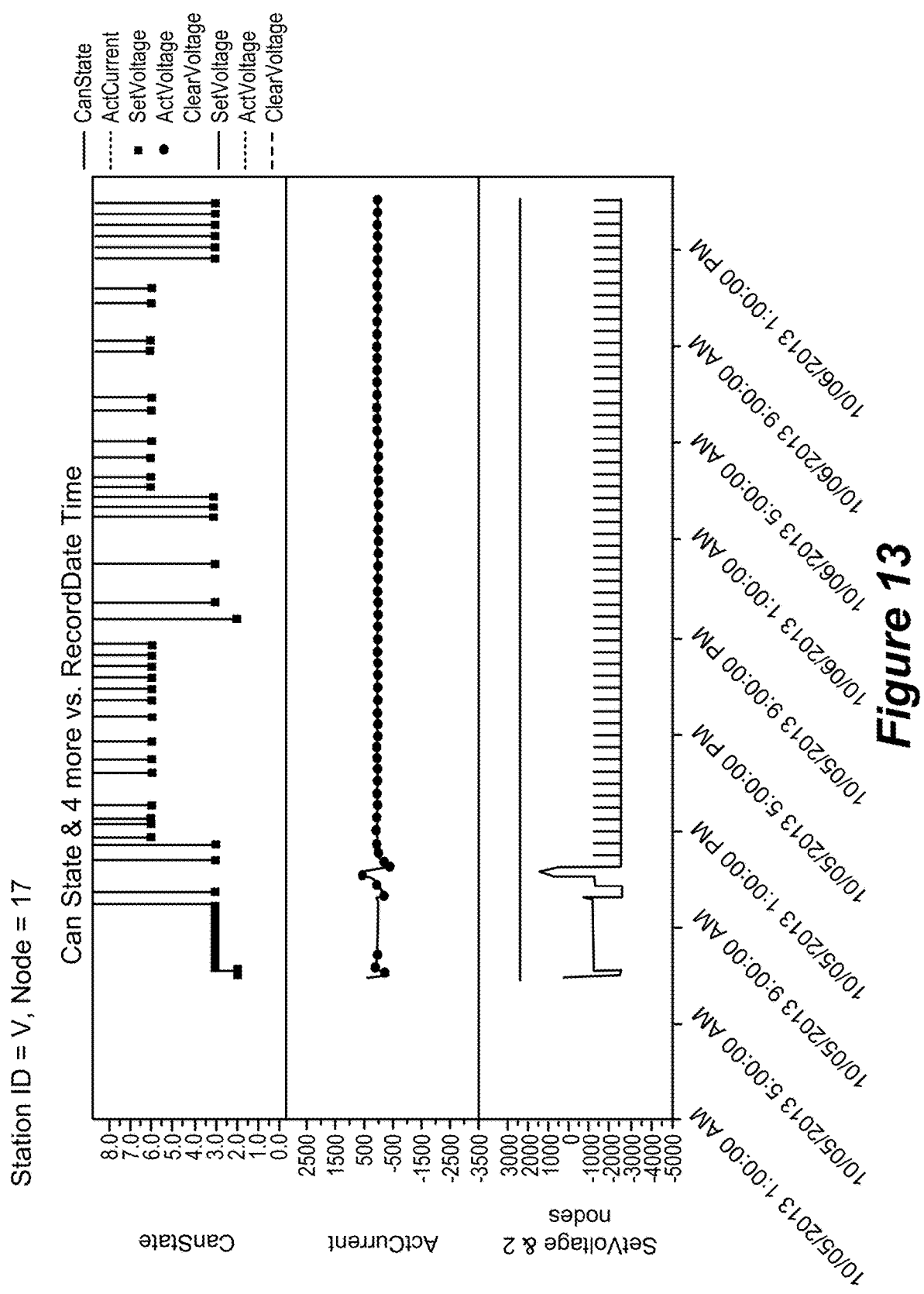
FIG. 13 shows site monitored data indicating degradation in the connection of a power line to a integrated glass unit.

FIG. 13 presents an example of monitored data that may be used to diagnose a potential problem with an electrical connector to a window or controller, possibly through a window frame or IGU. See monitoring case 3b above. As mentioned, a "pigtail" is sometimes used to connect wiring from a power source to the window. In some cases, the connector connects directly to a controller. The information contained in FIG. 13 shows that a constant command was issued by a high level controller (e.g., a master network controller). See the flat line, third from the top. However the window controller's applied voltage and current (lower and upper traces) show rapid and significant changes, which may be diagnosed as a problem with the connection. In response, personnel can be instructed to check the connection and replace it if necessary.

Figure 14A:
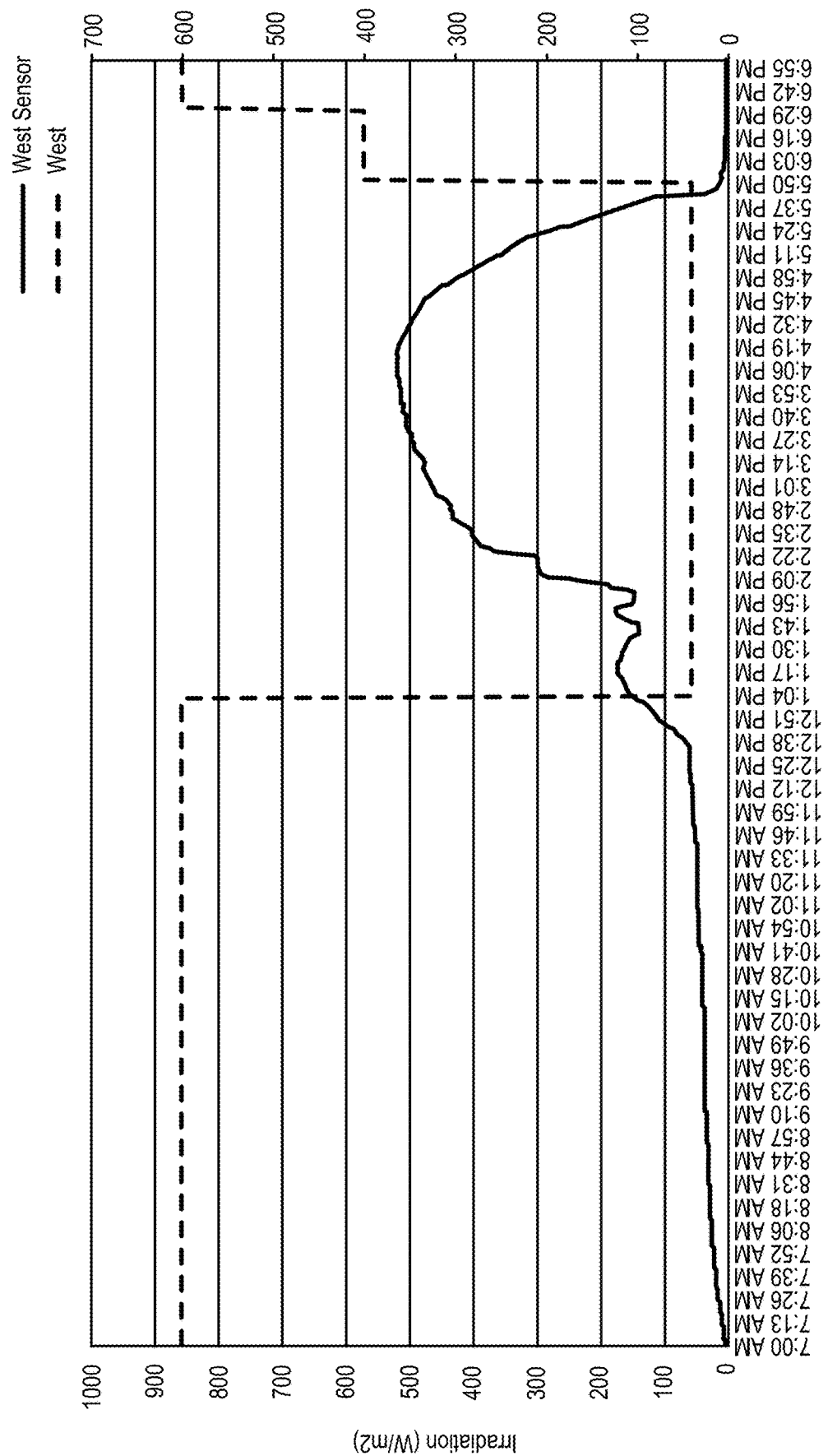
FIGS. 14A-D show site monitored data comparing zone state changes that may be used by the monitoring system to ensure that the control logic is working properly.
Figure 14B:
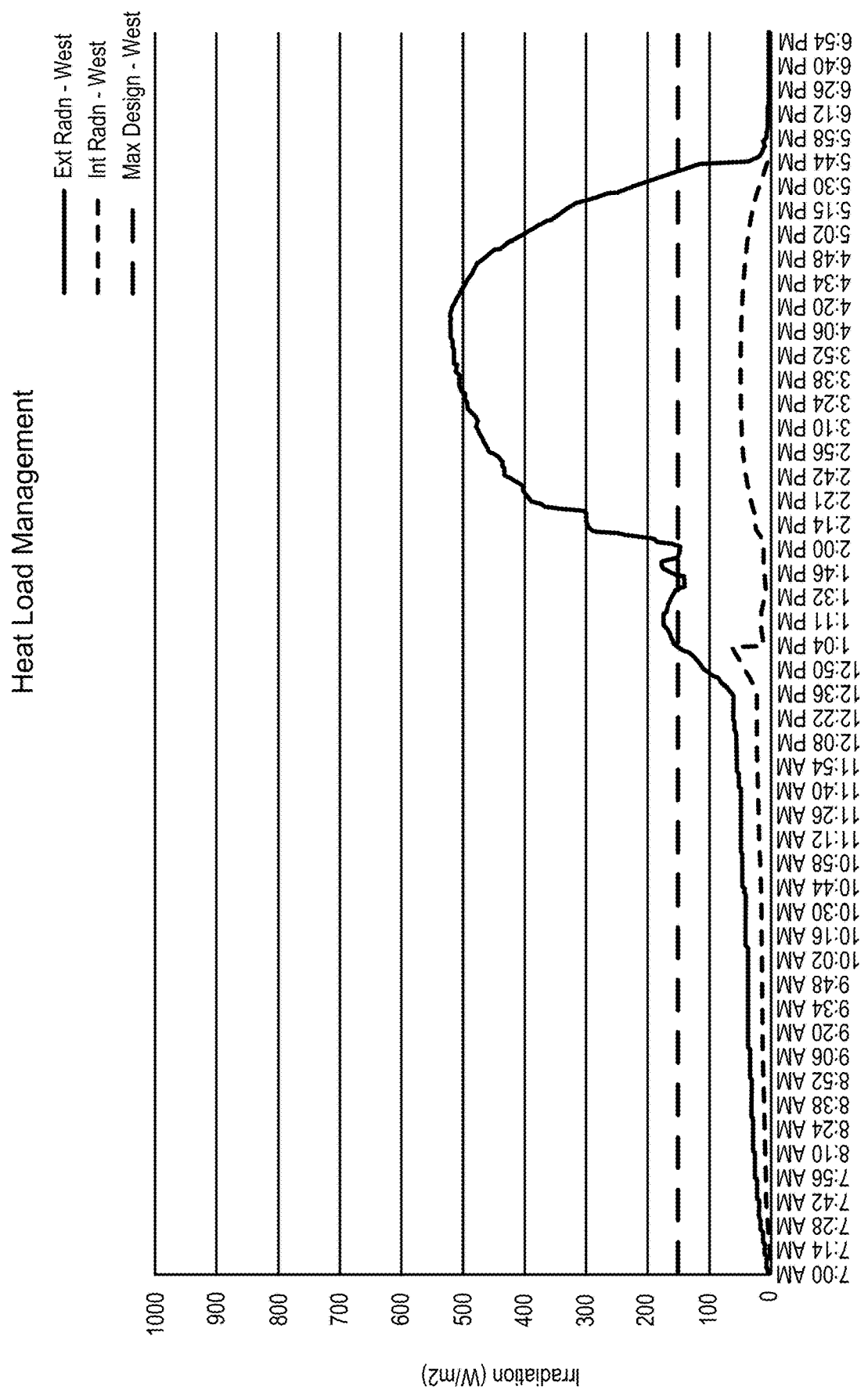
Figure 14C:
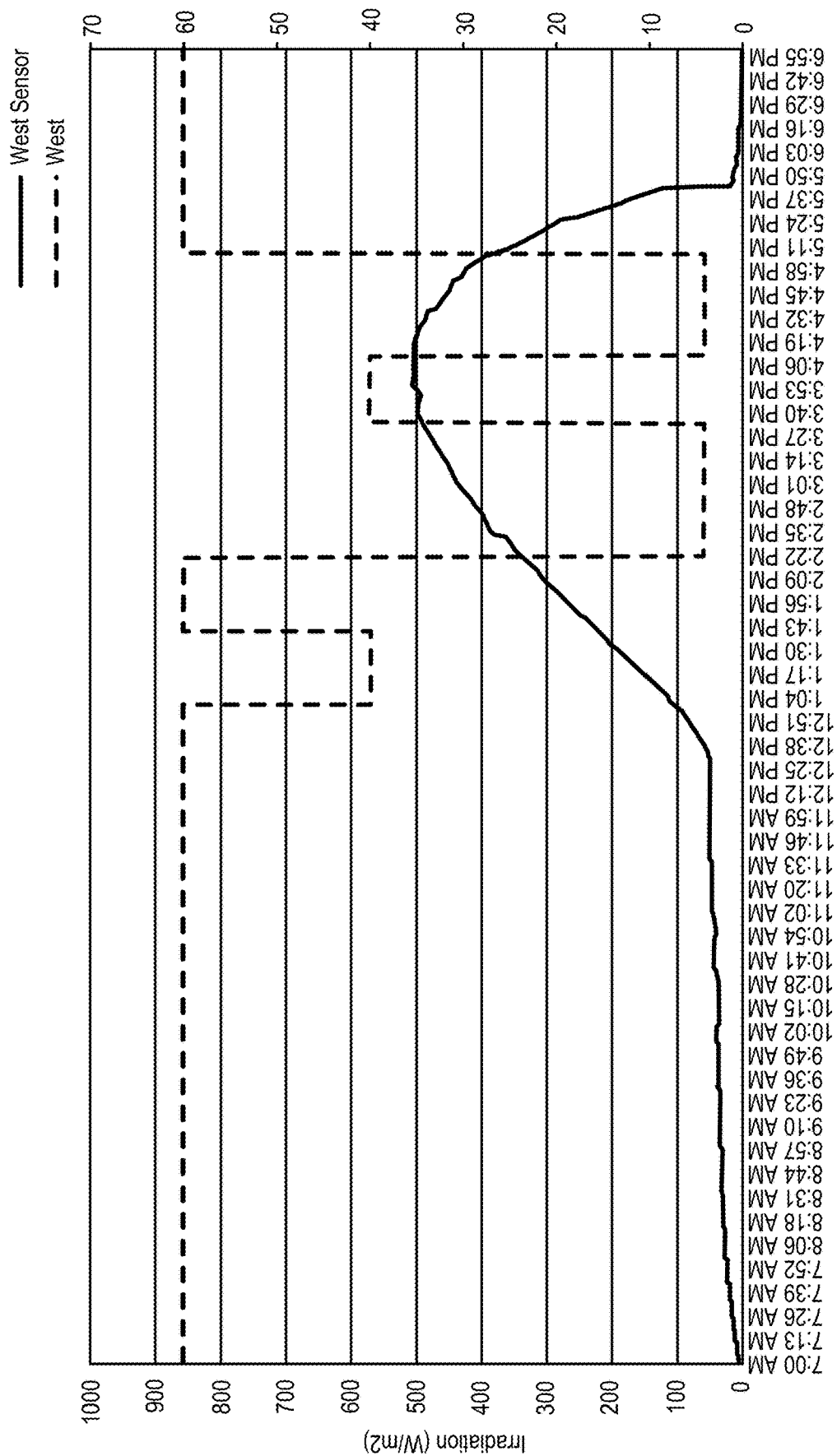
Figure 14D:
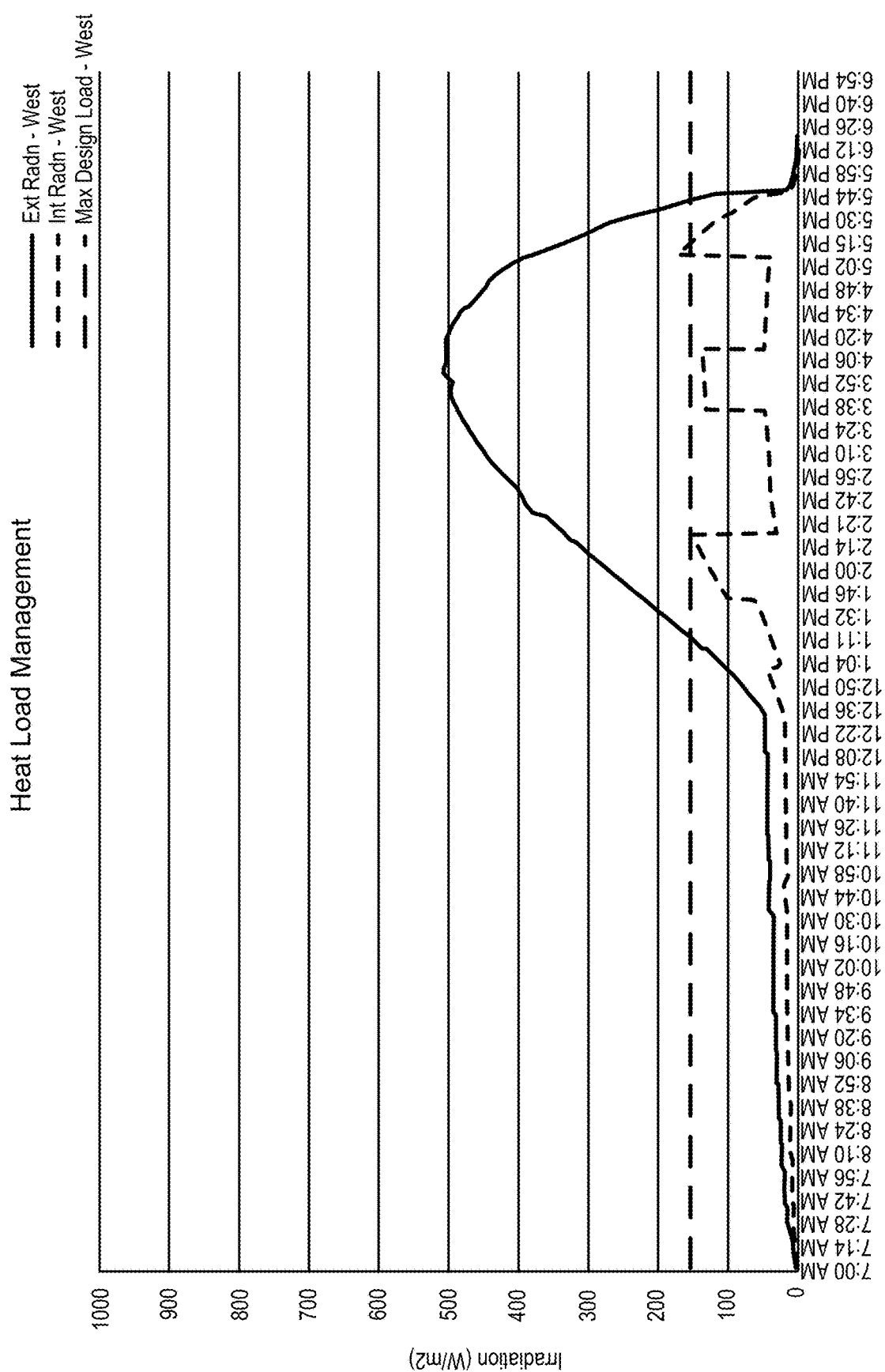

FIGS. 14A-D illustrate monitored information relating solar radiation (as detected by photo detector on the site exterior) to window tinting and heat load. FIGS. 14A and 14C illustrate monitored data for a properly functioning controller and window, while FIGS. 14B and 14D illustrate data for an improperly functioning controller and/or window. In FIG. 14A, the darker curve represents irradiance (W/m2) over time as detected by the photo detector, while the lighter more linear plot represents the tinting state of a window facing the same direction as the photo detector. As expected for a properly functioning tinting algorithm, the window tints when the solar irradiance increases. By contrast, the tinting shown in FIG. 14C does not follow an expected path; it drops to a high transmissivity state during maximum solar exposure. This situation may be automatically detected and flagged by the site monitoring system. The system may include further logic for determining whether this otherwise problematic situation is actually acceptable due to, e.g., a common override for the subject window or controller at the site. If such override is identified, the monitoring site may conclude that no problem exists and/or that it should change the tinting algorithm to capture the override.

FIG. 14B illustrates the radiative heat load through a window (or group of windows) at the site as a function as a function of time. The upper curve represents the radiative heat flux (W/m2) that the building would receive if no tinting was applied. The lower dashed curve represents the actual radiative heat load at the site when the window(s) in question is tinted according to the properly functioning algorithm as depicted in FIG. 14A. The flat middle dashed line represents a designed maximum radiative heat load that may be associated with a standard window type (e.g., static tinted glass or low E glass). As shown in FIG. 14B, the actual radiative heat load is well below both the no-tint heat load and the designed heat load. In this situation, the site monitoring system will not flag a problem. It may, however, calculate and optionally save or present the quantity of energy saved using the switchably tinting windows. Energy can be calculated from the area under the curves. The difference between the area under the upper solid curve (no tinting) and the lower dashed curve (controlled tinting) corresponds to the energy saved using controlled tinting in the site under consideration. Similarly, the difference between the area under the middle dashed line (design heat load) and the lower dashed curve (controlled tinting) corresponds to the energy saved in comparison to a standard static approach to managing radiant heat flux.

FIG. 14D illustrates the heat load as in FIG. 14B but for the potentially problem tinting reflected in FIG. 14C. In this case, the heat load temporarily exceeds the design heat load, but stays well below the heat load that would result from no tinting. Over time, this window/controller still saves energy in comparison to the design heat load.

Figure 15:
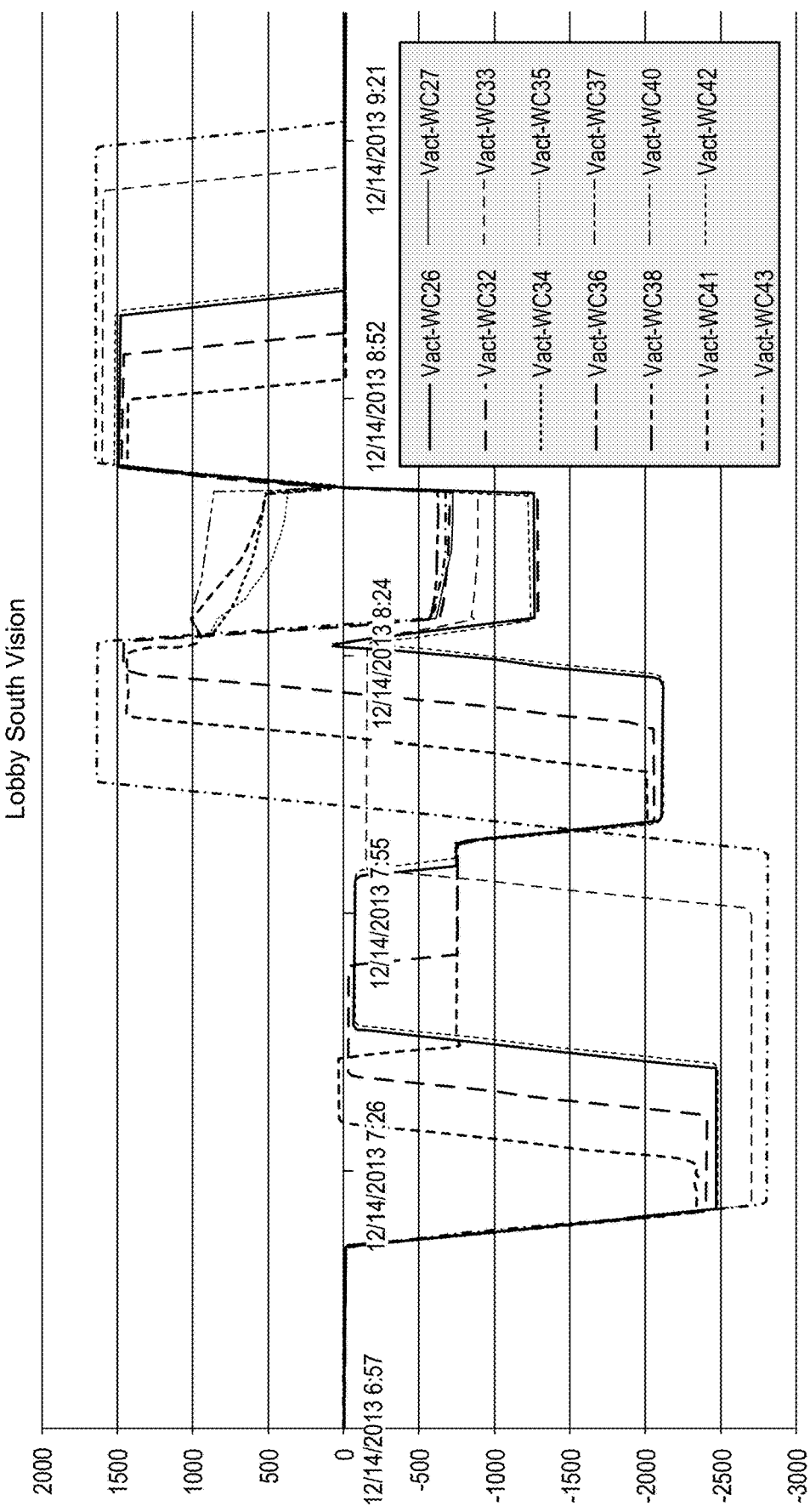
FIG. 15 illustrates monitored data for multiple windows from the same zone but having different switching characteristics.

FIG. 15 illustrates monitored data for multiple windows having different switching characteristics and possibly having different sizes. Each trace in the figure represents the switching voltage over time for a different window. As shown, different windows exhibit different switching times; the lowest V trace is for a window having the longest switching time. In the depicted example, the different windows are part of the same bank or zone and consequently should transition at the same or similar rates. When the monitoring system receives data as shown in FIG. 15 it can automatically determine that the switching times vary widely and possibly well out of specification. This may trigger an adjustment in the switching algorithm for some or all of the windows; the algorithm may be changed to slow the transition rate of fast switching windows and/or increase the rate of slow switching windows.

Figure 16:
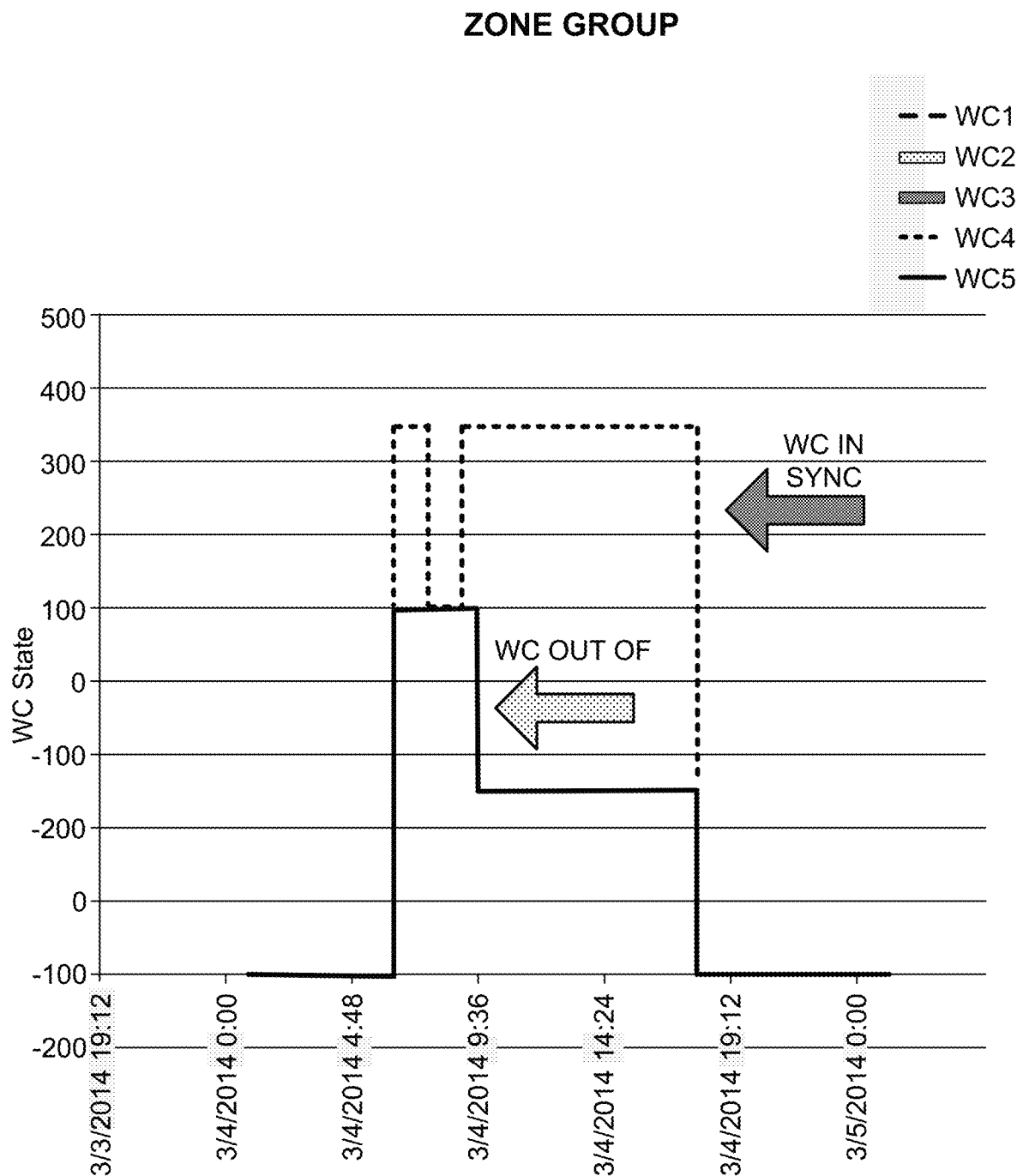
FIG. 16 illustrates monitor information showing that a zone under consideration has one of the controllers is out of sync with rest of the controllers in the zone.

FIG. 16 provides monitor information showing that the zone under consideration has a potential problem or error because one of the controllers is out of sync with rest of the controllers in the zone. With such information, the monitoring system or personnel accessing the system can further investigate the problem to isolate the controller, its connections, a window it controls, etc.

Figure 17:
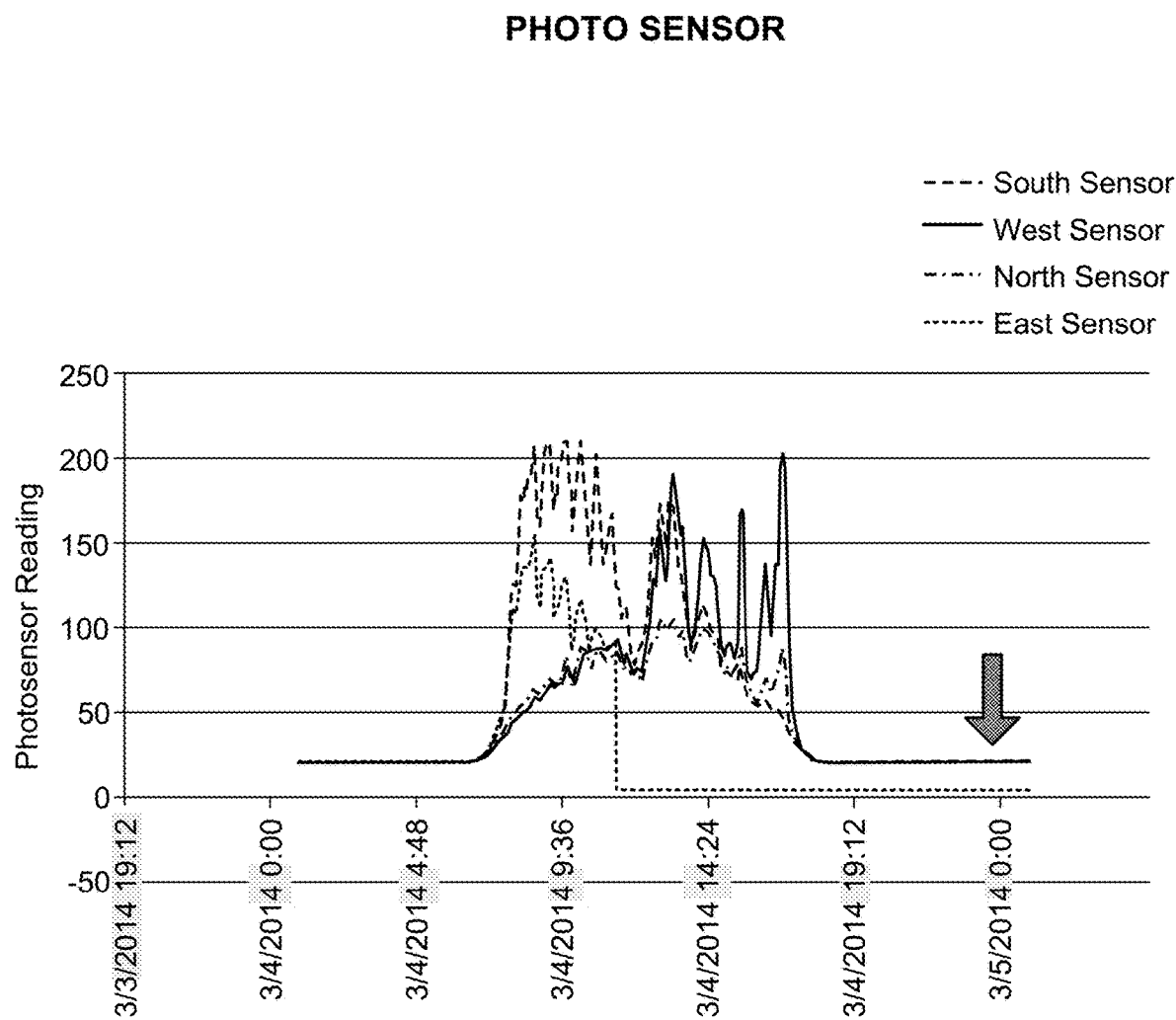
FIG. 17 provides monitor information for four photosensors, each facing a different direction, on a site.

FIG. 17 provides monitor information for four photosensors, each facing a different direction, on a site. The East sensor has stopped working as shown by its output value dropping to near zero and then not changing at all. Because the other sensors are still reading and the time is early in the afternoon, the system can eliminate the possibility that no light is hitting the site exterior, which could also lead to the very low reading. The monitoring system may conclude that the East photosensor has failed.

FIGS. 18A-I present an example of field degradation and detection using features 1.a, 1.b and 1.f from the "Data Monitored" section: changes in peak current, changes in hold (leakage) current, and comparison with other window controllers on the same façade with identical loads. In this example, window controllers WC1-WC11 have similar loads (two integrated glass units/controller) and they control windows on same façade. Controller WC12 is on same façade but has half the load (1 IG/controller). Stored information on the controllers is provided in the graph of FIG. 18A, where W, H, and SF are the windows' widths, heights, and square feet (area). The system expects that controllers WC1-WC11 will have the same drive and hold current profiles.

Figure 18B:
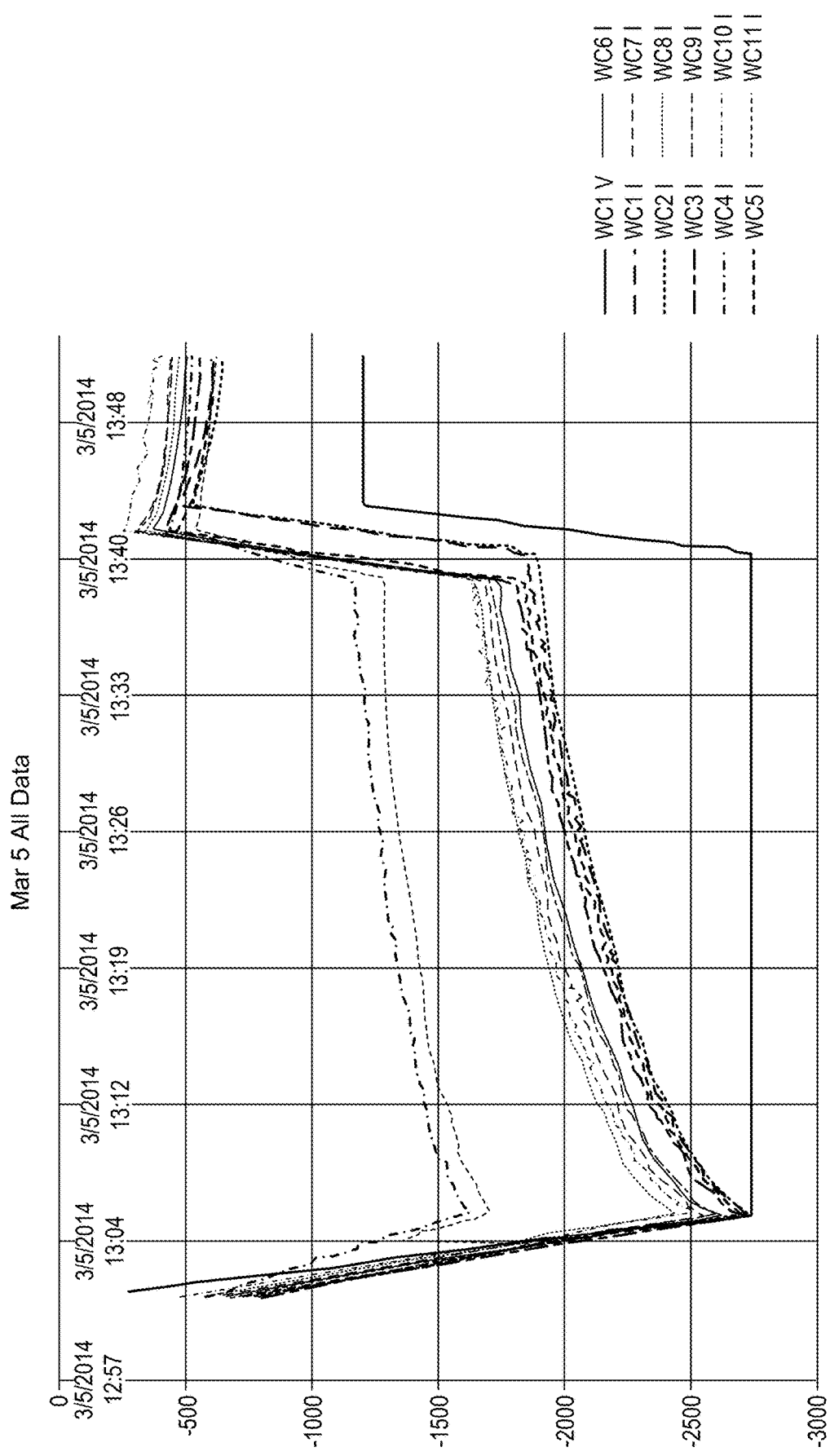
Figure 18C:
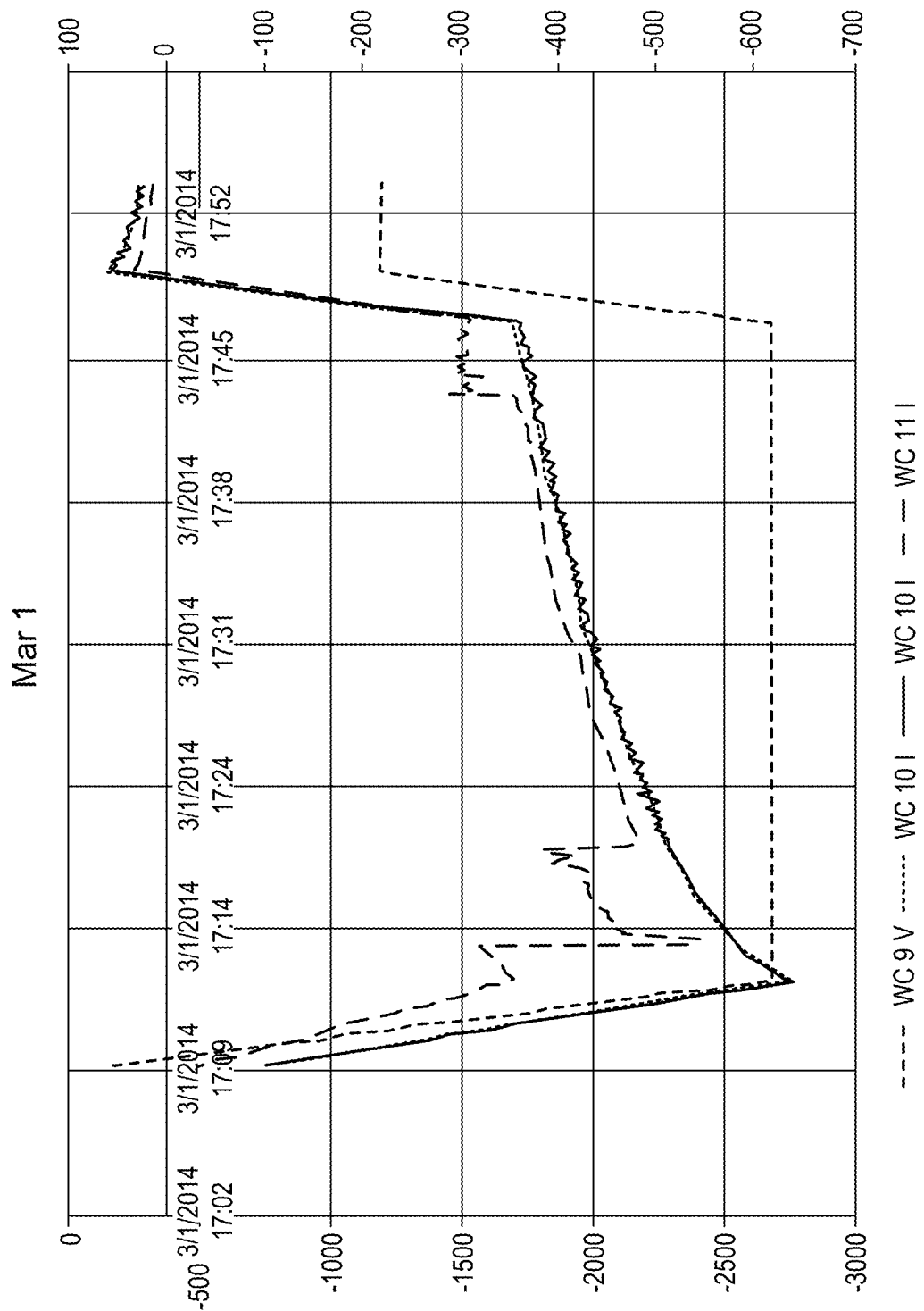
Figure 18D:
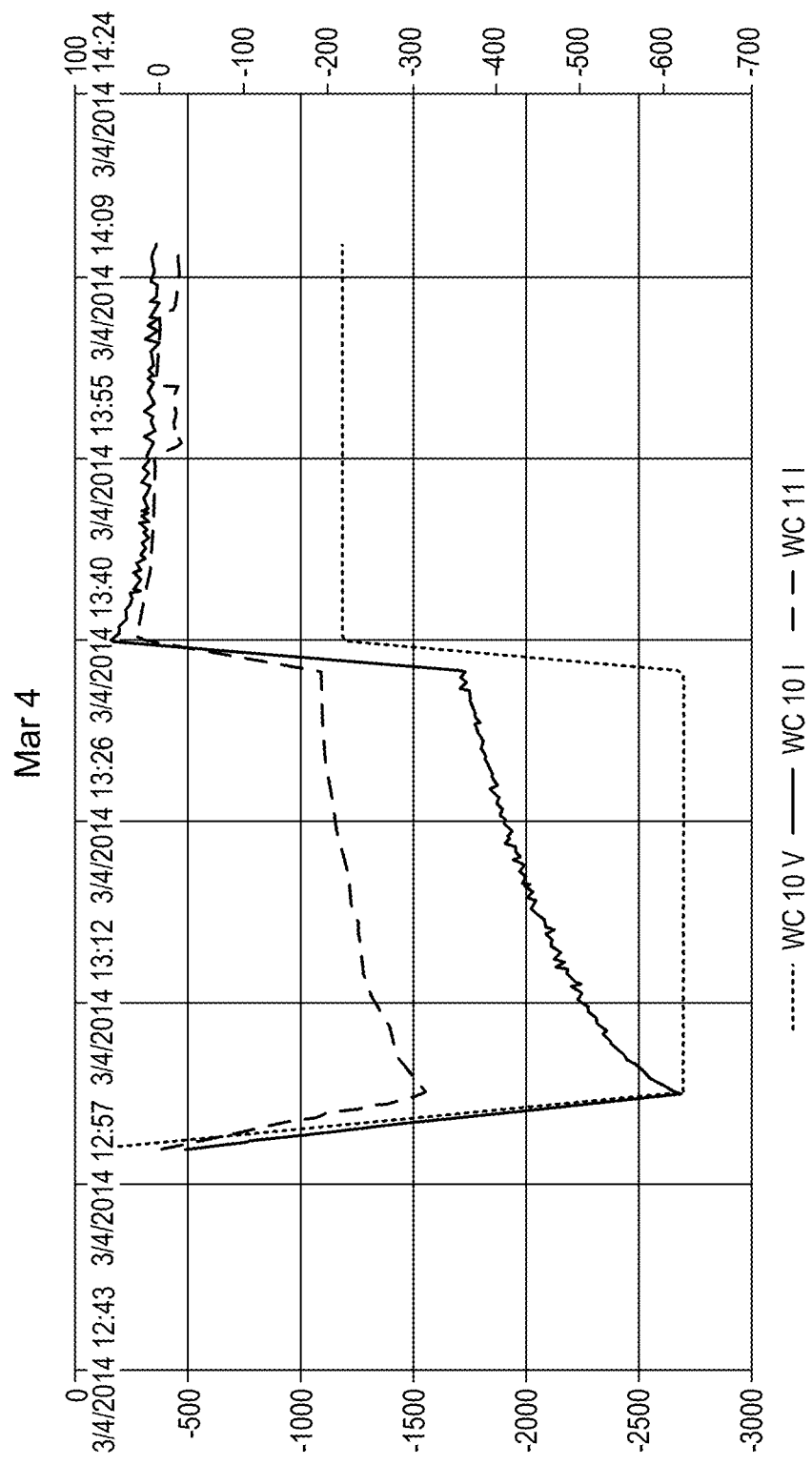
Figure 18E:
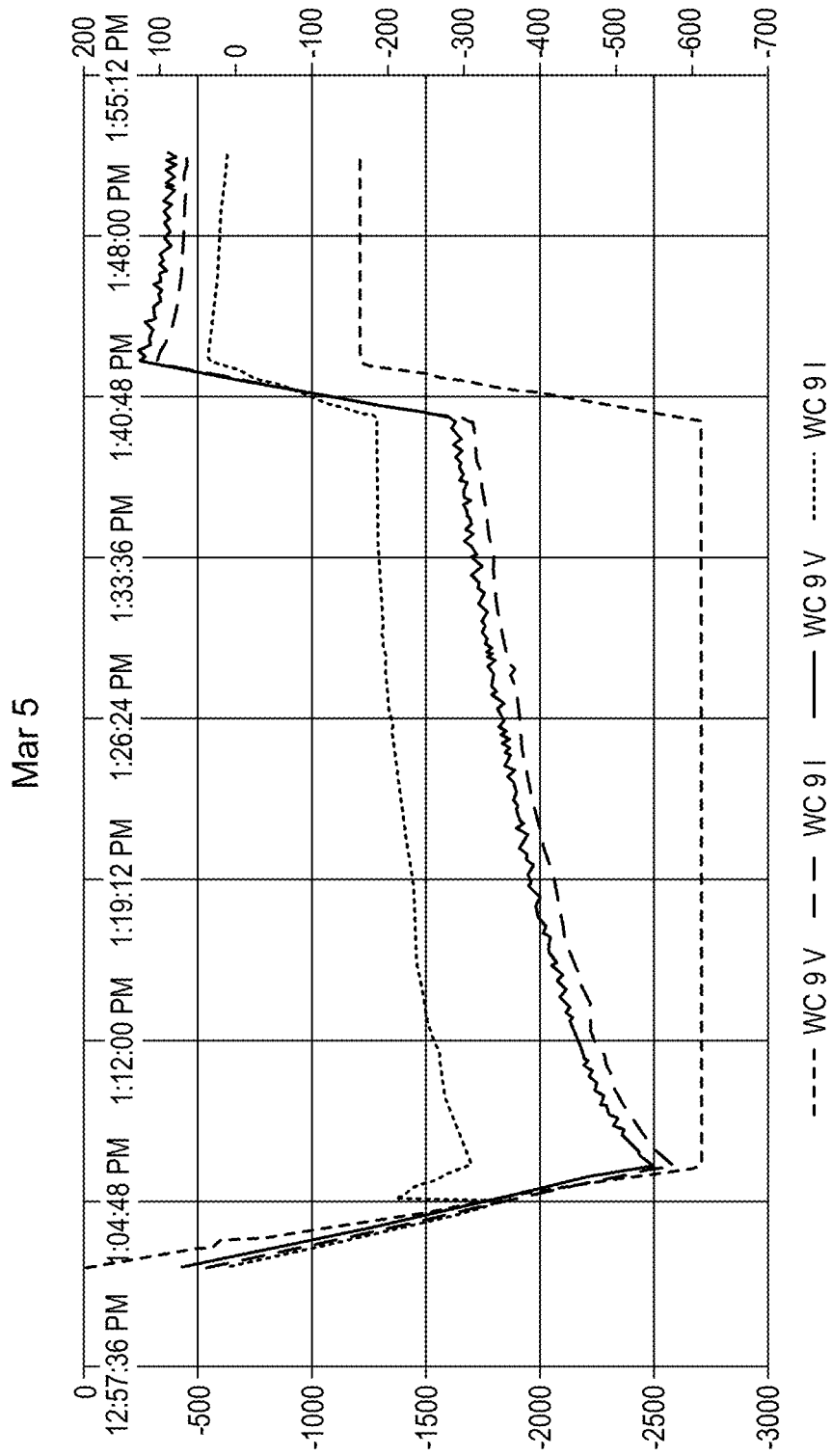
Figure 18F:
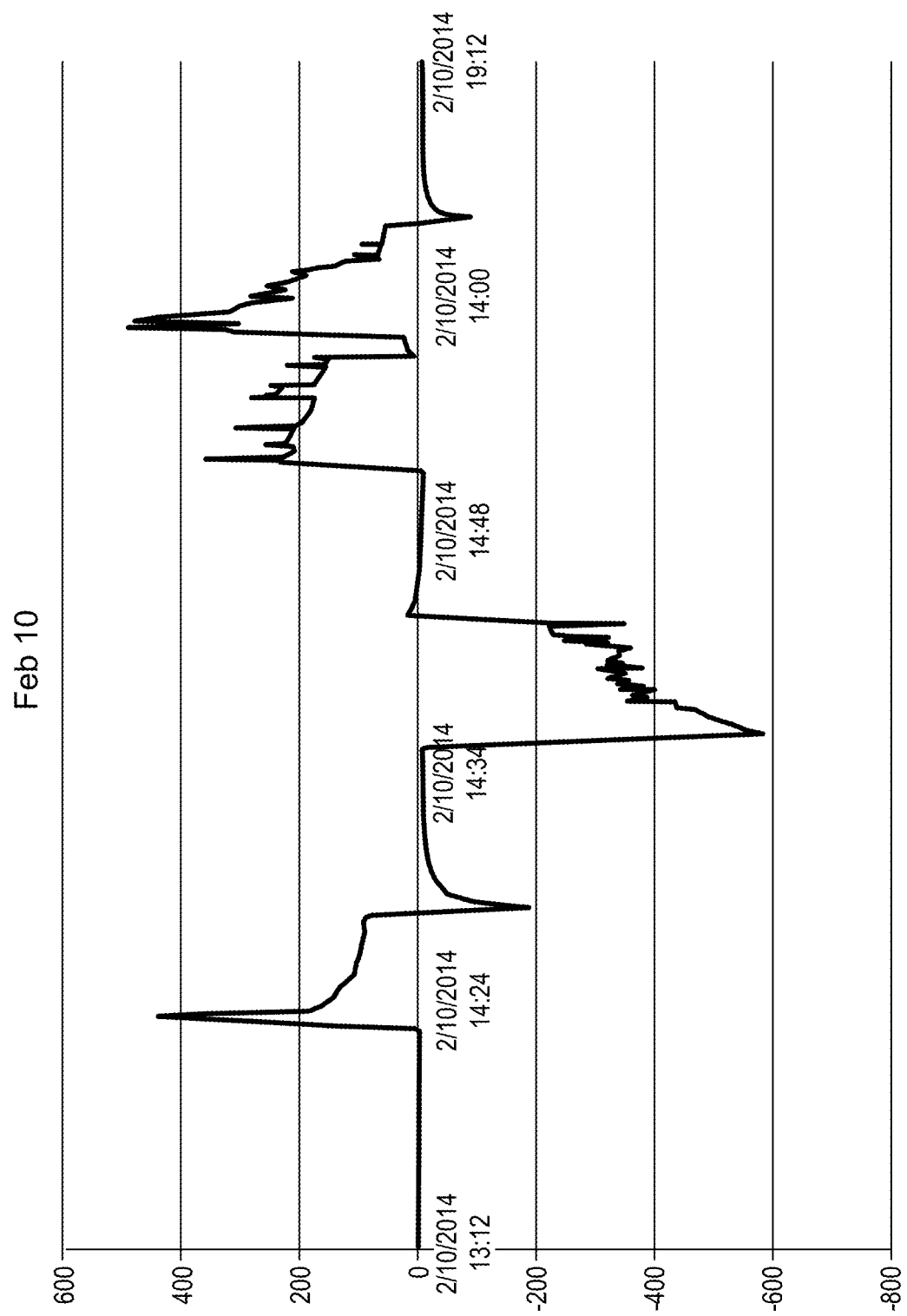
Figure 18G:
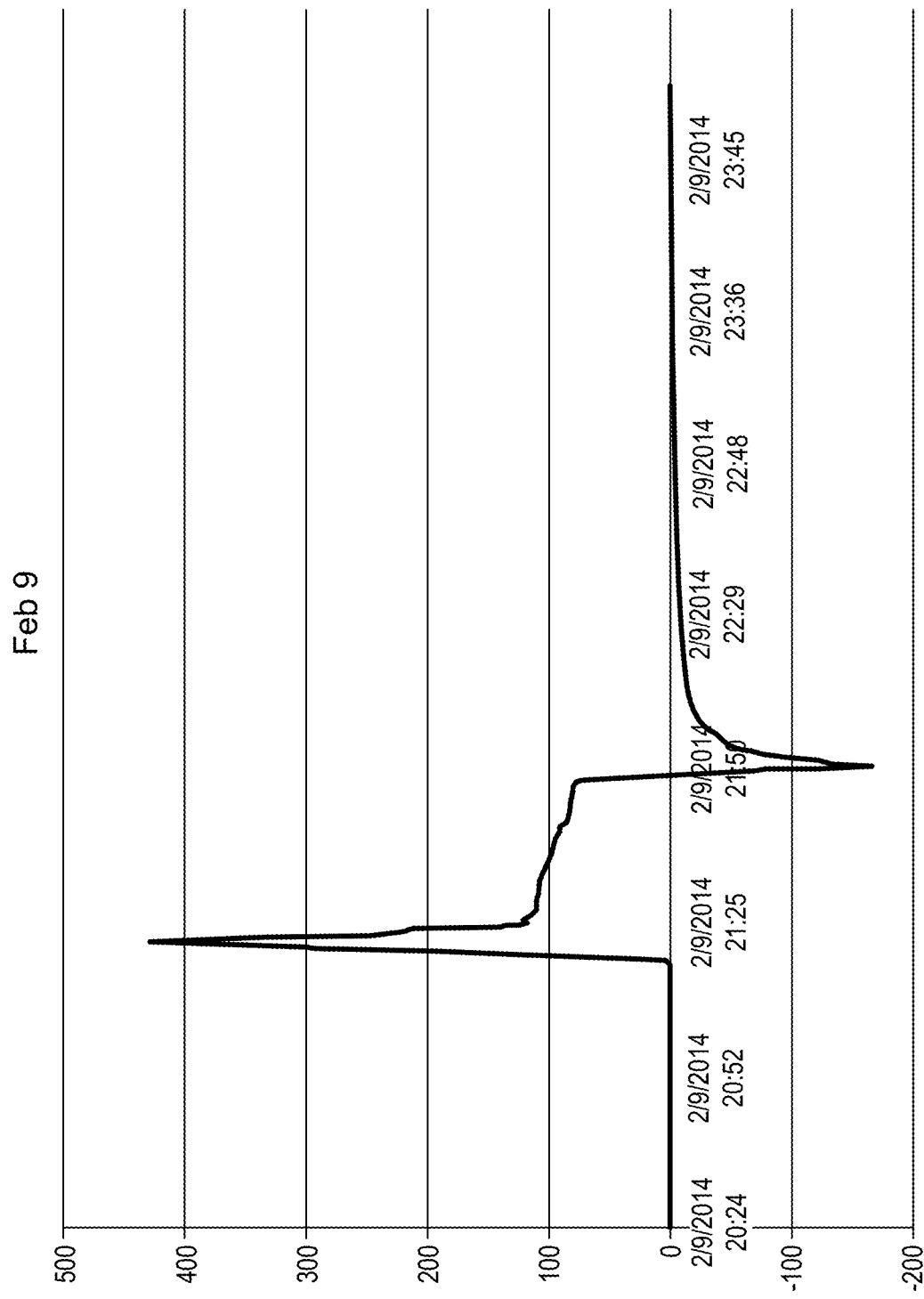
Figure 18H:
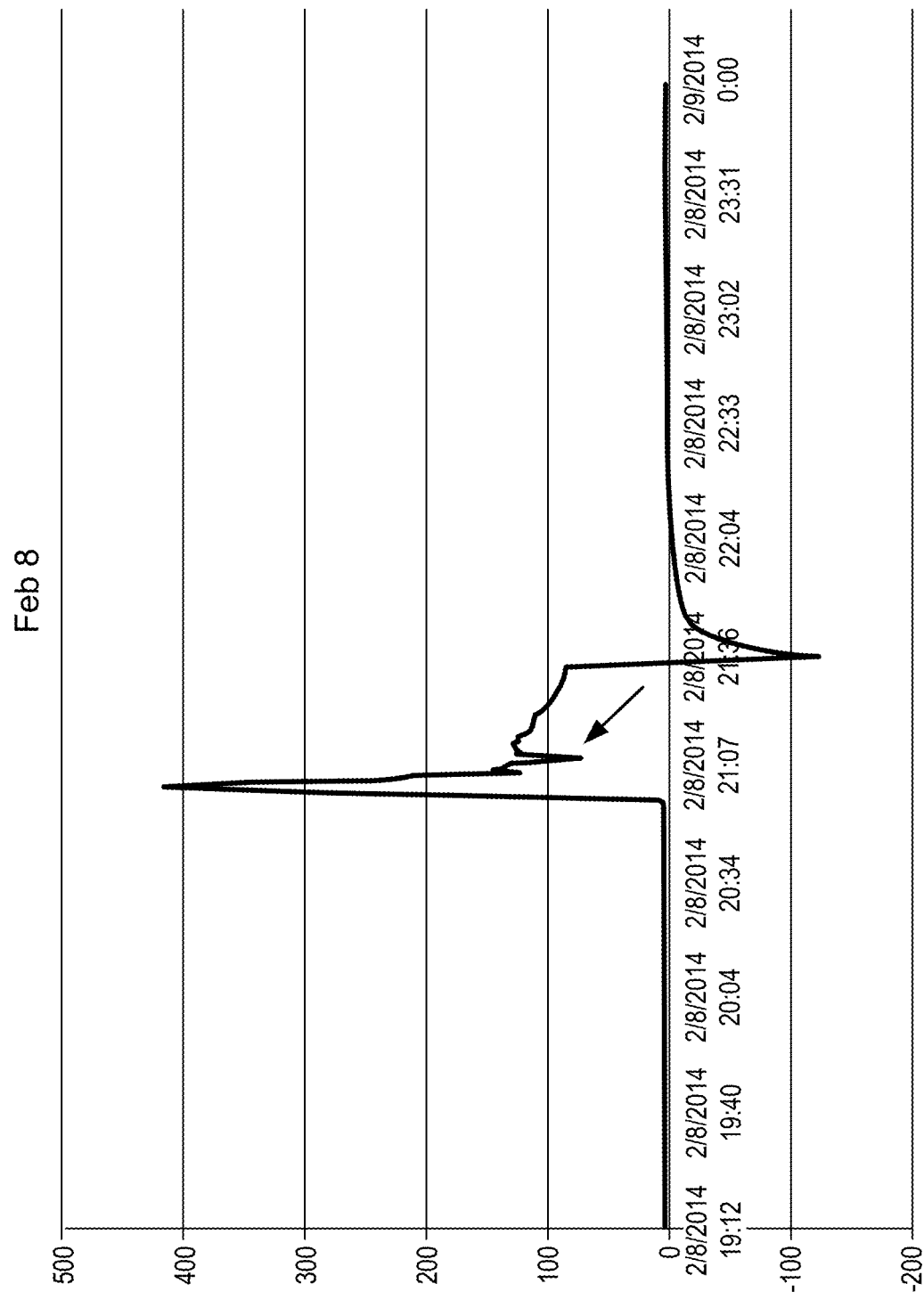

In FIGS. 18B-E, which present plots of controller current readings taken on March 1, 4, and 5, the lower flat bottomed curve is the applied voltage to drive a window transition. See the labels WC1V for March 5, WC09V for March 1, WC10V for March 4, and WC9V for March 5 (FIG. 18E). As seen, the applied voltage profile is the same; all controllers are identically driven. All other curves represent current from the controllers, and all controllers except WC12 have identical loads. Hence, the system expects the current curves for WC1-WC11 to be same for same. The site monitoring system analyzes and compares the current currents, and finds that WC11 has two issues (a) its current profile has an uncharacteristic dip in it in the middle of a ramp (b) it draws about half the peak current (about as much as WC12 level) compared to WC1-WC10, suggesting that one of the two windows controlled by WC11 was not getting tinted. Manual inspection of the windows confirmed found one window controlled by WC11 was not tinting properly. Further inspection showed that one window of two controlled by WC11 was not tinting due to pinched cable which ultimately stopped working, which is why WC11 had an uncharacteristic current profile that eventually resembled WC12 which drives a single window.

Analysis of WC11 from earlier dates (February 8-10 in the graphs FIGS. 18F-H) shows that it had characteristics of a failing controller. Current drawn from WC11 had spiky drops and increases in current evidencing onset of the problem. With auto detection, the site monitoring system could have found this problem and flagged it to field service before one of the windows stopped tinting and became a noticeable problem.

Mechanical Shades

While certain disclosure emphasizes systems, methods, and logic for controlling optically switchable devices (e.g., electrochromic devices), these techniques can also be used to control mechanical shades or a combination of optically switchable devices and mechanical shades. Such a mechanical shade may, for example, include an array of microelectromechanical systems (MEMS) devices or other electromechanical systems (EMS) devices. Windows having a combination of electrochromic devices and EMS systems devices can be found in PCT international application PCT/US2013/07208, titled "MULTI-PANE WINDOWS INCLUDING ELECTROCHROMIC DEVICES AND ELECTROMECHANICAL SYSTEMS DEVICES," filed on Nov. 26, 2012, which is hereby incorporated by reference in its entirety. Mechanical shades typically have different power requirements than certain optically switchable devices such as electrochromic devices. For example, while certain electrochromic devices require a few volts to operate, mechanical shades may in some instances require larger voltages in order to establish sufficient potential to physically move the mechanical feature.

Microblinds and microshutters are examples of types of EMS devices. Some examples of microblinds and microshutters, and their methods of fabrication are described respectively in U.S. Pat. Nos. 7,684,105 and 5,579,149, both of which are hereby incorporated by reference in their entirety.

In certain embodiments, a mechanical shade may be an array of EMS devices, where each EMS device including a portion (e.g., a hinge or an anchor) attached to the substrate and a mobile portion. When actuated by electrostatic forces, the mobile portion may move and obscure the substrate. In the unactuated state, the mobile portion may expose the substrate. In the example of some microblinds, the mobile portion may be an overhanging portion of a material layer that curls when actuated by electrostatic forces. In the example of some microshutters, the mobile portion can rotate or curl when actuated. In some cases, the EMS devices may be actuated and controlled by electrostatic control means. In the example of microshutters, the electrostatic control means may control the angle of rotation or curl to different states. The substrate with the array of EMS devices may also include a conductive layer. In the example of microblinds, the microblinds are fabricated using a thin layer(s) under controlled stress. In embodiments with an array of EMS devices, each EMS device has two states, an actuated state and an unactuated state. The actuated state may render the array of EMS devices substantially opaque and the unactuated state may render the array of EMS devices substantially transparent, or vice versa. The actuated and unactuated states may also switch between substantially reflective (or absorptive) and substantially transparent, for example. Other states are also possible when the array of EMS devices is in an actuated or unactuated state. For example, microshutters, a type of MEMS device, may be fabricated from a tinted (but non-opaque) coating, which when shut provide a tinted pane, and when open the tint is substantially removed. Further, some arrays of EMS devices may have three, four, or more states that are able to be transitioned to. In some cases, the EMS devices can modify visible and/or infrared transmission. The EMS devices may reflect in some cases, may be absorptive in other cases, and in yet other embodiments may provide both reflective and absorptive properties. In certain embodiments, the EMS devices may be operated at variable speeds, e.g., to transition from a high transmission state to a low-transmission state, or a no-transmission state. In certain cases, the EMS devices may be used in conjunction with an electrochromic device (or other optically switchable device) as a temporary light blocking measure, e.g., to block light until the associated electrochromic device has transitioned to a lower transmissivity state or a higher transmissivity state.

What is claimed is:

1. A system comprising:
   (a) a plurality of windows, each window of the plurality of windows having at least one switchable optical device; and
   (b) a window network comprising:
       a plurality of end window controllers configured to control a tint level of the at least one switchable optical device of each window of the plurality of windows,
       a plurality of intermediate controllers, each intermediate controller configured to couple with one or more of the plurality of end window controllers, and
       a master controller configured to couple with a network and with one or more of the plurality of end window controllers and the plurality of intermediate controllers,
       wherein control of the switchable optical devices of the plurality of windows is distributed across the plurality of end window controllers, the plurality of intermediate controllers, and the master controller,
       wherein the window network is configured to control the plurality of windows based at least in part on user input received by the window network.

2. The system of claim 1, wherein the window network is further configured to convey a user request to control the switchable optical devices of the plurality of windows.

3. The system of claim 1, wherein at least one of the plurality of end window controllers is configured to receive the user input.

4. The system of claim 1, wherein at least one of the plurality of intermediate controllers is configured to receive the user input.

5. The system of claim 1, wherein the master controller is configured to receive the user input.

6. The system of claim 1, wherein the window network is configured respond to a user's remote control device.

7. The system of claim 1, further comprising a wall switch connected to the window network and/or one or more of the plurality of windows, wherein the wall switch is configured to issue tint level commands to the one or more of the plurality of windows.

8. The system of claim 1, further comprising a plurality of sensors configured to provide sensor input to the window network.

9. The system of claim 8, wherein the window network is further configured to control the switchable optical devices of the plurality of windows based at least in part on the sensor input.

10. The system of claim 1, wherein the window network is further configured to control the switchable optical devices of the plurality of windows based at least in part on information obtained by the window network.

11. The system of claim 1, wherein the window network is configured to analyze data gathered from user interactions with the window network and modify a mode of operating the switchable optical devices of at least some of the plurality of windows based on the data gathered from user interactions.

12. The system of claim 1, wherein the window network comprises a firewall.

13. The system of claim 1, wherein the master controller is configured to recognize each of the plurality of intermediate controllers, each of the plurality of end window controllers, and each of the plurality of windows.

14. The system of claim 1, wherein the master controller is configured to override the control of at least one of the plurality of intermediate controllers and at least one of the plurality of end window controllers.

15. The system of claim 1, wherein at least one of the plurality of intermediate controllers is configured to override the control of at least one of the plurality of end window controllers.

16. The system of claim 1, wherein the master controller is configured to authenticate one or more of the end window controllers and/or one or more of the intermediate controllers.

17. A method implemented on a plurality of sites, wherein at least one of the plurality of sites comprises:
a plurality of windows, each window of the plurality of windows having at least one switchable optical device;
a plurality of end window controllers configured to control a tint level of the at least one switchable optical device of each window of the plurality of windows;
a plurality of intermediate controllers, wherein each intermediate controller is coupled with one or more of the plurality of end window controllers; and
a master controller coupled with each of the plurality of intermediate controllers and an external network,
wherein control of the plurality of windows is distributed across the plurality of end window controllers, the plurality of intermediate controllers, the master controller, and the external network,
the method comprising:
(a) analyzing data, by logic, gathered from at least some of the plurality of windows, end window controllers, intermediate controllers, and/or the master controller at the plurality of sites and learning a modification and/or a mode of operation;
(b) applying, by the logic, the modification to at least one of the plurality of sites such that the control of the plurality of windows is based in part on the modification and/or mode of operation learned by the logic; and
(c) providing the data gathered from at least some of the plurality of windows, end window controllers, intermediate controllers and/or the master controller at the plurality of sites to the external network.

18. The method of claim 17, wherein the plurality of sites further comprises a plurality of sensors, wherein the data gathered comprises sensor data from the plurality of sensors.

19. The method of claim 17, wherein the data gathered comprises data on energy savings for at least one of the plurality of sites.

20. The method of claim 17, wherein the modification and/or mode of operation is based at least in part on a user preference.

21. The method of claim 17, wherein the method further comprises responding to a remote-control device.

22. The method of claim 17, wherein at least one of the plurality of sites further comprises:
a plurality of communication interfaces coupled with the plurality of end window controllers.

23. The method of claim 17, wherein the master controller is configured to utilize the logic for applying control algorithms that incorporate the data collected on the external network.

24. The method of claim 17, wherein the master controller is configured to couple with at least one third-party device for sending and receiving control signals.

25. The method of claim 17, wherein the control of the plurality of windows employs the data gathered and provided to the external network.

26. The method of claim 17 wherein the control of the plurality of windows is further based at least in part on a user input provided via the external network.

27. The method of claim 17, wherein control of the plurality of windows may be redistributed by increasing or decreasing the number of the plurality of end window controllers or the plurality of windows.

28. The method of claim 17, wherein analyzing data comprises analyzing data gathered on weather for at least one of the plurality of sites, and wherein the control of the plurality of windows is based at least in part on weather data.

29. The method of claim 17, wherein the control of the plurality of windows controls a temperature of at least one of the plurality of sites.

* * * * *